United States Patent
Takahashi

(10) Patent No.: US 7,710,608 B2
(45) Date of Patent: May 4, 2010

(54) PRINTING APPARATUS, PRINTING APPARATUS CONTROL PROGRAM, PRINTING APPARATUS CONTROL METHOD, PRINTING DATA CREATING APPARATUS, PRINTING DATA CREATING PROGRAM AND PRINTING DATA CREATING METHOD

(75) Inventor: Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 1094 days.

(21) Appl. No.: 11/346,542

(22) Filed: Feb. 2, 2006

(65) Prior Publication Data

US 2006/0170937 A1    Aug. 3, 2006

(30) Foreign Application Priority Data

Feb. 3, 2005 (JP) ............................. 2005-027292
Nov. 14, 2005 (JP) ............................. 2005-329135

(51) Int. Cl.
*H04N 1/407* (2006.01)
*H04N 1/409* (2006.01)
*G06T 5/00* (2006.01)
*G06K 15/00* (2006.01)

(52) U.S. Cl. .................... 358/3.26; 358/1.12; 358/1.18; 347/14

(58) Field of Classification Search ................ 358/1.18, 358/3.26, 1.1, 1.2, 1.12, 1.9, 3.01, 3.06, 3.09, 358/3.21, 3.24; 347/12, 14, 15

See application file for complete search history.

(56) References Cited

U.S. PATENT DOCUMENTS

| 6,283,571 | B1 | 9/2001 | Zhou et al. |
| 6,293,643 | B1 | 9/2001 | Shimada et al. |
| 6,328,404 | B1 | 12/2001 | Fujimori |
| 6,984,011 | B2 * | 1/2006 | Shimada et al. ............... 347/19 |
| 7,290,846 | B2 * | 11/2007 | Takahashi .................... 347/15 |
| 7,393,074 | B2 * | 7/2008 | Yamazaki .................... 347/15 |
| 2001/0038397 | A1 * | 11/2001 | Kobayashi et al. ............ 347/14 |
| 2003/0151773 | A1 * | 8/2003 | Ogawa et al. ............. 358/3.03 |
| 2006/0170937 | A1 | 8/2006 | Takahashi |

FOREIGN PATENT DOCUMENTS

| JP | 01-235655 | 9/1989 |
| JP | 05-030361 | 2/1993 |
| JP | 11-151821 | 8/1999 |
| JP | 11-254662 | 9/1999 |

(Continued)

*Primary Examiner*—James A Thompson
(74) *Attorney, Agent, or Firm*—Harness, Dickey & Pierce, P.L.C.

(57) ABSTRACT

A printing apparatus for printing an image on a medium by a print head having a nozzle capable of creating dots includes: a module acquiring image data having an M-ary pixel data value (M≧3); a module creating N-ary image data (M>N≧2) from an M-ary pixel value (M≧3) expressed by each pixel data item; a module splitting the N-ary image data into a plurality of image data areas of a predetermined number of pixel data items; a module rearranging a position of a pixel corresponding to each pixel data item included in the image data areas in the N-ary image data at a predetermined position in each image data area; a module creating printing data defining dot forming information of each nozzle corresponding to the N-ary image data after rearrangement; and a module printing the image on the medium.

18 Claims, 22 Drawing Sheets

FOREIGN PATENT DOCUMENTS

| | | |
|---|---|---|
| JP | 2000-79710 | 3/2000 |
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |
| JP | 2003-341041 | 12/2003 |
| JP | 2004-058284 | 5/2004 |
| JP | 2006-240288 | 9/2006 |
| JP | 2006-240306 | 9/2006 |

* cited by examiner

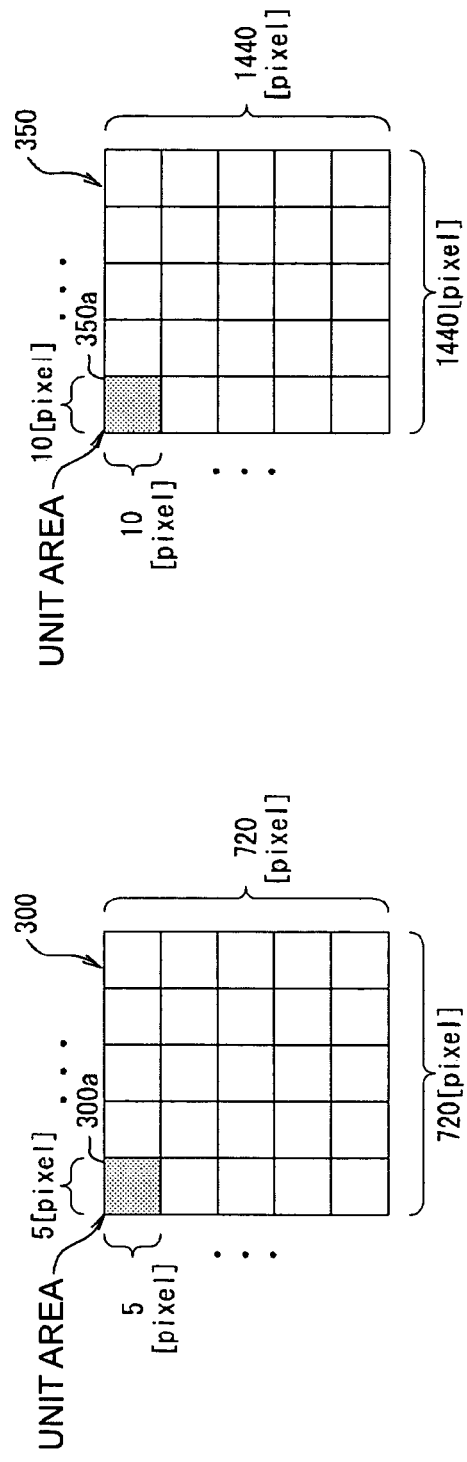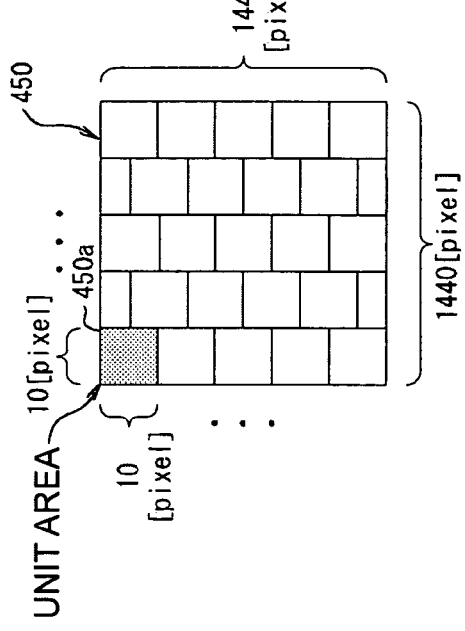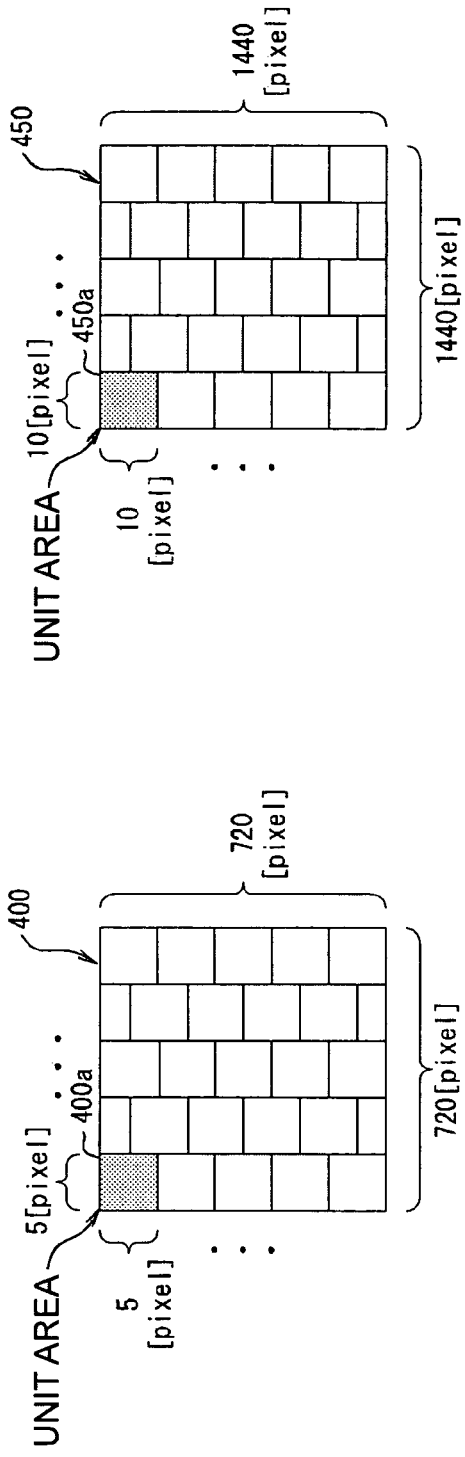

| NOZZLE NUMBER | DISCHARGE/NO DISCHARGE INFORMATION |
|---|---|
| 1 | 0 |
| 2 | 0 |
| 3 | 1 |
| . | |
| . | |
| . | |
| 1438 | 0 |
| 1439 | 1 |
| 1440 | 0 |

0: NORMAL DISCHARGE
1: NO DISCHARGE (CLOG)

| NOZZLE NUMBER | CURVED FLIGHT AMOUNT (ABSOLUTE DISCHARGE ACCURACY) FROM IDEAL POSITION [$\mu$m] |
|---|---|
| 1 | 0 |
| 2 | +1 |
| 3 | −2 |
| . | |
| . | |
| . | |
| 1438 | −4 |
| 1439 | 0 |
| 1440 | +3 |

FIG.16B

| NOZZLE NUMBER | RELATIVE CURVED FLIGHT AMOUNT (RELATIVE DISCHARGE ACCURACY) [$\mu$m] (RELATIVE CURVED FLIGHT AMOUNT FROM IDEAL POSITION OF NOZZLE NUMBER N + 1 − RELATIVE CURVED FLIGHT AMOUNT FROM IDEAL POSITION OF NOZZLE NUMBER N) |
|---|---|
| 1 | −1 |
| 2 | −3 |
| 3 | +1 |
| . | |
| . | |
| . | |
| 1438 | +4 |
| 1439 | +3 |
| 1440 | − |

| RELATIVE CURVED FLIGHT AMOUNT [μm] | PIXEL REARRANGEMENT SCHEME |
|---|---|
| -4~+4 | NO PROCESS DONE |
| OTHER THAN ABOVE | REARRANGEMENT PROCESS |

|    |    |    |    |    |
|----|----|----|----|----|
| 24 | 20 | 18 | 9  | 13 |
| 22 | 14 | 5  | 3  | 11 |
| 16 | 6  | 1  | 7  | 17 |
| 10 | 2  | 4  | 15 | 23 |
| 12 | 8  | 19 | 21 | 25 |
1 [pixel], 1 [pixel], ~600
REARRANGEMENT RULE 2
FIG.19A
|    |    |    |    |    |
|----|----|----|----|----|
| 12 | 8  | 19 | 21 | 25 |
| 10 | 2  | 4  | 15 | 23 |
| 16 | 6  | 1  | 7  | 17 |
| 22 | 14 | 5  | 3  | 11 |
| 24 | 20 | 18 | 9  | 13 |
~700
REARRANGEMENT RULE 3
FIG.19B
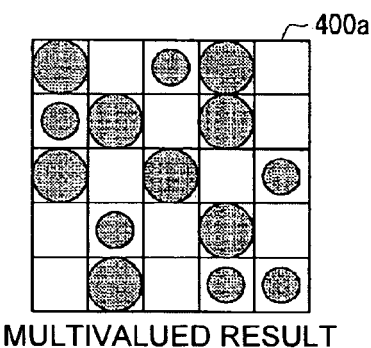
MULTIVALUED RESULT
FIG.19C
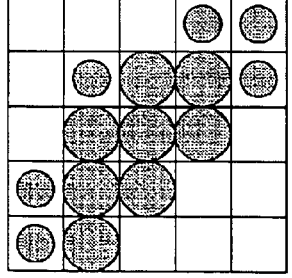
LARGER DOTS ARE REARRANGED, AND THEN SMALLER DOTS ARE REARRANGED
EXEMPLARY REARRANGED RESULT BY THE REARRANGEMENT RULE 2
FIG.19D
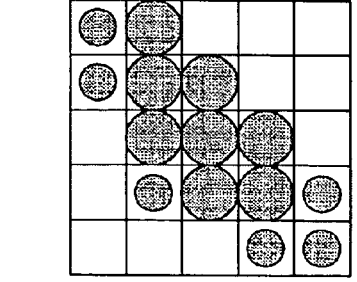
EXEMPLARY REARRANGED RESULT BY THE REARRANGEMENT RULE 3
FIG.19E

DOTS IN VARIOUS SIZES ARE REARRANGED AT RANDOM

EXEMPLARY REARRANGED RESULT BY THE REARRANGEMENT RULE 2

EXEMPLARY REARRANGED RESULT BY THE REARRANGEMENT RULE 3

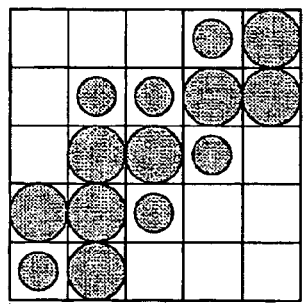
FIG.24A
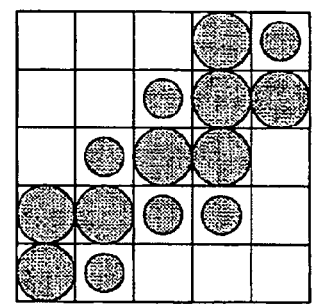
FIG.24C
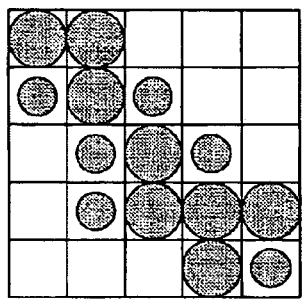
FIG.24B
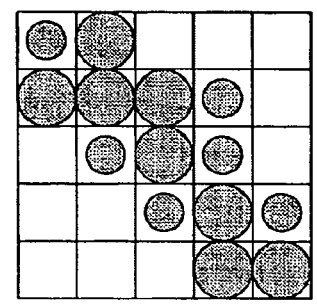
FIG.24D
| a[0, 0] | a[1, 0] | a[2, 0] | a[3, 0] | a[4, 0] |
| --- | --- | --- | --- | --- |
| a[0, 1] | a[1, 1] | a[2, 1] | a[3, 1] | a[4, 1] |
| a[0, 2] | a[1, 2] | a[2, 2] | a[3, 2] | a[4, 2] |
| a[0, 3] | a[1, 3] | a[2, 3] | a[3, 3] | a[4, 3] |
| a[0, 4] | a[1, 4] | a[2, 4] | a[3, 4] | a[4, 4] |
FIG.25

PRINTING APPARATUS, PRINTING APPARATUS CONTROL PROGRAM, PRINTING APPARATUS CONTROL METHOD, PRINTING DATA CREATING APPARATUS, PRINTING DATA CREATING PROGRAM AND PRINTING DATA CREATING METHOD

RELATED APPLICATIONS

This application claims priority to Japanese Patent Application Nos. 2005-027292 filed Feb. 3, 2005 and 2005-329135 filed Nov. 14, 2005 which are hereby expressly incorporated by reference herein in their entirety.

BACKGROUND

1. Technical Field

The present invention relates to a printing apparatus, a printing apparatus control program, and a printing apparatus control method, which are used for printing equipment such as a facsimile machine, a copier, and Office Automation (OA) appliances, a printing apparatus, a printing apparatus control program, a printing apparatus control method, a printing data creating apparatus, a printing data creating program, and a printing data creating method particularly to so-called ink jet printing processing in which fine particles of multiple colors of liquid ink are discharged onto printing paper (recording material) to form predetermined letters and images.

2. Related Art

Hereinafter, a printing apparatus, particularly a printer that adopts the ink jet printing method (hereinafter, it is called 'an ink jet printer') will be described.

Generally, since the ink jet printer easily provides inexpensive, high quality color prints, it becomes widespread in offices as well as general users with the wide use of personal computers and digital cameras.

Typically, the ink jet printer like this produces desired prints in which a movable body called a carriage having an ink cartridge and a print head in one piece discharges (ejects) liquid ink particles in dots from a nozzle of the print head while reciprocating over a printing medium (for example, printing paper) in the direction vertical to the paper feed direction and predetermined letters and images onto the medium are drawn. Then, four colors of ink cartridges including black (black, yellow, magenta, and cyan) and print heads for each color are provided in this carriage to facilitate monochrome printing as well as full color printing combining each color (furthermore, such a ink jet printer is also commercially available that is provided with six and seven colors, or eight colors such as light cyan and light magenta added to these colors).

Moreover, in the ink jet printer of this type that printing is done while the print head over the carriage reciprocates in the direction vertical to the paper feed direction, the print head needs to reciprocate ten to a hundred times or more in order to print an entire page beautifully. Thus, as compared with a printing apparatus in other methods such as a laser printer using electrophotographic technology including a copier, it has a disadvantage that it takes longer to print.

On the other hand, in an ink jet printer of the type that a long print head having the same width (or longer) as that of printing paper is disposed without using any carriage, the print head does not need to move in the width direction of printing paper, and printing is done in a so-called single scan (a single path). Therefore, high speed printing is feasible similar to the laser printer. Furthermore, since a carriage that mounts the print head thereon and a drive system that moves the carriage are unnecessary, this printer has advantages that a printer housing can be reduced in size and weight, and noise reduction properties can be improved significantly. Moreover, the ink jet printer by the former method is generally called a 'multipath type printer', and the ink jet printer by the latter method is generally called a 'line scan head type printer' or 'serial printer'.

In the meantime, since the print head essential for the ink jet printer like these is formed in which fine nozzles each having a diameter of about 10 to 70 μm are arranged in a row spaced at a predetermined distance or in multiple rows in the printing direction, a so-called 'curved flight phenomenon' sometimes occurs that fabrication error causes a part of nozzles to be tilted in the ink discharge direction thereof, or that the position of a nozzle is placed at the position shifted from an ideal position and then the position of dot ejected by that nozzle is shifted from an ideal position. Furthermore, because of the variations in the property of the nozzle, for the nozzle with greater variations, there are some nozzles that an ink amount is greatly larger or smaller than an ideal amount.

Consequently, a print failure known as a so-called 'banding (streaks) phenomenon' is generated in the portion printed with the defective nozzle, and print quality is sometimes seriously degraded. More specifically, when the 'curved flight' phenomenon occurs, the distance between dots discharged from the adjacent nozzles becomes uneven, 'white streaks (when printing paper is white)' are generated in the portion where the distance between adjacent dots is larger than in normal printing, and 'thick streaks' are generated in the portion where the distance between adjacent dots is shorter than in normal printing. Furthermore, also when the value of the ink amount is deviated from an ideal value, thick streaks are generated in the portion relating to the nozzle with a greater ink amount, and white streaks are generated in the portion relating to the nozzle with a smaller ink amount.

Particularly, such the banding phenomenon tends to occur more noticeably in the 'line scan head type printer' that the print head or a medium for use in printing is fixed (single path printing) than in the 'multipath type printer' (serial printer) described above (in the multipath type printer, there is a technique to make banding less noticeable with making use of reciprocating the print head many times).

Therefore, in order to prevent a kind of printed failure like this 'banding phenomenon', studies and development are done in so-called hardware including improvements in fabrication techniques and in designs of the print head, but it is difficult to provide a print head that never generates the 'banding phenomenon' in view of fabrication cost and available hardware technology.

Then, under the current circumstances, in addition to the improvements in hardware, a technique is also used to reduce the 'banding phenomenon' using so-called software schemes such as print control shown below.

For example, in Patent Reference 1 (JP-A-2002-19101) and Patent Reference 2 (JP-A-2003-136702) shown below, in order to cope with nozzle variations and no ink discharge, settings are done to make banding and variations less noticeable in such ways that head variations are handled by using a shading compensation technique for portions with thin concentrations, and that other colors are used for substitutes for portions with thick concentrations (for example, when printing is done in black, cyan, magenta, etc., are substituted).

Moreover, in Patent Reference 3 (JP-A-2003-63043) shown below, a scheme is adopted for a solid image (that is, it is an image having a relatively great area with respect to a line image, which is covered with ink densely, but is sometimes not covered entirely because of edge effect), in which the discharge amount of nozzles adjacent to neighboring pixels of a misfired nozzle is increased to generate a solid image by all the nozzles.

Furthermore, in Patent Reference 4 (JP-A-5-30361) shown below, an amount of variations in each of nozzles is fed back to error spread and processed, and variations in the discharge amount of ink discharged from the nozzles are smoothed out to prevent the banding phenomenon.

Moreover, in Patent Reference 5 (JP-A-2004-58284) shown below, when there is a nozzle (N) that abnormality occurs in an ink discharge state, record data corresponding to that abnormal nozzle (N) is added to record data corresponding to neighboring nozzles (N−1) and (N+1) located near the abnormal nozzle (N), and record data corresponding to the abnormal nozzle (N) is corrected to prevent the banding phenomenon.

However, for portions with thick concentrations, in the schemes that information about the no discharge nozzle is distributed in right and left to prevent the 'white streak phenomenon' in the traditional techniques as Patent Reference 1 and Patent Reference 2, when it is adopted to 'the curved flight phenomenon' described above, it has a problem that banding still remains in portions with thick concentrations.

Moreover, in the scheme as traditional technique of the Patent Reference 3, no problem occurs when prints are solid images, but the scheme cannot be used for halftone prints. Besides, the scheme that buries fine lines with other colors does not cause any problem for slight use, but for an image where different colors are created continuously, a problem remains that the hue of the image is partially changed similar to the former scheme.

Furthermore, in the scheme as the traditional technique of the Patent Reference 4, for the problem that dot forming descriptions are shifted, there is a problem that the process of proper feedback is complicated for difficult solution.

Moreover, in the scheme as the traditional technique of the Patent Reference 5, when dots have the γ property in creating dots in different size by surrounding nozzles after binarization, a problem occurs that the area ratio gray scale in that portion is likely to be deformed.

SUMMARY

A first advantage of the invention is to provide a novel printing apparatus, a printing apparatus control program, a printing apparatus control method, a printing data creating apparatus, a printing data creating program, and a printing data creating method, which can eliminate the degradation of printed image quality or make it minimally noticeable.

Furthermore, a second advantage is to provide a novel printing apparatus, a printing apparatus control program, a printing apparatus control method, a printing data creating apparatus, a printing data creating program, and a printing data creating method, which can eliminate the degradation of printed image quality due to the banding phenomenon caused by the curved flight phenomenon or make it minimally noticeable.

Moreover, a third advantage is to provide a novel printing apparatus, a printing apparatus control program, a printing apparatus control method, a printing data creating apparatus, a printing data creating program, and a printing data creating method, which can eliminate the degradation of printed image quality caused by ink discharge deficiency or make it minimally noticeable.

Aspect 1

In order to achieve the first to third advantages, a printing apparatus according to aspect 1 is a printing apparatus which is capable of printing an image on a medium by a print head having a nozzle that is capable of creating dots on a printing medium, the printing apparatus including:

an image data acquiring module that acquires image data having an M-ary value of pixel data ($M \geq 3$) configuring the image;

an N-ary image data creating module that creates N-ary image data ($M > N \geq 2$) from an M-ary pixel value ($M \geq 3$) expressed by each item of pixel data in the image data;

an image data area splitting module that splits the N-ary image data into a plurality of image data areas configured of a predetermined number of items of pixel data;

a pixel rearranging module that rearranges a position of a pixel corresponding to each item of pixel data included in each of the image data areas in the N-ary image data at a predetermined position in each of the image data areas;

a printing data creating module that creates printing data which defines information about dot forming descriptions of each of the nozzles corresponding to the N-ary image data after the rearrangement; and a printing module that prints the image on the medium by the print head based on the printing data.

With this configuration, the image data acquiring module can acquire image data having an M-ary value of pixel data ($M \geq 3$) configuring the image, the N-ary image data creating module can create N-ary image data ($M > N \geq 2$) from an M-ary pixel value ($M \geq 3$) expressed by each item of pixel data in the image data, the image data area splitting module can split the N-ary image data into a plurality of image data areas configured of a predetermined number of items of pixel data, the pixel rearranging module can rearrange a position of a pixel corresponding to each item of pixel data included in each of the image data areas in the N-ary image data at a predetermined position in each of the image data areas, the printing data creating module can create printing data which defines information about dot forming descriptions of each of the nozzles corresponding to the N-ary image data after the rearrangement, and the printing module can print the image on the medium by the print head based on the printing data.

Therefore, N-ary image data is split into a plurality of the image data areas in the shape and size that are unlikely to impair the details of an image even though pixels are rearranged, and each pixel in each of the image data areas before rearrangement is rearranged at a proper position in the image portion of the image data area. Thus, an advantage can be obtained that can reduce the degradation of image quality generated in the printed result because, for example, of 'the banding phenomenon' mainly caused by nozzle properties such as 'the curved flight phenomenon' due to ink discharge deficiency in a nozzle and a nozzle that a dot forming position is shifted from an ideal position, and of 'the banding phenomenon' caused by the γ properties of a dot formed by a nozzle.

Here, information about the dot forming descriptions of the nozzle is configured of information required in forming dots on a printing medium by a nozzle such as information which color is used for each pixel value of image data (for example, CMYK), information about the presence of a dot (a dot is formed or not formed depending on a nozzle), information about dot size when a dot is formed (for example, any one of three types, large, middle and small), information that at how much carriage ink is discharged, information that which nozzle is set to print (for example, a nozzle number, etc.), information that at which position is set to print (print position), and information that how much page is set to be printed.

Furthermore, when there is only one type of forming size, information about dot size is unnecessary. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Moreover, the 'to define' means that 'information about the dot forming descriptions of the nozzle' is configured in a 'data format' that 'the printing apparatus' can interpret. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Furthermore, as described above, 'the banding phenomenon' is printed failure that 'white streaks' as well as 'thick streaks' are generated in the printed result at the same time caused by a so-called 'curved flight phenomenon' due to a nozzle whose dot forming position is shifted from an ideal forming position, printed failure that 'white streaks' and 'thick streaks' are generated in the printed result caused by ink discharge deficiency such as no ink discharge from a nozzle, and printed failure that 'white streaks' and 'thick streaks' are generated in the printed result caused by the γ properties of a dot. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Moreover, for example, the 'white streaks' are a portion (area) that a phenomenon where the distance between adjacent dots is wider than a predetermined distance because of 'the curved flight phenomenon' continuously occurs to make the base color of a printing medium noticeable in streaks. Also, the 'thick streaks' are a portion (area) that a phenomenon where the distance between adjacent dots is shorter than a predetermined distance because of 'the curved flight phenomenon' similarly continuously occurs to make the base color of a printing medium invisible, or a portion (area) that the distance between adjacent dots is shorter to see relatively thicker, or a portion (area) that a part of dots formed as shifted is overlapped with normal dots to make the overlapped portion noticeable in thick streaks. Moreover, white streaks sometimes occur because of the nozzle with a small ink amount, whereas thick streaks sometimes occur because of the nozzle with a large ink amount. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Besides, the image data area is an area that N-ary image data is split into multiple areas by a unit area configured of a plurality of items of pixel data. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 2

Furthermore, in the printing apparatus according to aspect 1, a printing apparatus according to aspect 2 includes:

a nozzle property information storing module that stores nozzle property information showing properties of each of the nozzles; and a determining module that determines whether there is a nozzle that possibly causes degradation of printed image quality among nozzles for use in printing the image data based on the nozzle property information, wherein the image data area splitting module performs the splitting process for all the N-ary image data when it is determined that there is the nozzle that possibly causes degradation by the determining module, and the pixel rearranging module performs the rearrangement process for each of the image data areas after splitting by the image data area splitting module.

With this configuration, the nozzle property information storing module can store nozzle property information showing properties of each of the nozzles, and the determining module can determine whether there is a nozzle that possibly causes degradation of printed image quality among nozzles for use in printing the image data based on the nozzle property information.

Moreover, the image data area splitting module can perform the splitting process for all the N-ary image data when it is determined that there is the nozzle that possibly causes degradation by the determining module, and the pixel rearranging module can perform the rearrangement process for each of the image data areas after splitting by the image data area splitting module.

Therefore, when there is a nozzle that possibly causes degradation of printed image quality among nozzles for use in printing, all the N-ary image data is rearranged. Thus, for example, when printing is done at low resolution, such an event can be prevented that pixels are rearranged for a nozzle that possibly causes degradation and nozzles near that nozzle, that portion is rather noticeable more than other portions to cause the degradation of image quality. Accordingly, an advantage can be obtained that printed image quality can be improved particularly in the case where printing is done at low resolution.

Furthermore, the nozzle property information includes nozzle ink discharge/no discharge information showing ink discharge or no discharge by a nozzle that which nozzle cannot discharge ink, nozzle discharge accuracy information configured of such information about a nozzle with curved flight or not and about an amount of curved flight. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Moreover, for the criteria of determining whether a nozzle possibly causes degradation of printed image quality, a relative amount of curved flight is taken as an example. For example, in the case where printing is done at 720 dpi of resolution, determination criteria can be set that roughly it is greater than ±4 μm in half tones, it is greater than ±7 μm in shadows, and it is greater than ±10 μm in highlights, and thus it is determined that that nozzle is a nozzle that possibly causes degradation of printed image quality, where a relative amount of curved flight of a nozzle is x. However, symbol '+' expresses a relative amount of curved flight in the right direction in the nozzle arranging direction, and symbol '−' expresses a relative amount of curved flight in the left direction in the nozzle arranging direction. Furthermore, the optimum value of a relative amount of curved flight such as ±4 μm to be the criteria of determining whether a nozzle possibly causes degradation is varied depending on print resolution. Thus, optimum values need to be set depending on print resolution. Moreover, the determination criteria may be set based on other elements relating to the generation of the banding phenomenon such as nozzle ink discharge states (whether to allow discharge, discharge amount, etc.) in addition to a relative amount of curved flight. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 3

Furthermore, in the printing apparatus according to aspect 1, a printing apparatus according to aspect 3 includes:

a nozzle property information storing module that stores nozzle property information showing properties of each of the nozzles; and a determining module that determines whether there is a nozzle that possibly causes degradation of printed image quality among nozzles for use in printing the image data based on the nozzle property information, wherein the image data area splitting module performs the splitting process for pixel data corresponding to a nozzle that possibly causes degradation and nozzles near that nozzle in the N-ary image data when it is determined that there is the nozzle that possibly causes degradation by the determining module, and the pixel rearranging module performs the rearrangement process for each of the image data areas after splitting by the image data area splitting module.

With this configuration, the nozzle property information storing module can store nozzle property information showing properties of each of the nozzles, and the determining module can determine whether there is a nozzle that possibly causes degradation of printed image quality among nozzles for use in printing the image data based on the nozzle property information.

Moreover, the image data area splitting module can perform the splitting process for pixel data corresponding to a nozzle that possibly causes degradation and nozzles near that nozzle in the N-ary image data when it is determined that there is the nozzle that possibly causes degradation by the determining module, and the pixel rearranging module can perform the rearrangement process for each of the image data areas after splitting by the image data area splitting module.

Therefore, a nozzle that possibly causes degradation of image quality can be identified easily, and pixels can be rearranged only for pixel data of a portion that possibly causes degradation and pixel data near that portion. Thus, an advantage can be obtained that can reduce the degradation of image quality generated in the printed result due to the banding phenomenon without changing a portion that causes no degradation of image quality by rearrangement.

Aspect 4

Furthermore, in the printing apparatus of aspect 2 or 3, a printing apparatus according to aspect 4, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

With this configuration, a nozzle can be identified easily that possibly causes a so-called 'curved flight phenomenon' which is caused by shifting a dot forming position from an ideal forming position. Thus, an advantage can be obtained that properly reduces the degradation of printed image quality such as 'white streaks' and 'thick streaks' due to 'the banding phenomenon' caused by the 'curved flight phenomenon'.

Moreover, a nozzle with ink discharge deficiency can be identified easily that cannot discharge ink, that is short in an ink discharge amount, and that has too much an ink discharge amount. Therefore, an advantage can be obtained that properly reduces the degradation of printed image quality 'such as 'white streaks' and 'thick streaks' due to 'the banding phenomenon' caused by 'ink discharge deficiency'.

Aspect 5

Furthermore, in the printing apparatus of any one of aspects 1 to 4, a printing apparatus aspect 5, wherein the image data area splitting module performs the splitting process so that a shape of an image portion configured of the image data area and a number of items of pixel data are uniform.

With this configuration, data can be split easily into the image data area in a proper shape and size in accordance with the output resolution of the printed result. Thus, pixels are rearranged in the image data area in such proper shape and size, and an advantage can be obtained that can obtain the printed result of high quality in accordance with resolution and output modes.

Here, for the shape of the image data area, there are various shapes such as a square, a rectangle, a rhombus, and a triangle. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Moreover, as described above, for the method of splitting image data by an image data area with various shapes, there are various splitting schemes such as a method of splitting all the image data into check patterns and houndstooth patterns with a rectangular image data area such as a square and a rectangle. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 6

Furthermore, in the printing apparatus of any one of aspects 1 to 5, a printing apparatus according to aspect 6, wherein the pixel rearranging module performs the rearrangement process so that a pixel of pixel data having a pixel value equal to or greater than a predetermined concentration value is arranged at a center part of an image portion configured of the image data area.

With this configuration, the dot forming descriptions corresponds to the image data area can be formed into a lump of a plurality of dots. Accordingly, an advantage can be obtained that the banding phenomenon caused by curved flight seen macroscopically is made less noticeable.

Here, 'the center part' is an area that is formed of a pixel position at the center of the image data area or a pixel position closest to the center and of areas therearound, for example.

Hereinafter, a scheme to determine a pixel position to be the center of an image portion configured of the image data areas will be described with reference to FIG. 25. As shown in FIG. 25, an image portion configured of the image data areas is 5 pixels×5 pixels of image area. Suppose the coordinates at the upper left corner of the image area are [i,j]=[0,0], the vector of each pixel can be determined in accordance with Equation 1 below.

$$a[i,j]=(i,j) \quad (1)$$

More specifically, by Equation 1, for example, the vector value of pixel a [0,0] at the upper left corner in the image area is (0,0), whereas the vector value of pixel a [4,4] at the lower right corner is (4,4).

In this manner, when the vector value of each pixel in the image area is determined, the center of the image area can be determined by Equation 2 below. However, in Equation 2, N is a pixel row number, and M is a pixel column number.

$$\vec{A} = \frac{1}{N \times M} \sum_{i=0}^{N} \sum_{j=0}^{M} a[i, j] \quad (2)$$

More specifically, as shown in Equation 3, the vector value of each pixel in 5 pixels×5 pixels of image area is substituted into Equation 2, and then the vector value (2,2) of pixel a [2,2] is determined as the center.

$$\vec{A} = \frac{1}{5 \times 5}((0, 0) + (1, 0) + \ldots + (4, 4)) \quad (3)$$
$$= (2.0, 2.0)$$

For the scheme to determine the center pixel, hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 7

Moreover, in the printing apparatus of any one of aspects 1 to 6, a printing apparatus according to aspect 7, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image portion configured of the image data area.

With this configuration, a pixel having a great concentration value is arranged at the center part of the image portion in the image data area. Thus, the dot forming descriptions corresponding to the image data area can be formed as dots in larger size are gathered at the center part. Accordingly, an advantage can be obtained that makes the banding phenomenon due to curved flight less noticeable seen macroscopically.

Aspect 8

Furthermore, in the printing apparatus of any one of aspects 1 to 7, a printing apparatus according to aspect 8, wherein the pixel rearranging module performs the rearrangement process so that a pixel of pixel data having a pixel value equal to or greater than a predetermined concentration value is arranged from a center part of an image portion configured of the image data area toward an outer rim part and rearranged in a decreasing order of concentration values.

With this configuration, the dot forming descriptions corresponding to the image data area can be formed so that dots in larger size are arranged at the center part and the dot size of dots to be arranged is gradually more decreased from the center part toward the outer rim (peripheral) part. Accordingly, an advantage can be obtained that makes the banding phenomenon due to curved flight less noticeable seen macroscopically. In addition, desirably, the dot forming descriptions are that dots are arranged in a decreasing order from larger dots to smaller dots from the center toward the outer rim (peripheral) part as the center position (or therearound) is centered, and consequently a lump of dots (gathered dots) forms nearly a circular shape (a perfect circle, an ellipse, etc.).

Aspect 9

Moreover, in the printing apparatus of any one of aspects 1 to 8, a printing apparatus according to aspect 9, wherein the pixel rearranging module performs the rearrangement process so that in an image portion configured of the image data area, a pixel of a pixel value equal to or greater than a predetermined concentration value is arranged in an oblique direction.

With this configuration, the dot forming descriptions corresponding to the image data area can be formed so that dots are arranged obliquely. Accordingly, an advantage can be obtained that makes the banding phenomenon due to curved flight less noticeable seen macroscopically.

Here, 'the oblique direction' is a direction that is not in parallel with or vertical to the direction of generating banding. In other words, it is a direction that is not in parallel with or vertical to the printing direction. For example, it is a direction near at an angle of 45 degrees in the printing direction. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 10

Furthermore, in the printing apparatus of any one of aspects 1 to 9, a printing apparatus of aspect 10, wherein the pixel rearranging module performs the rearrangement process for each of the image data areas so that adjacent image data areas are each rearranged by a different rearrangement method.

With this configuration, rearrangement can be done for the adjacent image data areas by different rearrangement methods. Therefore, an advantage can be obtained that prevents the degradation of image quality visually recognized by patterns that image portions of the image data area having undergone the same rearrangement method are continuously arranged.

Aspect 11

Moreover, in the printing apparatus of aspect 10, a printing apparatus according to aspect 11, wherein the rearrangement method includes a method of rearranging a defined position of each pixel in the image data area so that the image data area is rotated at a predetermined angle in a random direction.

With this configuration, periodicity of dot patterns corresponding to the same concentrations can be eliminated. Therefore, dot patterns of the same concentration are not arranged in the same directions, and the generation of streaks can be suppressed that is caused by arrangement in the same direction.

Here, the 'defined position' is a position where a pixel is basically rearranged before the rearrangement process. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 12

Furthermore, in the printing apparatus of any one of aspects 1 to 5, a printing apparatus according to aspect 12, wherein the pixel rearranging module performs the rearrangement process so that a pixel of pixel data having a pixel value equal to or greater than a predetermined concentration value is arranged at a center part of an image area configured of a plurality of the adjacent image data areas.

With this configuration, for example, pixels at the corner of an image portion configured of each of the image data areas of a plurality of the adjacent image data areas are gathered to form a pixel cluster, and the pixel cluster is formed at the center part of an image portion configured of each of the image data areas of a plurality of the adjacent image data areas. Thus, the dot forming descriptions corresponding to a plurality of the adjacent image data areas is formed sot that a plurality of dots is in a cluster. Accordingly, an advantage can be obtained that makes the banding phenomenon due to curved flight less noticeable seen macroscopically.

Here, 'the center part' is, for example, an area that is formed of a pixel position of the center of an image area configured of a plurality of the adjacent image data areas (for example, a rectangular image area that is configured of four adjacent rectangular image portions in the same size configured of four image data areas) or a pixel position closest to the center and of areas therearound. In addition, for the computing method of the center, the same methods in FIG. 25 and Equations 1 to 4. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 13

Moreover, in the printing apparatus of aspect 12, a printing apparatus according to aspect 13, wherein the pixel rearranging module sequentially arranges in an image portion configured of each area of a plurality of the adjacent image data areas a pixel of pixel data having a pixel value equal to or greater than a predetermined concentration value from a corner of the image portion of each area.

With this configuration, for example, pixels at the corner of an image portion configured of each of the image data areas of a plurality of the adjacent image data areas are gathered to form a pixel cluster, and the pixel cluster is formed at the center part of an image portion configured of each of the image data areas of a plurality of the adjacent image data areas. Thus, the dot forming descriptions corresponding to a plurality of the adjacent image data areas is formed sot that a plurality of dots is in a cluster. Accordingly, an advantage can be obtained that makes the banding phenomenon due to curved flight less noticeable seen macroscopically.

Aspect 14

Furthermore, in the printing apparatus of aspect 12 or 13, a printing apparatus according to aspect 14, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

With this configuration, pixels having a greater concentration value are arranged at the center part of an image area configured of a plurality of the adjacent image data areas. Thus, the dot forming descriptions corresponding to the image data area can be formed as dots in larger size are gathered at the center part. Accordingly, an advantage can be obtained that makes the banding phenomenon due to curved flight less noticeable seen macroscopically.

Aspect 15

Moreover, in the printing apparatus of any one of aspects 12 to 14, a printing apparatus according to aspect 15, wherein the pixel rearranging module performs the rearrangement process so that a pixel of pixel data having a pixel value equal to or greater than a predetermined concentration value is arranged from a center part of an image area configured of a plurality of the adjacent image data areas toward an outer rim part and rearranged in a decreasing order of concentration values.

With this configuration, the dot forming descriptions corresponding to an image area configured of a plurality of the adjacent image data areas can be formed so that dots in larger size are arranged at the center part and the dot size of dots to be arranged is gradually more decreased from the center part toward the outer rim (peripheral) part. Accordingly, an advantage can be obtained that makes the banding phenomenon due to curved flight less noticeable seen macroscopically. In addition, desirably, the dot forming descriptions are that dots are arranged in a decreasing order from larger dots to smaller dots from the center toward the outer rim (peripheral) part as the center position (or thereabout) is centered, and consequently a lump of dots (gathered dots) forms nearly a circular shape (a perfect circle, an ellipse, etc.).

Aspect 16

Furthermore, in the printing apparatus of aspect 15, a printing apparatus according to aspect 16, wherein the pixel rearranging module performs the rearrangement process so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

With this configuration, in an image portion configured of each of the image data areas of a plurality of the adjacent image data areas, dots in larger size can be arranged at the corner and the dot size of dots to be arranged can be gradually more decreased from the corner toward the center part. Thus, pixels thus rearranged are gathered by the amount of a plurality of the adjacent image data areas to from a pixel cluster, and the pixel cluster is formed at the center part of an image portion configured of each of the image data areas of a plurality of the adjacent image data areas. Therefore, the dot forming descriptions corresponding to a plurality of the adjacent image data areas can be formed in a lump of a plurality of dots. Accordingly, an advantage can be obtained that makes the banding phenomenon due to curved flight less noticeable seen macroscopically.

Aspect 17

Moreover, in the printing apparatus of any one of aspects 12 to 16, a printing apparatus according to aspect 17, wherein the pixel rearranging module performs the rearrangement process so that a pixel of a pixel value equal to or greater than a predetermined concentration value is arranged in an oblique direction at a center part of an image area configured of a plurality of the adjacent image data areas.

With this configuration, the dot forming descriptions of an image area configured of a plurality of the adjacent image data areas can be formed so that dots are arranged obliquely at the center part of the image area. Accordingly, an advantage can be obtained that makes the banding phenomenon due to curved flight less noticeable seen macroscopically.

Aspect 18

Furthermore, in the printing apparatus any one of aspects 1 to 17, a printing apparatus according to aspect 18, wherein the print head is a print head in which the nozzles are continuously arranged across an area equal to or wider than a mounting area of the medium.

With this configuration, as described above, an advantage can be obtained that can create effective printing data to make 'white streaks' and 'thick streaks' due to the banding phenomenon less noticeable, the streaks likely to be generated when a line scan head type print head is used that finishes printing at a so-called single scan (a single path)

Here, 'single scan printing' is that for a single line in the paper feed direction (head moving direction) to be the printing target by each of the nozzles, only a responsible nozzle prints that line, and printing that line is finished when the responsible nozzle once passed. Hereinafter, it is the same in aspects related to 'the printing apparatus control program', aspects related to 'the printing apparatus control method', aspects related to 'the printing data creating apparatus', aspects related to 'the printing data creating program', aspects related to 'the printing data creating method', aspects related to 'the recording medium recorded with the program', the description of exemplary embodiments, and so on.

Aspect 19

Moreover, in the printing apparatus any one of aspects 1 to 17, a printing apparatus according to aspect 19, wherein the print head is a print head that prints as it moves in a direction orthogonal to a paper feed direction of the medium.

The banding phenomenon described above is noticeably seen in the line scan head type print head, but it also occurs in the multipath type print head. Therefore, when any one of printing methods according to the aspects 1 to 17 is adapted to the multipath type print head, an advantage can be obtained that can create printing data effective to make 'white streaks' and 'thick streaks' less noticeable, the streaks are caused by the banding phenomenon generated in the multipath type print head.

Furthermore, in the case of the multipath type print head, a trick is applied in such a way that scans by the print head are repeated to prevent the banding phenomenon. However, when any one of pieces of the printing apparatus according to aspects 1 to 17 is adapted, higher speed printing can also be implemented because it is unnecessary to scan the print head at the same portion for many times.

Aspect 20

On the other hand, in order to achieve the first to third advantages, a printing apparatus control program according to aspect 20 is a printing apparatus control program used to control a printing apparatus which is capable of printing an image on a medium by a print head having a nozzle that is capable of creating dots on a printing medium, the printing apparatus control program including a program used to allow a computer to implement a process including:

acquiring image data having an M-ary value of pixel data ($M \geq 3$) configuring the image;

creating N-ary image data ($M > N \geq 2$) from an M-ary pixel value ($M \geq 3$) expressed by each item of pixel data in the image data;

splitting the N-ary image data into a plurality of the image data areas configured of a predetermined number of items of pixel data;

rearranging a position of a pixel corresponding to each item of pixel data included in each of the image data areas in the N-ary image data at a predetermined position in each of the image data areas;

creating printing data which defines information about dot forming descriptions of each of the nozzles corresponding to the N-ary image data after the rearrangement; and printing the image on the medium by the print head based on the printing data.

With this configuration, the program is read by the computer, the computer performs the process in accordance with the read-program, and then an effect and an advantage can be obtained that are equivalent to those of the printing apparatus according to aspect 1.

Moreover, most of all pieces of the printing apparatus currently commercially available in the market such as the ink jet printer has a computer system formed of a central processing unit (CPU), a memory unit (RAM, ROM), an input/output unit, etc. Since the computer system can be used to implement each module by software, the apparatus can implement each module more economically and easily than the case where exclusive hardware is fabricated to implement each module.

Furthermore, the program is partially rewritten to allow easy upgrade because of renewal and improvement of functions.

Aspect 21

Moreover, in the printing apparatus control program of aspect 20, a printing apparatus control program according to aspect 21 includes a program used to allow a computer to implement a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for all the N-ary image data when it is determined that there is the nozzle that possibly causes degradation at the determining step, and at the pixel rearrangement step, the rearrangement process is done for each of the image data areas after splitting at the image data area splitting step.

With this configuration, the program is read by the computer, the computer performs the process in accordance with the read program, and then an effect and an advantage can be obtained that are equivalent to those of the printing apparatus according to aspect 2.

Aspect 22

Furthermore, in the printing apparatus control program of aspect 20, a printing apparatus control program according to aspect 22 includes a program used to allow a computer to implement a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for pixel data corresponding to the nozzle that possibly causes degradation and nozzles near that nozzle in the N-ary image data when it is determined that there is the nozzle that possibly causes degradation at the determining step, and at the pixel rearrangement step, the rearrangement process is done for each of the image data areas after splitting at the image data area splitting step.

With this configuration, the program is read by the computer, the computer performs the process in accordance with the read program, and then an effect and an advantage can be obtained that are equivalent to those of the printing apparatus according to aspect 3.

Aspect 23

Moreover, in the printing apparatus control program of aspect 21 or 22, a printing apparatus control program according to aspect 23, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

With this configuration, the program is read by the computer, the computer performs the process in accordance with the read program, and then an effect and an advantage can be obtained that are equivalent to those of the printing apparatus according to aspect 4.

Aspect 24

Furthermore, in the printing apparatus control program of any one of aspect 20 to 23, a printing apparatus control program according to aspect 24, wherein at the image data area splitting step, the performs the splitting process is done so that a shape of an image portion configured of the image data area and a number of items of pixel data are uniform.

With this configuration, the program is read by the computer, the computer performs the process in accordance with the read program, and then an effect and an advantage can be obtained that are equivalent to those of the printing apparatus according to aspect 5.

Aspect 25

Moreover, in the printing apparatus control program of any one of aspect 20 to 24, a printing apparatus control program according to aspect 25, wherein the pixel rearrangement step, the rearrangement process is done so that a pixel of pixel data having a pixel value equal to or greater than a predetermined concentration value is arranged at a center part of an image portion configured of the image data area.

With this configuration, the program is read by the computer, the computer performs the process in accordance with the read program, and then an effect and an advantage can be obtained that are equivalent to those of the printing apparatus according to aspect 6.

Aspect 26

Furthermore, in the printing apparatus control program of any one of aspect 20 to 25, a printing apparatus control program according to aspect 26, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image portion configured of the image data area.

With this configuration, the program is read by the computer, the computer performs the process in accordance with the read program, and then an effect and an advantage can be obtained that are equivalent to those of the printing apparatus according to aspect 7.

Aspect 27

Moreover, in the printing apparatus control program of any one of aspect 20 to 26, a printing apparatus control program according to aspect 27, wherein at the pixel rearrangement step, the rearrangement process is done so that a pixel of pixel data having a pixel value equal to or greater than a predetermined concentration value is arranged from a center part of an image portion configured of the image data area toward an outer rim part and rearranged in a decreasing order of concentration values.

With this configuration, the program is read by the computer, the computer performs the process in accordance with the read program, and then an effect and an advantage can be obtained that are equivalent to those of the printing apparatus according to aspect 8.

Aspect 28

Furthermore, in the printing apparatus control program of any one of aspect 20 to 27, a printing apparatus control program according to aspect 28, wherein at the pixel rearrangement step, the rearrangement process is done so that in an image portion configured of the image data area, a pixel of a pixel value equal to or greater than a predetermined concentration value is arranged in an oblique direction.

With this configuration, the program is read by the computer, the computer performs the process in accordance with the read program, and then an effect and an advantage can be obtained that are equivalent to those of the printing apparatus according to aspect 9.

Aspect 29

Moreover, in the printing apparatus control program of any one of aspect 20 to 28, a printing apparatus control program according to aspect 29, wherein at the pixel rearrangement step, the rearrangement process is done so that adjacent image data areas are each rearranged by a different rearrangement method.

With this configuration, the program is read by the computer, the computer performs the process in accordance with the read program, and then an effect and an advantage can be obtained that are equivalent to those of the printing apparatus according to aspect 10.

Aspect 30

Furthermore, in the printing apparatus control program of aspect 29, a printing apparatus control program according to aspect 30, wherein the rearrangement method includes a method of rearranging a defined position of each pixel in the image data area so that the image data area is rotated at a predetermined angle in a random direction.

With this configuration, the program is read by the computer, the computer performs the process in accordance with the read program, and then an effect and an advantage can be obtained that are equivalent to those of the printing apparatus according to aspect 11.

Aspect 31

Moreover, in the printing apparatus control program of any one of aspect 20 to 24, a printing apparatus control program according to aspect 31, wherein at the pixel rearrangement step, the rearrangement process is done so that a pixel of pixel data having a pixel value equal to or greater than a predetermined concentration value is arranged at a center part of an image area configured of a plurality of the adjacent image data areas.

With this configuration, the program is read by the computer, the computer performs the process in accordance with the read program, and then an effect and an advantage can be obtained that are equivalent to those of the printing apparatus according to aspect 12.

Aspect 32

Furthermore, in the printing apparatus control program of aspect 31, a printing apparatus control program according to aspect 32, wherein at the pixel rearrangement step, in an image portion configured of each area of a plurality of the adjacent image data areas, a pixel of pixel data having a pixel value equal to or greater than a predetermined concentration value is sequentially arranged from a corner of the image portion of each area.

With this configuration, the program is read by the computer, the computer performs the process in accordance with the read program, and then an effect and an advantage can be obtained that are equivalent to those of the printing apparatus according to aspect 13.

Aspect 33

Moreover, in the printing apparatus control program of aspect 31 or 32, a printing apparatus control program according to aspect 33, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

With this configuration, the program is read by the computer, the computer performs the process in accordance with the read program, and then an effect and an advantage can be obtained that are equivalent to those of the printing apparatus according to aspect 14.

Aspect 34

Furthermore, in the printing apparatus control program of any one of aspect 31 to 33, a printing apparatus control program according to aspect 34, wherein at the pixel rearrangement step, the rearrangement process is done so that a pixel of pixel data having a pixel value equal to or greater than a predetermined concentration value is arranged from a center part of an image area configured of a plurality of the adjacent image data areas toward an outer rim part and rearranged in a decreasing order of concentration values.

With this configuration, the program is read by the computer, the computer performs the process in accordance with the read program, and then an effect and an advantage can be obtained that are equivalent to those of the printing apparatus according to aspect 15.

Aspect 35

Moreover, in the printing apparatus control program of aspect 34, a printing apparatus control program according to aspect 35, wherein at the pixel rearrangement step, the rearrangement process is done so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

With this configuration, the program is read by the computer, the computer performs the process in accordance with the read program, and then an effect and an advantage can be obtained that are equivalent to those of the printing apparatus according to aspect 16.

Aspect 36

Furthermore, in the printing apparatus control program of any one of aspect 31 to 35, a printing apparatus control program according to aspect 36, wherein at the pixel rearrangement step, the rearrangement process is done so that a pixel of a pixel value equal to or greater than a predetermined concentration value is arranged in an oblique direction at a center part of an image area configured of a plurality of the adjacent image data areas.

With this configuration, the program is read by the computer, the computer performs the process in accordance with the read program, and then an effect and an advantage can be obtained that are equivalent to those of the printing apparatus according to aspect 17.

Aspect 37

On the other hand, in order to achieve the first to third advantages, a computer readable recording medium stored with a printing apparatus control program according to aspect 37 records the printing apparatus of any one of control programs according to aspects 20 to aspect 36.

Accordingly, an effect and an advantage can be obtained similar to those of the printing apparatus of any one of control programs according to aspects 20 to aspect 36, and the printing program can be received and sent easily through the recording medium such as CD-ROM, DVD-ROM, and MO.

Aspect 38

On the other hand, in order to achieve the first to third advantages, a printing apparatus control method according to aspect 38 is a printing apparatus control method used to control a printing apparatus which is capable of printing an image on a medium by a print head having a nozzle that is capable of creating dots on a printing medium, the printing apparatus control method including:

acquiring image data having an M-ary value of pixel data ($M \geq 3$) configuring the image;

creating N-ary image data ($M > N \geq 2$) from an M-ary pixel value ($M \geq 3$) expressed by each item of pixel data in the image data;

splitting the N-ary image data into a plurality of the image data areas configured of a predetermined number of items of pixel data;

rearranging a position of a pixel corresponding to each item of pixel data included in each of the image data areas in the N-ary image data at a predetermined position in each of the image data areas;

creating printing data which defines information about dot forming descriptions of each of the nozzles corresponding to the N-ary image data after the rearrangement; and printing the image on the medium by the print head based on the printing data.

Accordingly, an effect and advantage can be obtained that are the same as those of the printing apparatus according to aspect 1.

Aspect 39

Moreover, in the printing apparatus control method of aspect 38, a printing apparatus control method according to aspect 39 includes a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for all the N-ary image data when it is determined that there is the nozzle that possibly causes degradation at the determining step, and at the pixel rearrangement step, the rearrangement process is done for each of the image data areas after splitting at the image data area splitting step.

19

Accordingly, an effect and advantage can be obtained that are the same as those of the printing apparatus according to aspect 2.

Aspect 40

Furthermore, in the printing apparatus control method of aspect 38, a printing apparatus control method according to aspect 40 includes a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for pixel data corresponding to the nozzle that possibly causes degradation and nozzles near that nozzle in the N-ary image data when it is determined that there is the nozzle that possibly causes degradation at the determining step, and at the pixel rearrangement step, the rearrangement process is done for each of the image data areas after splitting at the image data area splitting step.

Accordingly, an effect and advantage can be obtained that are the same as those of the printing apparatus according to aspect 3.

Aspect 41

Moreover, in the printing apparatus control method of aspect 39 or 40, a printing apparatus control method according to aspect 41, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

Accordingly, an effect and advantage can be obtained that are the same as those of the printing apparatus according to aspect 4.

Aspect 42

Furthermore, in the printing apparatus control method of any one of aspects 38 to 41, a printing apparatus control method according to aspect 42, wherein at the image data area splitting step, the performs the splitting process is done so that a shape of an image portion configured of the image data area and a number of items of pixel data are uniform.

Accordingly, an effect and advantage can be obtained that are the same as those of the printing apparatus according to aspect 5.

Aspect 43

Moreover, in the printing apparatus control method of any one of aspects 38 to 42, a printing apparatus control method according to aspect 43, wherein at the pixel rearrangement step, the rearrangement process is done so that a pixel of pixel data having a pixel value equal to or greater than a predetermined concentration value is arranged at a center part of an image portion configured of the image data area.

Accordingly, an effect and advantage can be obtained that are the same as those of the printing apparatus according to aspect 6.

Aspect 44

Furthermore, in the printing apparatus control method of any one of aspects 38 to 43, a printing apparatus control method according to aspect 44, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image portion configured of the image data area.

20

Accordingly, an effect and advantage can be obtained that are the same as those of the printing apparatus according to aspect 7.

Aspect 45

Moreover, in the printing apparatus control method of any one of aspects 38 to 44, a printing apparatus control method according to aspect 45, wherein at the pixel rearrangement step, the rearrangement process is done so that a pixel of pixel data having a pixel value equal to or greater than a predetermined concentration value is arranged from a center part of an image portion configured of the image data area toward an outer rim part and rearranged in a decreasing order of concentration values.

Accordingly, an effect and advantage can be obtained that are the same as those of the printing apparatus according to aspect 8.

Aspect 46

Furthermore, in the printing apparatus control method of any one of aspects 38 to 45, a printing apparatus control method according to aspect 46, wherein at the pixel rearrangement step, the rearrangement process is done so that in an image portion configured of the image data area, a pixel of a pixel value equal to or greater than a predetermined concentration value is arranged in an oblique direction.

Accordingly, an effect and advantage can be obtained that are the same as those of the printing apparatus according to aspect 9.

Aspect 47

Moreover, in the printing apparatus control method of any one of aspects 38 to 46, a printing apparatus control method according to aspect 47, wherein at the pixel rearrangement step, the rearrangement process is done so that adjacent image data areas are each rearranged by a different rearrangement method.

Accordingly, an effect and advantage can be obtained that are the same as those of the printing apparatus according to aspect 10.

Aspect 48

Furthermore, in the printing apparatus control method of aspect 47, a printing apparatus control method according to aspect 48, wherein the rearrangement method includes a method of rearranging a defined position of each pixel in the image data area so that the image data area is rotated at a predetermined angle in a random direction.

Accordingly, an effect and advantage can be obtained that are the same as those of the printing apparatus according to aspect 11.

Aspect 49

Moreover, in the printing apparatus control method of any one of aspects 38 to 42, a printing apparatus control method according to aspect 49, wherein at the pixel rearrangement step, the rearrangement process is done so that a pixel of pixel data having a pixel value equal to or greater than a predetermined concentration value is arranged at a center part of an image area configured of a plurality of the adjacent image data areas.

Accordingly, an effect and advantage can be obtained that are the same as those of the printing apparatus according to aspect 12.

Aspect 50

Furthermore, in the printing apparatus control method of aspect 49, a printing apparatus control method according to aspect 50, wherein at the pixel rearrangement step, in an image portion configured of each area of a plurality of the adjacent image data areas, a pixel of pixel data having a pixel value equal to or greater than a predetermined concentration value is sequentially arranged from a corner of the image portion of each area.

Accordingly, an effect and advantage can be obtained that are the same as those of the printing apparatus according to aspect 13.

Aspect 51

Moreover, in the printing apparatus control method of aspect 49 or 50, a printing apparatus control method according to aspect 51, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

Accordingly, an effect and advantage can be obtained that are the same as those of the printing apparatus according to aspect 14.

Aspect 52

Furthermore, in the printing apparatus control method of any one of aspect 49 to 51, a printing apparatus control method according to aspect 52, wherein at the pixel rearrangement step, the rearrangement process is done so that a pixel of pixel data having a pixel value equal to or greater than a predetermined concentration value is arranged from a center part of an image area configured of a plurality of the adjacent image data areas toward an outer rim part and rearranged in a decreasing order of concentration values.

Accordingly, an effect and advantage can be obtained that are the same as those of the printing apparatus according to aspect 15.

Aspect 53

Moreover, in the printing apparatus control method of aspect 52, a printing apparatus control method according to aspect 53, wherein at the pixel rearrangement step, the rearrangement process is done so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

Accordingly, an effect and advantage can be obtained that are the same as those of the printing apparatus according to aspect 16.

Aspect 54

Furthermore, in the printing apparatus control method of any one of aspect 49 to 53, a printing apparatus control method according to aspect 54, wherein at the pixel rearrangement step, the rearrangement process is done so that a pixel of a pixel value equal to or greater than a predetermined concentration value is arranged in an oblique direction at a center part of an image area configured of a plurality of the adjacent image data areas.

Accordingly, an effect and advantage can be obtained that are the same as those of the printing apparatus according to aspect 17.

Aspect 55

On the other hand, in order to achieve the first to third advantages, a printing data creating apparatus according to aspect 55 is a printing data creating apparatus which creates printing data used in a printing apparatus which is capable of printing an image on a medium by a print head having a nozzle that is capable of creating dots on a printing medium, the printing data creating apparatus including:

an image data acquiring module that acquires image data having an M-ary value of pixel data (M≧3) configuring the image;

an N-ary image data creating module that creates N-ary image data (M>N≧2) from an M-ary pixel value (M≧3) expressed by each item of pixel data in the image data;

an image data area splitting module that splits the N-ary image data into a plurality of image data areas configured of a predetermined number of items of pixel data;

a pixel rearranging module that rearranges a position of a pixel corresponding to each item of pixel data included in each of the image data areas in the N-ary image data at a predetermined position in each of the image data areas; and a printing data creating module that creates printing data which defines information about dot forming descriptions of each of the nozzles corresponding to the N-ary image data after the rearrangement.

More specifically, this aspect does not include the printing module that actually implements printing as the printing apparatus, but it creates printing data in accordance with the properties of the print head based on the original M-ary image data (M≧3).

Therefore, it can obtain an effect and an advantage the same as those of the printing apparatus according to aspect 1. Also, for example, this configuration is feasible that printing data created in this aspect is only sent to the printing apparatus to implement a printing process in the printing apparatus. With this configuration, the existing printing apparatus of the ink jet printing method can be used as it is without preparing an exclusive printing apparatus.

Moreover, since a general-purpose information processor such as a personal computer can be used, the existing printing system formed of a print instructing unit such as a personal computer and the ink jet printer can be utilized as it is.

Aspect 56

Furthermore, in the printing data creating apparatus of aspect 55, a printing data creating apparatus according to aspect 56 includes:

a nozzle property information storing module that stores nozzle property information showing properties of each of the nozzles; and a determining module that determines whether there is a nozzle that possibly causes degradation of printed image quality among nozzles for use in printing the image data based on the nozzle property information, wherein the image data area splitting module the splitting process for all the N-ary image data when it is determined that there is a nozzle that possibly causes degradation by the determining module, and the pixel rearranging module performs the rearrangement process for each of the image data areas after splitting by the image data area splitting module.

Accordingly, an effect and an advantage can be obtained that are similar to those of the printing apparatus according to aspect 2.

Aspect 57

Moreover, in the printing data creating apparatus of aspect 55, a printing data creating apparatus according to aspect 57 includes:

a nozzle property information storing module that stores nozzle property information showing properties of each of the nozzles; and a determining module that determines whether there is a nozzle that possibly causes degradation of printed image quality among nozzles for use in printing the image data based on the nozzle property information, wherein the image data area splitting module performs the splitting process for pixel data corresponding to a nozzle that possibly causes degradation and nozzles near that nozzle in the N-ary image data when it is determined that there is a nozzle that possibly causes degradation by the determining module, and the pixel rearranging module performs the rearrangement process for each of the image data areas after splitting by the image data area splitting module.

Accordingly, an effect and an advantage can be obtained that are similar to those of the printing apparatus according to aspect 3.

Aspect 58

Furthermore, in the printing data creating apparatus of aspect 56 or 57, a printing data creating apparatus according to aspect 58, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

Accordingly, an effect and an advantage can be obtained that are similar to those of the printing apparatus according to aspect 4.

Aspect 59

Furthermore, in the printing data creating apparatus of any one of aspect 55 to 58, wherein in a printing data creating apparatus according to aspect 59 the image data area splitting module performs the splitting process so that a shape of an image portion configured of the image data area and a number of items of pixel data are uniform.

Accordingly, an effect and an advantage can be obtained that are similar to those of the printing apparatus according to aspect 5.

Aspect 60

Moreover, in the printing data creating apparatus of any one of aspect 55 to 59, a printing data creating apparatus according to aspect 60, wherein the pixel rearranging module performs the rearrangement process so that a pixel of pixel data having a pixel value equal to or greater than a predetermined concentration value is arranged at a center part of an image portion configured of the image data area.

Accordingly, an effect and an advantage can be obtained that are similar to those of the printing apparatus according to aspect 6.

Aspect 61

Furthermore, in the printing data creating apparatus of any one of aspect 55 to 60, a printing data creating apparatus according to aspect 61, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image portion configured of the image data area.

Accordingly, an effect and an advantage can be obtained that are similar to those of the printing apparatus according to aspect 7.

Aspect 62

Moreover, in the printing data creating apparatus of any one of aspect 55 to 61, a printing data creating apparatus according to aspect 62, wherein the pixel rearranging module performs the rearrangement process so that a pixel of pixel data having a pixel value equal to or greater than a predetermined concentration value is arranged from a center part of an image portion configured of the image data area toward an outer rim part and rearranged in a decreasing order of concentration values.

Accordingly, an effect and an advantage can be obtained that are similar to those of the printing apparatus according to aspect 8.

Aspect 63

Furthermore, in the printing data creating apparatus of any one of aspect 55 to 62, a printing data creating apparatus according to aspect 63, wherein the pixel rearranging module performs the rearrangement process so that in an image portion configured of the image data area, a pixel of a pixel value equal to or greater than a predetermined concentration value is arranged in an oblique direction.

Accordingly, an effect and an advantage can be obtained that are similar to those of the printing apparatus according to aspect 9.

Aspect 64

Moreover, in the printing data creating apparatus of any one of aspect 55 to 63, a printing data creating apparatus according to aspect 64, wherein the pixel rearranging module performs the rearrangement process for each of the image data areas so that adjacent image data areas are each rearranged by a different rearrangement method.

Accordingly, an effect and an advantage can be obtained that are similar to those of the printing apparatus according to aspect 10.

Aspect 65

Furthermore, in the printing data creating apparatus of aspect 64, a printing data creating apparatus according to aspect 65, wherein the rearrangement method includes a method of rearranging a defined position of each pixel in the image data area so that the image data area is rotated at a predetermined angle in a random direction.

Accordingly, an effect and an advantage can be obtained that are similar to those of the printing apparatus according to aspect 11.

Aspect 66

Moreover, in the printing data creating apparatus of any one of aspect 55 to 59, a printing data creating apparatus according to aspect 66, wherein the pixel rearranging module performs the rearrangement process so that a pixel of pixel data having a pixel value equal to or greater than a predetermined concentration value is arranged at a center part of an image area configured of a plurality of the adjacent image data areas.

Accordingly, an effect and an advantage can be obtained that are similar to those of the printing apparatus according to aspect 12.

Aspect 67

Furthermore, in the printing data creating apparatus of aspect 66, a printing data creating apparatus according to aspect 67, wherein the pixel rearranging module sequentially arranges in an image portion configured of each area of a plurality of the adjacent image data areas a pixel of pixel data having a pixel value equal to or greater than a predetermined concentration value from a corner of the image portion of each area.

Accordingly, an effect and an advantage can be obtained that are similar to those of the printing apparatus according to aspect 13.

Aspect 68

Moreover, in the printing data creating apparatus of aspect 66 or 67, a printing data creating apparatus according to aspect 68, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

Accordingly, an effect and an advantage can be obtained that are similar to those of the printing apparatus according to aspect 14.

Aspect 69

Furthermore, in the printing data creating apparatus of any one of aspects 66 to 68, a printing data creating apparatus according to aspect 69, wherein the pixel rearranging module performs the rearrangement process so that a pixel of pixel data having a pixel value equal to or greater than a predetermined concentration value is arranged from a center part of an image area configured of a plurality of the adjacent image data areas toward an outer rim part and rearranged in a decreasing order of concentration values.

Accordingly, an effect and an advantage can be obtained that are similar to those of the printing apparatus according to aspect 15.

Aspect 70

Moreover, in the printing data creating apparatus of aspect 69, a printing data creating apparatus according to aspect 70, wherein the pixel rearranging module performs the rearrangement process so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

Accordingly, an effect and an advantage can be obtained that are similar to those of the printing apparatus according to aspect 16.

Aspect 71

Furthermore, in the printing data creating apparatus of any one of aspects 66 to 70, a printing data creating apparatus according to aspect 71, wherein the pixel rearranging module performs the rearrangement process so that a pixel of a pixel value equal to or greater than a predetermined concentration value is arranged in an oblique direction at a center part of an image area configured of a plurality of the adjacent image data areas.

Accordingly, an effect and an advantage can be obtained that are similar to those of the printing apparatus according to aspect 17.

Aspect 72

On the other hand, in order to achieve the first to third advantages, a printing data creating program according to aspect 72 is a printing data creating program which creates printing data used in a printing apparatus which is capable of printing an image on a medium by a print head having a nozzle that is capable of creating dots on a printing medium, the printing data creating program including a program used to allow a computer to implement a process including:

acquiring image data having an M-ary value of pixel data ($M \geq 3$) configuring the image;

creating N-ary image data ($M > N \geq 2$) from an M-ary pixel value ($M \geq 3$) expressed by each item of pixel data in the image data;

splitting the N-ary image data into a plurality of the image data areas configured of a predetermined number of items of pixel data;

rearranging a position of a pixel corresponding to each item of pixel data included in each of the image data areas in the N-ary image data at a predetermined position in each of the image data areas; and creating printing data which defines information about dot forming descriptions of each of the nozzles corresponding to the N-ary image data after the rearrangement.

With this configuration, the program is read by the computer, the computer performs the process in accordance with the read program, and then an effect and an advantage can be obtained that are equivalent to those of the printing data creating apparatus according to aspect 55.

Aspect 73

Moreover, in the printing data creating program of aspect 72, a printing data creating program according to aspect 73 includes a program used to allow a computer to implement a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for all the N-ary image data when it is determined that there is the nozzle that possibly causes degradation at the determining step, and at the pixel rearrangement step, the rearrangement process is done for each of the image data areas after splitting at the image data area splitting step.

With this configuration, the program is read by the computer, the computer performs the process in accordance with the read program, and then an effect and an advantage can be obtained that are equivalent to those of the printing data creating apparatus according to aspect 56.

Aspect 74

Furthermore, in the printing data creating program of aspect 72, a printing data creating program according to aspect 74 includes a program used to allow a computer to implement a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for pixel data corresponding to the nozzle that possibly causes degradation and nozzles near that nozzle in the N-ary image data when it is determined that there is the nozzle that possibly causes degradation at the determining step, and at the pixel rearrangement step, the rearrangement process is done for each of the image data areas after splitting at the image data area splitting step.

With this configuration, the program is read by the computer, the computer performs the process in accordance with the read program, and then an effect and an advantage can be obtained that are equivalent to those of the printing data creating apparatus according to aspect 57.

Aspect 75

Moreover, in the printing data creating program of aspect 73 or 74, a printing data creating program according to aspect 75, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

With this configuration, the program is read by the computer, the computer performs the process in accordance with the read program, and then an effect and an advantage can be obtained that are equivalent to those of the printing data creating apparatus according to aspect 58.

Aspect 76

Furthermore, in the printing data creating program of any one of aspects 72 to 75, a printing data creating program according to aspect 76, wherein at the image data area splitting step, the performs the splitting process is done so that a shape of an image portion configured of the image data area and a number of items of pixel data are uniform.

With this configuration, the program is read by the computer, the computer performs the process in accordance with the read program, and then an effect and an advantage can be obtained that are equivalent to those of the printing data creating apparatus according to aspect 59.

Aspect 77

Moreover, in the printing data creating program of any one of aspects 72 to 76, a printing data creating program according to aspect 77, wherein at the pixel rearrangement step, the rearrangement process is done so that a pixel of pixel data having a pixel value equal to or greater than a predetermined concentration value is arranged at a center part of an image portion configured of the image data area.

With this configuration, the program is read by the computer, the computer performs the process in accordance with the read program, and then an effect and an advantage can be obtained that are equivalent to those of the printing data creating apparatus according to aspect 60.

Aspect 78

Furthermore, in the printing data creating program of any one of aspects 72 to 77, a printing data creating program according to aspect 78, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image portion configured of the image data area.

With this configuration, the program is read by the computer, the computer performs the process in accordance with the read program, and then an effect and an advantage can be obtained that are equivalent to those of the printing data creating apparatus according to aspect 61.

Aspect 79

Moreover, in the printing data creating program of any one of aspects 72 to 78, a printing data creating program according to aspect 79, wherein at the pixel rearrangement step, the rearrangement process is done so that a pixel of pixel data having a pixel value equal to or greater than a predetermined concentration value is arranged from a center part of an image portion configured of the image data area toward an outer rim part and rearranged in a decreasing order of concentration values.

With this configuration, the program is read by the computer, the computer performs the process in accordance with the read program, and then an effect and an advantage can be obtained that are equivalent to those of the printing data creating apparatus according to aspect 62.

Aspect 80

Furthermore, in the printing data creating program of any one of aspects 72 to 79, a printing data creating program according to aspect 80, wherein at the pixel rearrangement step, the rearrangement process is done so that in an image portion configured of the image data area, a pixel of a pixel value equal to or greater than a predetermined concentration value is arranged in an oblique direction.

With this configuration, the program is read by the computer, the computer performs the process in accordance with the read program, and then an effect and an advantage can be obtained that are equivalent to those of the printing data creating apparatus according to aspect 63.

Aspect 81

Moreover, in the printing data creating program of any one of aspects 72 to 80, a printing data creating program according to aspect 81, wherein at the pixel rearrangement step, the rearrangement process is done so that adjacent image data areas are each rearranged by a different rearrangement method.

With this configuration, the program is read by the computer, the computer performs the process in accordance with the read program, and then an effect and an advantage can be obtained that are equivalent to those of the printing data creating apparatus according to aspect 64.

Aspect 82

Furthermore, in the printing data creating program of aspect 81, a printing data creating program according to aspect 82, wherein the rearrangement method includes a method of rearranging a defined position of each pixel in the image data area so that the image data area is rotated at a predetermined angle in a random direction.

With this configuration, the program is read by the computer, the computer performs the process in accordance with the read program, and then an effect and an advantage can be obtained that are equivalent to those of the printing data creating apparatus according to aspect 65.

Aspect 83

Moreover, in the printing data creating program of any one of aspects 72 to 76, a printing data creating program according to aspect 83, wherein at the pixel rearrangement step, the rearrangement process is done so that a pixel of pixel data having a pixel value equal to or greater than a predetermined concentration value is arranged at a center part of an image area configured of a plurality of the adjacent image data areas.

With this configuration, the program is read by the computer, the computer performs the process in accordance with the read program, and then an effect and an advantage can be obtained that are equivalent to those of the printing data creating apparatus according to aspect 66.

Aspect 84

Furthermore, in the printing data creating program of aspect 83, a printing data creating program according to aspect 84, wherein at the pixel rearrangement step, in an image portion configured of each area of a plurality of the adjacent image data areas, a pixel of pixel data having a pixel value equal to or greater than a predetermined concentration value is sequentially arranged from a corner of the image portion of each area.

With this configuration, the program is read by the computer, the computer performs the process in accordance with the read program, and then an effect and an advantage can be obtained that are equivalent to those of the printing data creating apparatus according to aspect 67.

Aspect 85

Moreover, in the printing data creating program of aspect 83 or 84, a printing data creating program according to aspect 85, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

With this configuration, the program is read by the computer, the computer performs the process in accordance with the read program, and then an effect and an advantage can be obtained that are equivalent to those of the printing data creating apparatus according to aspect 68.

Aspect 86

Furthermore, in the printing data creating program of any one of aspects 83 to 85, a printing data creating program according to aspect 86, wherein at the pixel rearrangement step, the rearrangement process is done so that a pixel of pixel data having a pixel value equal to or greater than a predetermined concentration value is arranged from a center part of an image area configured of a plurality of the adjacent image data areas toward an outer rim part and rearranged in a decreasing order of concentration values.

With this configuration, the program is read by the computer, the computer performs the process in accordance with the read program, and then an effect and an advantage can be obtained that are equivalent to those of the printing data creating apparatus according to aspect 69.

Aspect 87

Moreover, in the printing data creating program of aspect 86, a printing data creating program according to aspect 87, wherein at the pixel rearrangement step, the rearrangement process is done so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

With this configuration, the program is read by the computer, the computer performs the process in accordance with the read program, and then an effect and an advantage can be obtained that are equivalent to those of the printing data creating apparatus according to aspect 70.

Aspect 88

Furthermore, in the printing data creating program of any one of aspects 83 to 87, a printing data creating program according to aspect 88, wherein at the pixel rearrangement step, the rearrangement process is done so that a pixel of a pixel value equal to or greater than a predetermined concentration value is arranged in an oblique direction at a center part of an image area configured of a plurality of the adjacent image data areas.

With this configuration, the program is read by the computer, the computer performs the process in accordance with the read program, and then an effect and an advantage can be obtained that are equivalent to those of the printing data creating apparatus according to aspect 71.

Aspect 89

On the other hand, in order to achieve the first to third advantages, a computer readable recording medium recorded with the printing data creating program according to aspect 89 records any one of printing data creating programs of aspect 71 to aspect 88.

Accordingly, an effect and an advantage can be obtained that are similar to those of any one of printing data creating programs according to aspects 72 to 88, and the printing program can be received and sent easily through the recording medium such as CD-ROM, DVD-ROM, and FD (flexible disk).

Aspect 90

On the other hand, in order to achieve the first to third advantages, a printing data creating method according to aspect 90 is a printing data creating method which creates printing data used in a printing apparatus which is capable of printing an image on a medium by a print head having a nozzle that is capable of creating dots on a printing medium, the printing data creating method including:

acquiring image data having an M-ary value of pixel data ($M \geq 3$) configuring the image;

creating N-ary image data ($M > N \geq 2$) from an M-ary pixel value ($M \geq 3$) expressed by each item of pixel data in the image data;

splitting the N-ary image data into a plurality of the image data areas configured of a predetermined number of items of pixel data;

rearranging a position of a pixel corresponding to each item of pixel data included in each of the image data areas in the N-ary image data at a predetermined position in each of the image data areas; and creating printing data which defines information about dot forming descriptions of each of the nozzles corresponding to the N-ary image data after the rearrangement.

Accordingly, an effect and an advantage can be obtained that are equivalent to those of the printing data creating apparatus according to aspect 55.

Aspect 91

Moreover, in the printing data creating method of aspect 90, a printing data creating method according to aspect 91 includes a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for all the N-ary image data when it is determined that there is the nozzle that possibly causes degradation at the determining step, and at the pixel rearrangement step, the rearrangement process is done for each of the image data areas after splitting at the image data area splitting step.

Accordingly, an effect and an advantage can be obtained that are equivalent to those of the printing data creating apparatus according to aspect 56.

Aspect 92

Furthermore, in the printing data creating method of aspect 90, a printing data creating method according to aspect 92 includes a determining step that determines whether there is a nozzle that possibly causes degradation of printed image quality among nozzles for use in printing the image data based on nozzle property information showing properties of each of the nozzles stored in nozzle property information storing module, wherein at the image data area splitting step, the splitting process is done for pixel data corresponding to the nozzle that possibly causes degradation and nozzles near that nozzle in the N-ary image data when it is determined that there is the nozzle that possibly causes degradation at the determining step, and at the pixel rearrangement step, the rearrangement process is done for each of the image data areas after splitting at the image data area splitting step.

Accordingly, an effect and an advantage can be obtained that are equivalent to those of the printing data creating apparatus according to aspect 57.

Aspect 93

Moreover, in the printing data creating method of aspect 91 or 92, a printing data creating method according to aspect 93, wherein the nozzle property information includes at least one of information about a position shift between an actual position of the dot formed by each of the nozzles on the medium and an ideal dot forming position of that dot, and discharge deficiency information showing a presence of ink discharge deficiency in each of the nozzles.

Accordingly, an effect and an advantage can be obtained that are equivalent to those of the printing data creating apparatus according to aspect 58.

Aspect 94.

Furthermore, in the printing data creating method of any one of aspects 90 to 93, a printing data creating method according to aspect 94, wherein at the image data area splitting step, the performs the splitting process is done so that a shape of an image portion configured of the image data area and a number of items of pixel data are uniform.

Accordingly, an effect and an advantage can be obtained that are equivalent to those of the printing data creating apparatus according to aspect 59.

Aspect 95

Moreover, in the printing data creating method of any one of aspects 90 to 94, a printing data creating method according to aspect 95, wherein at the pixel rearrangement step, the rearrangement process is done so that a pixel of pixel data having a pixel value equal to or greater than a predetermined concentration value is arranged at a center part of an image portion configured of the image data area.

Accordingly, an effect and an advantage can be obtained that are equivalent to those of the printing data creating apparatus according to aspect 60.

Aspect 96

Furthermore, in the printing data creating method of any one of aspects 90 to 95, a printing data creating method according to aspect 96, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image portion configured of the image data area.

Accordingly, an effect and an advantage can be obtained that are equivalent to those of the printing data creating apparatus according to aspect 61.

Aspect 97

Moreover, in the printing data creating method of any one of aspects 90 to 96, a printing data creating method according to aspect 97, wherein at the pixel rearrangement step, the rearrangement process is done so that a pixel of pixel data having a pixel value equal to or greater than a predetermined concentration value is arranged from a center part of an image portion configured of the image data area toward an outer rim part and rearranged in a decreasing order of concentration values.

Accordingly, an effect and an advantage can be obtained that are equivalent to those of the printing data creating apparatus according to aspect 62.

Aspect 98

Furthermore, in the printing data creating method of any one of aspects 90 to 97, a printing data creating method according to aspect 98, wherein at the pixel rearrangement step, the rearrangement process is done so that in an image portion configured of the image data area, a pixel of a pixel value equal to or greater than a predetermined concentration value is arranged in an oblique direction.

Accordingly, an effect and an advantage can be obtained that are equivalent to those of the printing data creating apparatus according to aspect 63.

Aspect 99

Moreover, in the printing data creating method of any one of aspects 90 to 98, a printing data creating method according to aspect 99, wherein at the pixel rearrangement step, the rearrangement process is done so that adjacent image data areas are each rearranged by a different rearrangement method.

Accordingly, an effect and an advantage can be obtained that are equivalent to those of the printing data creating apparatus according to aspect 64.

Aspect 100

Furthermore, in the printing data creating method of aspect 99, a printing data creating method according to aspect 100, wherein the rearrangement method includes a method of rearranging a defined position of each pixel in the image data area so that the image data area is rotated at a predetermined angle in a random direction.

Accordingly, an effect and an advantage can be obtained that are equivalent to those of the printing data creating apparatus according to aspect 65.

Aspect 101

Moreover, in the printing data creating method of any one of aspects 90 to 94, a printing data creating method according to aspect 101, wherein the rearrangement method includes a method of rearranging a defined position of each pixel in the image data area so that the image data area is rotated at a predetermined angle in a random direction.

Accordingly, an effect and an advantage can be obtained that are equivalent to those of the printing data creating apparatus according to aspect 66.

Aspect 102

Furthermore, in the printing data creating method of aspect 101, a printing data creating method according to aspect 102, wherein at the pixel rearrangement step, in an image portion configured of each area of a plurality of the adjacent image data areas, a pixel of pixel data having a pixel value equal to or greater than a predetermined concentration value is sequentially arranged from a corner of the image portion of each area.

Accordingly, an effect and an advantage can be obtained that are equivalent to those of the printing data creating apparatus according to aspect 67.

Aspect 103

Moreover, in the printing data creating method of aspect 101 or 102, a printing data creating method according to aspect 103, wherein at the pixel rearrangement step, the arrangement process is done so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

Accordingly, an effect and an advantage can be obtained that are equivalent to those of the printing data creating apparatus according to aspect 68.

Aspect 104

Furthermore, in the printing data creating method of any one of aspects 101 to 103, a printing data creating method according to aspect 104, wherein at the pixel rearrangement step, the rearrangement process is done so that a pixel of pixel data having a pixel value equal to or greater than a predetermined concentration value is arranged from a center part of an image area configured of a plurality of the adjacent image data areas toward an outer rim part and rearranged in a decreasing order of concentration values.

Accordingly, an effect and an advantage can be obtained that are equivalent to those of the printing data creating apparatus according to aspect 69.

Aspect 105

Moreover, in the printing data creating method of aspect 104, a printing data creating method according to aspect 105, wherein at the pixel rearrangement step, the rearrangement process is done so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

Accordingly, an effect and an advantage can be obtained that are equivalent to those of the printing data creating apparatus according to aspect 70.

Aspect 106

Furthermore, in the printing data creating method of any one of aspects 101 to 105, a printing data creating method according to aspect 106, wherein at the pixel rearrangement step, the rearrangement process is done so that a pixel of a pixel value equal to or greater than a predetermined concentration value is arranged in an oblique direction at a center part of an image area configured of a plurality of the adjacent image data areas.

Accordingly, an effect and an advantage can be obtained that are equivalent to those of the printing data creating apparatus according to aspect 71.

Aspect 107

On the other hand, in order to achieve the first to third advantages, a printing apparatus according to aspect 107 is a printing apparatus which is capable of printing an image on a medium by a print head having a nozzle that is capable of creating dots on a printing medium, the printing apparatus including:

an image data acquiring module that acquires image data having an M-ary value of pixel data (M≧3) configuring the image;

an image data area splitting module that splits the image data into a plurality of image data areas configured of a predetermined number of items of pixel data;

a pixel rearranging module that rearranges a position of a pixel corresponding to each item of pixel data included in each of the image data areas in the image data at a predetermined position in each of the image data areas;

an N-ary image data creating module that creates N-ary image data (M>N≧2) from an M-ary pixel value (M≧3) expressed by each item of pixel data in the image data the rearrangement;

a printing data creating module that creates printing data which defines information about dot forming descriptions of each of the nozzles corresponding to the N-ary image data; and a printing module that prints the image on the medium by the print head based on the printing data.

With this configuration, the image data acquiring module can acquire image data having an M-ary value of pixel data (M≧3) configuring the image, the image data area splitting module can split the image data into a plurality of image data areas configured of a predetermined number of items of pixel data, the pixel rearranging module can rearrange a position of a pixel corresponding to each item of pixel data included in each of the image data areas in the image data at a predetermined position in each of the image data areas, the N-ary image data creating module can create N-ary image data (M>N≧2) from an M-ary pixel value (M≧3) expressed by each item of pixel data in the image data the rearrangement, the printing data creating module can create printing data which defines information about dot forming descriptions of each of the nozzles corresponding to the N-ary image data, and the printing module can print the image on the medium by the print head based on the printing data.

Therefore, image data is split into a plurality of the image data areas in the shape and size that are unlikely to impair the details of an image even though pixels are rearranged, and each pixel in each of the image data areas before rearrangement is rearranged at a proper position in the image portion of the image data area.

Thus, an advantage can be obtained that can reduce the degradation of image quality generated in the printed result because, for example, of 'the banding phenomenon' mainly caused by nozzle properties such as 'the curved flight phenomenon' due to ink discharge deficiency in a nozzle and a nozzle that a dot forming position is shifted from an ideal position, and of 'the banding phenomenon' caused by the γ-properties of a dot formed by a nozzle.

Aspect 108

On the other hand, in order to achieve the first to third advantages, a printing apparatus control program according to aspect 108 is a printing apparatus control program used to control a printing apparatus which is capable of printing an image on a medium by a print head having a nozzle that is capable of creating dots on a printing medium, the printing apparatus control program including a program used to allow a computer to implement a process including:

acquiring image data having an M-ary value of pixel data (M≧3) configuring the image;

splitting the image data into a plurality of the image data areas configured of a predetermined number of items of pixel data;

rearranging a position of a pixel corresponding to each item of pixel data included in each of the image data areas in the image data at a predetermined position in each of the image data areas;

creating N-ary image data (M>N≧2) from an M-ary pixel value (M≧3) expressed by each item of pixel data in the image data after the rearrangement;

creating printing data which defines information about dot forming descriptions of each of the nozzles corresponding to the N-ary image data; and printing the image on the medium by the print head based on the printing data.

With this configuration, the program is read by the computer, the computer performs the process in accordance with the read program, and then an effect and an advantage can be obtained that are equivalent to those of the printing apparatus according to aspect 107.

Aspect 109

On the other hand, in order to achieve the first to third advantages, a printing apparatus control method according to aspect 109 is a printing apparatus control method used to control a printing apparatus which is capable of printing an image on a medium by a print head having a plurality of nozzles that is capable of creating dots on a printing medium, the printing apparatus control method including:

acquiring image data having an M-ary value of pixel data (M≧3) configuring the image;

splitting the image data into a plurality of the image data areas configured of a predetermined number of items of pixel data;

rearranging a position of a pixel corresponding to each item of pixel data included in each of the image data areas in the image data at a predetermined position in each of the image data areas;

creating N-ary image data (M>N≧2) from an M-ary pixel value (M≧3) expressed by each item of pixel data in the image data after the rearrangement;

creating printing data which defines information about dot forming descriptions of each of the nozzles corresponding to the N-ary image data; and printing the image on the medium by the print head based on the printing data.

Accordingly, an effect and an advantage can be obtained that are equivalent to those of the printing apparatus according to aspect 107.

Aspect 110

On the other hand, in order to achieve the first to third advantages, a printing data creating apparatus according to aspect 110 is a printing data creating apparatus which creates printing data used in a printing apparatus which is capable of printing an image on a medium by a print head having a nozzle that is capable of creating dots on a printing medium, the printing data creating apparatus including:

an image data acquiring module that acquires image data having an M-ary value of pixel data (M≧3) configuring the image;

an image data area splitting module that splits the image data into a plurality of image data areas configured of a predetermined number of items of pixel data;

a pixel rearranging module that rearranges a position of a pixel corresponding to each item of pixel data included in each of the image data areas in the image data at a predetermined position in each of the image data areas;

an N-ary image data creating module that creates N-ary image data (M>N≧2) from an M-ary pixel value (M≧3) expressed by each item of pixel data in the image data the rearrangement; and a printing data creating module that creates printing data which defines information about dot forming descriptions of each of the nozzles corresponding to the N-ary image data.

More specifically, this aspect does not include the printing module that actually implements printing as the printing apparatus, but it creates printing data in accordance with the properties of the print head based on the original M-ary image data (M≧3).

Therefore, it can obtain an effect and an advantage the same as those of the printing apparatus according to aspect 107. Also, for example, this configuration is feasible that printing data created in this aspect is only sent to the printing apparatus to implement a printing process in the printing apparatus. With this configuration, the existing printing apparatus of the ink jet printing method can be used as it is without preparing an exclusive printing apparatus.

Moreover, since a general-purpose information processor such as a personal computer can be used, the existing printing system formed of a print instructing unit such as a personal computer and the ink jet printer can be utilized as it is.

Aspect 111

On the other hand, in order to achieve the first to third advantages, a printing apparatus control program according to aspect 111 is a printing data creating program which creates printing data used in a printing apparatus which is capable of printing an image on a medium by a print head having a nozzle that is capable of creating dots on a printing medium, the printing data creating program including a program used to allow a computer to implement a process including:

acquiring image data having an M-ary value of pixel data (M≧3) configuring the image;

splitting the image data into a plurality of the image data areas configured of a predetermined number of items of pixel data;

rearranging a position of a pixel corresponding to each item of pixel data included in each of the image data areas in the image data at a predetermined position in each of the image data areas;

creating N-ary image data (M>N≧2) from an M-ary pixel value (M≧3) expressed by each item of pixel data in the image data after the rearrangement; and creating printing data which defines information about dot forming descriptions of each of the nozzles corresponding to the N-ary image data.

With this configuration, the program is read by the computer, the computer performs the process in accordance with the read program, and then an effect and an advantage can be obtained that are equivalent to those of the printing data creating apparatus according to aspect 110.

Aspect 112

On the other hand, in order to achieve the first to third advantages, a printing apparatus control method according to aspect 112 is a printing data creating method which creates printing data used in a printing apparatus which is capable of printing an image on a medium by a print head having a nozzle that is capable of creating dots on a printing medium, the printing data creating method including:

acquiring image data having an M-ary value of pixel data (M≧3) configuring the image;

splitting the image data into a plurality of the image data areas configured of a predetermined number of items of pixel data;

rearranging a position of a pixel corresponding to each item of pixel data included in each of the image data areas in the image data at a predetermined position in each of the image data areas;

creating N-ary image data (M>N≧2) from an M-ary pixel value (M≧3) expressed by each item of pixel data in the image data after the rearrangement; and creating printing data which defines information about dot forming descriptions of each of the nozzles corresponding to the N-ary image data.

Accordingly, an effect and an advantage can be obtained that are equivalent to those of the printing data creating apparatus according to aspect 110.

BRIEF DESCRIPTION OF THE DRAWINGS

The invention will be described with reference to the accompanying drawings, wherein like numbers reference like elements.

FIGS. 11A and 11B are diagrams illustrating exemplary check patterns that an N-ary image is split into even-sized rectangular areas, and FIGS. 11C and 11D are diagrams illustrating exemplary houndstooth patterns that an N-ary image is split into even sized rectangular areas.

FIG. 15 is a diagram illustrating the presence of discharge deficiency (in the drawing, no discharge) to each of nozzles.

FIG. 16A is a diagram illustrating absolute discharge accuracy information (an amount of curved flight information) for each of nozzles, and FIG. 16B is a diagram illustrating relative discharge accuracy information for each of nozzles.

FIGS. 19A and 19B are diagrams illustrating an exemplary pixel value rearrangement rule, FIG. 19C is a diagram illustrating an exemplary arrangement of dot patterns (pixel values) corresponds to an image data area, FIG. 19D is a diagram illustrating an exemplary rearrangement that the dot patterns (pixel values) in FIG. 19C are rearranged in a decreasing order of dot size by the rearrangement rule in FIG. 19A, and FIG. 19E is a diagram illustrating an exemplary rearrangement that the dot patterns (pixel values) in FIG. 19C are rearranged in a decreasing order of dot size by the rearrangement rule in FIG. 19B.

FIGS. 24A to 24D are diagrams illustrating an exemplary rearrangement pattern that a defined arrangement pattern is rotated at a predetermined angle in a random direction.

FIG. 25 is a diagram illustrating an exemplary configuration of an image portion configuring image data areas.

DESCRIPTION OF EXEMPLARY EMBODIMENTS

First Embodiment

Hereinafter, a first embodiment according to the invention will be described wit reference to the drawings. FIGS. 1 to 13 are diagrams illustrating a first embodiment of a printing apparatus, a printing apparatus control program, a printing apparatus control method, a printing data creating apparatus, a printing data creating program, and a printing data creating method according to the invention.

Figure 1:
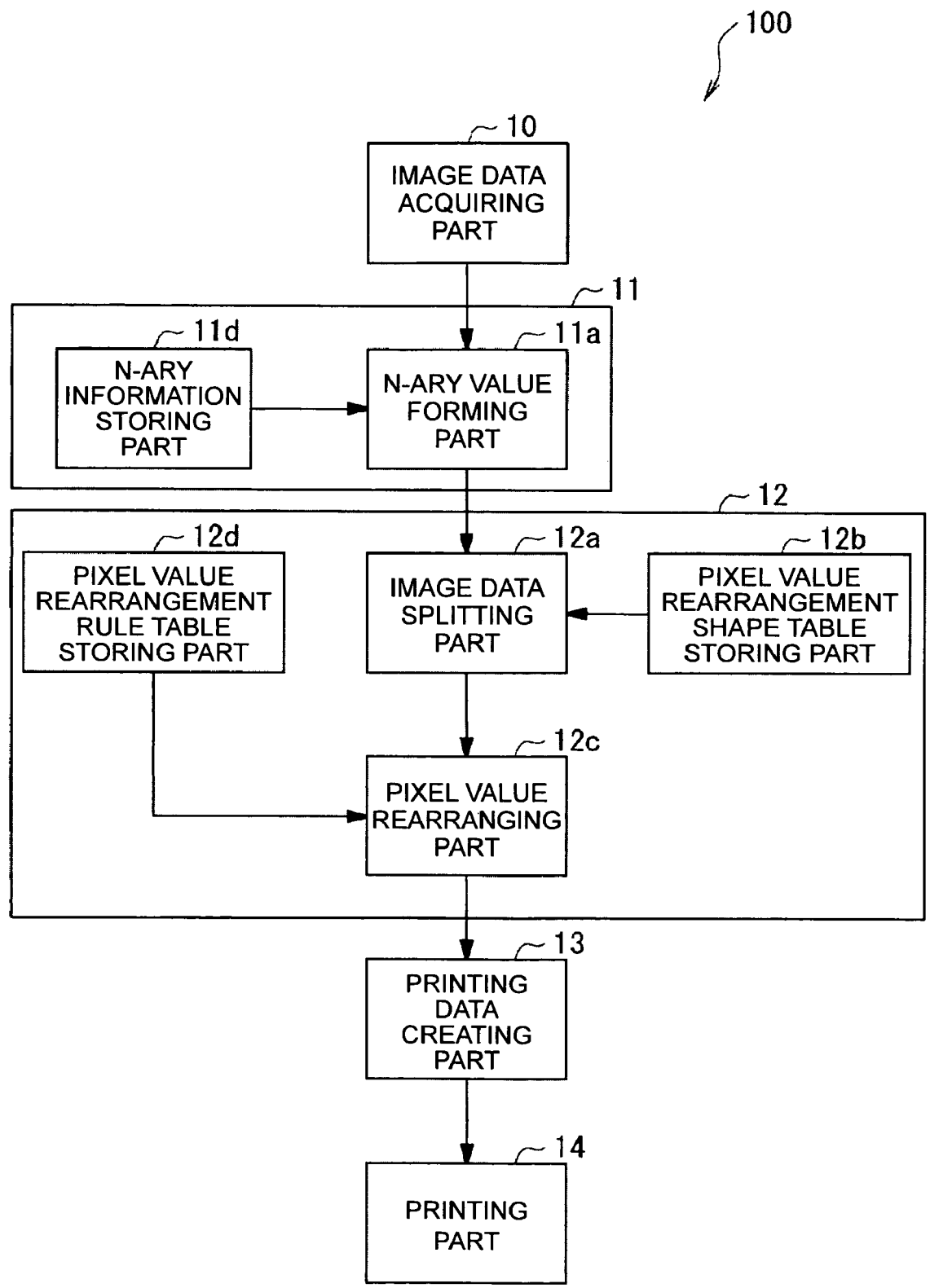
FIG. 1 is a block diagram illustrating the configuration of a printing apparatus according to the invention.

First, the configuration of a printing apparatus 100 according to the invention will be described with reference to FIG. 1. FIG. 1 is a block diagram illustrating the configuration of the printing apparatus 100 according to the invention.

The printing apparatus 100 is a line scan head type printing apparatus. As shown in FIG. 1, the apparatus is configured to include an image data acquiring part 10 which acquires M-ary image data ($M \geq 3$) from an external unit or a storage medium; an N-ary processing part 11 which conducts an N-ary formation process ($M > N \geq 2$) with respect to image data acquired from the image data acquiring part 10 to create N-ary image data; a pixel value rearrangement processing part 12 which splits N-ary image data into a plurality of image data areas formed of a predetermined number of items of pixel data in accordance with a pixel value rearrangement shape table, and rearranges pixel values in the image data area for each of the image data areas; and in a printing part 13, described later, a printing data creating part 13 which creates printing data for printing an image of image data on a printing medium (for example, printing paper) from N-ary image data after rearranged; and the printing part 14 which prints the image of image data on a printing medium by an ink jet printing method based on printing data.

For example, the image data acquiring part 10 has a function that acquires M-ary image data (in this case, $256 \geq M \geq 3$) that the gray scale (brightness value) for each color (R, G, B) per pixel is expressed by eight bits (0 to 255). It acquires this image data from an external unit through a network such as LAN and WAN, from a recording medium such as CD-ROM and DVD-ROM through a drive unit such as a CD drive and a DVD drive held by that apparatus, not shown, and from a memory unit 70 held by that apparatus, described later. Furthermore, it also exerts a function that color converts M-ary RGB data and converts it to M-ary CMYK data (when four colors) corresponding to each ink of the print head 200.

The printing data creating part 11 is configured to include an N-ary value forming part 11a, and an N-ary information storing part 11b.

The N-ary value forming part 11a selects a predetermined item of pixel data from image data that is CMYK-color converted, and creates N-ary image data that the selected predetermined item of pixel data (hereinafter, it is called selected pixel data) is formed in an N-ary value based on an n-ary threshold after N-ary formation matched with the dot forming size of a nozzle, a dot number matched with each dot forming size, and a pixel value (for example, a brightness value) matched with each dot number, which are included in N-ary information read out of the N-ary information storing part 11b.

Here, N-ary formation is a process that M-ary image data ($M \geq 3$) (having M types of pixel values (pixel data)) is transformed to N-ary data ($M > N \geq 2$) (having N types of numerics). For example, in the case of binarization, the pixel value to be transformed is transformed to any one of two types of numerics set beforehand in such a way that the pixel value to be transformed is compared with the threshold, and it is transformed to numeric '1' when it is equal to or greater than the threshold value, whereas it is transformed to numeric '0' when it is smaller than the threshold value. Therefore, in the case of N-ary formation, an M-ary pixel value is compared with N types of thresholds, and the pixel value is transformed to any one of N types of numerics set beforehand in accordance with the compared result.

As described above, the N-ary information storing part 11*b* stores N-ary information including an n-ary threshold after N-ary formation matched with the dot forming size of a nozzle, a dot number matched with each dot forming size, and a pixel value (for example, a brightness value) matched with each dot number.

The pixel value rearrangement processing part 12 is configured to include an image data splitting part 12*a*, a pixel value rearrangement shape table storing part 12*b*, a pixel value rearranging part 12*c*, and a pixel value rearrangement rule table storing part 12*d*.

The image data splitting part 12*a* splits N-ary image data created at the N-ary processing part 11 into a plurality of image data areas in a predetermined shape and a predetermined size based on a pixel value rearrangement shape table stored in the pixel value rearrangement shape table storing part 12*b*.

The pixel value rearrangement shape table storing part 12*b* stores a table formed of information showing multiple types of splitting schemes (hereinafter, it is called pixel value rearrangement shape information) when an image of N-ary image data (hereinafter, N-ary image) is split into image data areas in a predetermined shape and a predetermined size. Here, for example, for the splitting scheme, it is done in such ways that an N-ary image is split into check patterns of a plurality of rectangular areas formed of 5 pixels×5 pixels, and that an N-ary image is split into houndstooth patterns of a plurality of rectangular areas similarly as described above. In addition, pixel value rearrangement shape information includes information about the size and the shape of each of image data areas, and splitting schemes how an N-ary image is split into image data areas in the size and the shape, and these items of information have various types in accordance with resolutions of an image outputted as a printed result.

The pixel value rearranging part 12*c* rearranges pixel values of pixel data corresponding to the image data area for each of the image data areas split at the image data splitting part 12*a* based on the pixel value rearrangement rule table stored in the pixel value rearrangement rule table storing part 12*d*. In the embodiment, the pixel value rearrangement rule table includes information about multiple types of rearrangement rules, and the pixel values of pixel data configuring each of the image data areas are rearranged using a rearrangement rule selected at random from multiple types of rearrangement rules for each of the image data areas.

Here, more specifically, rearrangement of pixel values is a process that positions of forming pixels corresponding to the values of each item of pixel data (values after an N-ary formation process) in each of the image data areas are reconfigured in accordance with the rearranging order of each pixel and the rearrangement position of each pixel specified by rearrangement rule information based on a rearrangement rule information selected from the pixel value rearrangement rule table.

The pixel value rearrangement rule table storing part 12*d* stores a pixel value rearrangement rule table that is information table showing a rearrangement rule for pixel values. Here, the pixel value rearrangement rule table includes multiple types of items of rearrangement rule information showing rearrangement rules, that is, by what scheme the current positions of each item of pixel data configuring image data areas are changed.

The printing data creating part 13 creates printing data relating whether a dot of a predetermined color and a predetermined size is formed or no dot is formed for each item of pixel data in that N-ary image data from N-ary image data that pixel values corresponding to each of the image data areas are rearranged.

Figure 3:
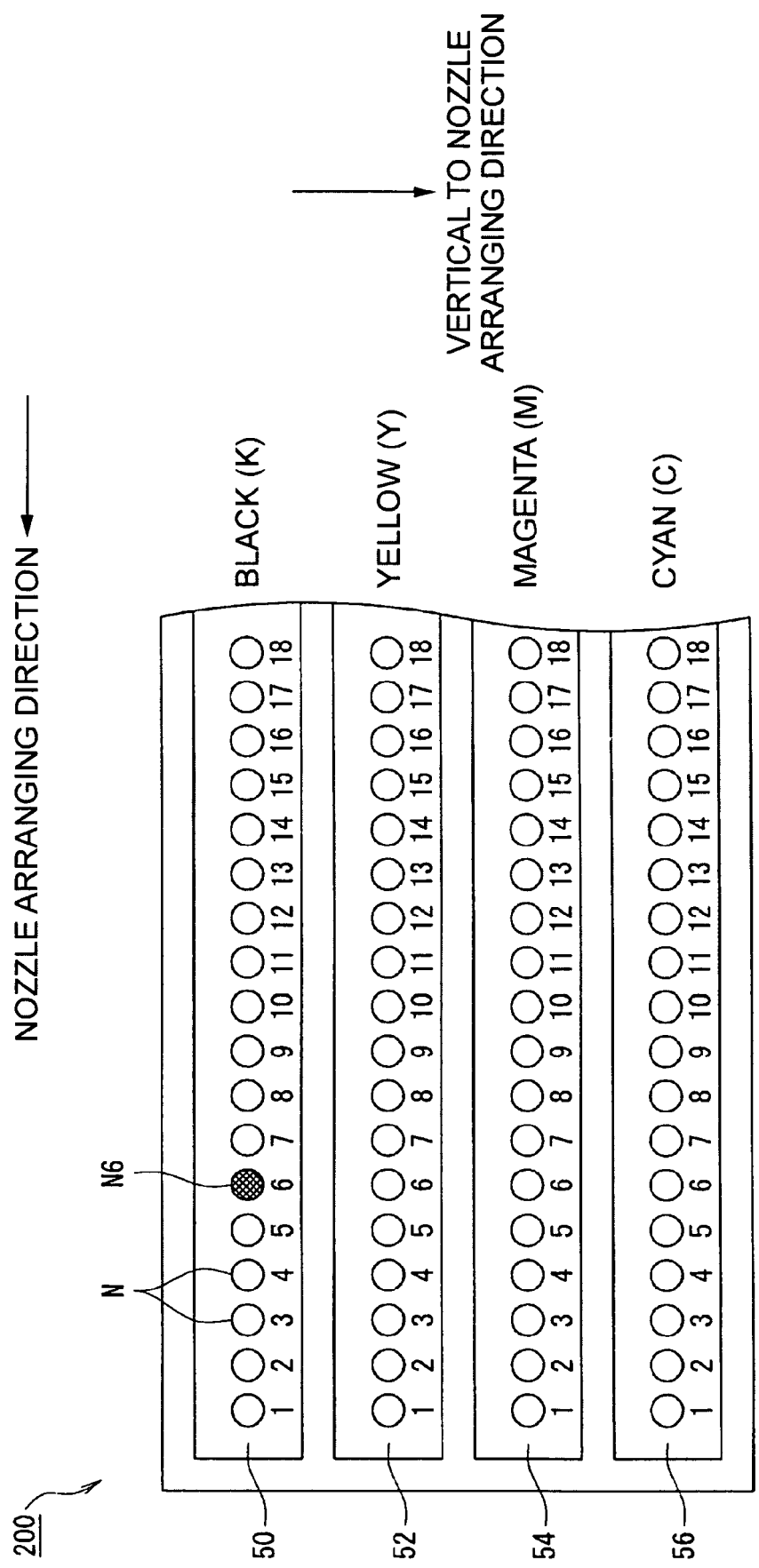
FIG. 3 is a partially enlarged bottom view illustrating the structure of a print head according to the invention.
Figure 4:
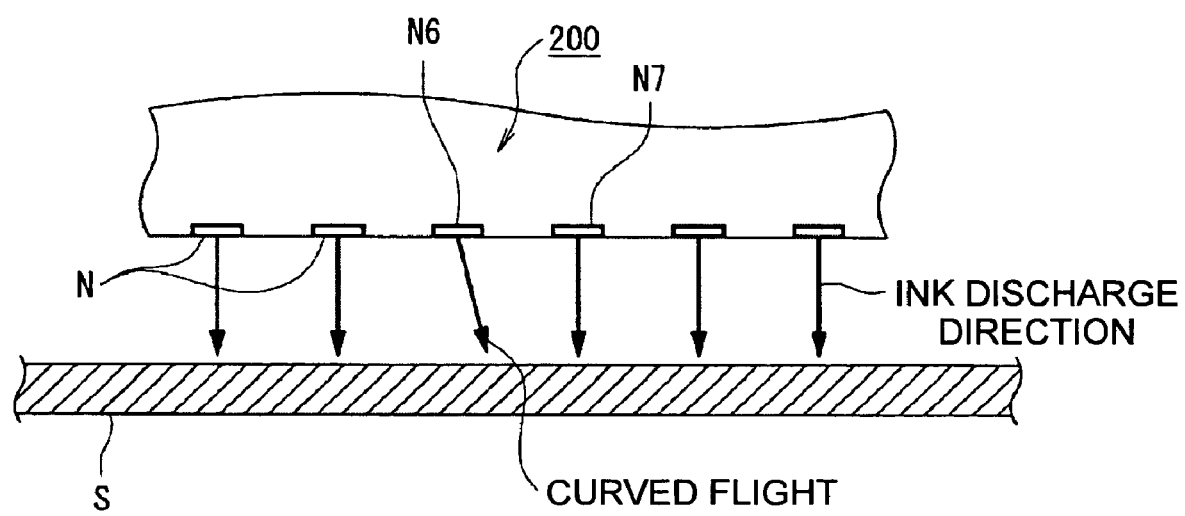
FIG. 4 is a partially enlarged side view of FIG. 3.

Here, FIG. 3 is a partially enlarged bottom view illustrating the structure of the print head 200 according to the invention, and FIG. 4 is a partially enlarged side view thereof.

As shown in FIG. 3, the print head 200 is configured to include four nozzle modules 50, 52, 54 and 56: the black nozzle module 50 having a plurality of nozzles N (18 nozzles in the drawing)) exclusively discharging black (K) ink linearly arranged in the nozzle arranging direction, the yellow nozzle module 52 having a plurality of nozzles N exclusively discharging yellow (Y) ink similarly linearly arranged in the nozzle arranging direction, the magenta nozzle module 54 having a plurality of nozzles N exclusively discharging magenta (M) ink similarly linearly arranged in the nozzle arranging direction, and the cyan nozzle module 56 having a plurality of nozzles N exclusively discharging cyan (M) ink similarly linearly arranged in the nozzle arranging direction. Then, the nozzle modules 50, 52, 54 and 56 are configured to be arranged integrally so that each of the nozzles N with the same number in these four nozzle modules is linearly arranged in the printing direction (the direction vertical to the nozzle arranging direction) as shown in FIG. 3. Thus, a plurality of the nozzles N that configure each of the nozzle modules is linearly arranged in the nozzle arranging direction, and each of the nozzles N with the same number in these four nozzle modules is linearly arranged in the printing direction.

Furthermore, the print head 200 in this structure discharges ink supplied into an ink chamber, not shown, which is disposed at each of nozzles N1, N2, N3 and so on, from each of the nozzles N1, N2, N3 and so on by a piezo-electric device such as a piezo-electric device (piezo actuator), not shown, which is disposed at each ink chamber and prints circular dots on white printing paper as well as controls voltage applied to the piezo-electric device in multi-stage to control the ink discharge amount of the ink chamber and allows printing dots varied in size at each of the nozzles N1, N2, N3 and so on. Besides, a single dot may be configured in which voltage is applied to a nozzle in two steps for a short time in a time series and two discharges are combined on printing paper. In this case, because a discharge rate is varied depending on dot size, this is utilized to discharge a large dot after a small dot to put ink at almost the same positions on paper for a single much larger dot.

Moreover, FIG. 4 depicts the state that the sixth nozzle N6 from left of the black nozzle module 50 among the four nozzle modules 50, 52, 54 and 56 has the curved flight phenomenon in which ink is discharged from the nozzle N6 onto printing medium S in the oblique direction, and thus a dot is formed on the printing medium S at the position near a dot discharged from normal nozzle N7 adjacent to the nozzle N6 and formed on the printing medium S.

The printing part 13 is a printer of the ink jet printing method in which ink is injected in dots from the nozzle modules 50, 52, 54 and 56 formed in the print head 200 onto the printing medium S to form an image formed of multiple dots while one or both of the printing medium S and the print head 200 shown in FIG. 4 are moving. In addition to the print head 200 described above, it is configured of a print head feed mechanism (in the case of the multipath type), not shown, which reciprocates the print head 200 over the printing medium S in the width direction, a paper feed mechanism, not shown, which moves the printing medium (paper) S, a print control mechanism, not shown, which controls ink discharge in the print head 200 based on the printing data described above, etc.

Figure 2:
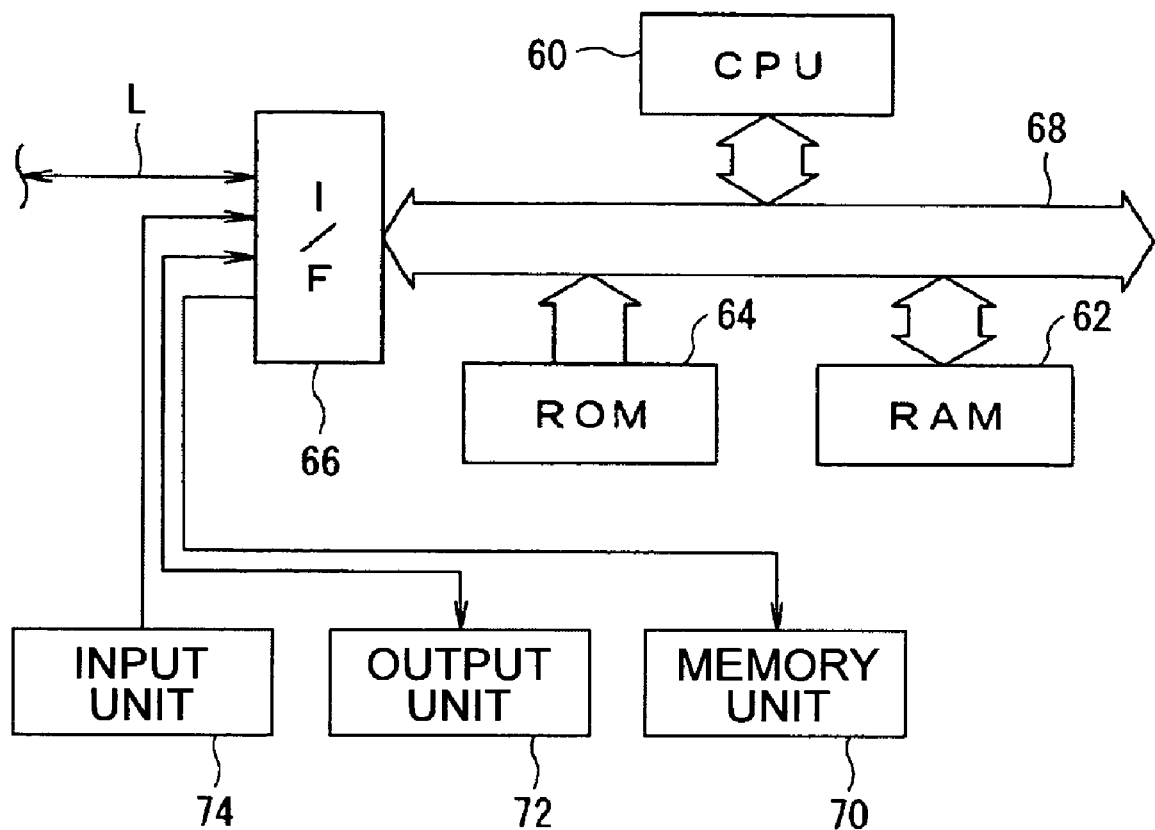
FIG. 2 is a diagram illustrating the hardware configuration of a computer system.

In addition, the printing apparatus 100 has a computer system which implements each function described above on software in the image data acquiring part 10, the N-ary processing part 11, the pixel value rearranging part 12, the printing data creating part 13, the printing part 14, etc., and runs software to control hardware necessary to implement each function. As shown in FIG. 2, the hardware configuration of the computer system has a CPU (Central Processing Unit) 60 which is a central processor that conducts various control and computing processes, RAM (Random Access Memory) 62 which configures a main storage, ROM (Read Only Memory) 64 which is a read-only memory unit, and various internal and external buses 68 formed of PCI (Peripheral Component Interconnect) bus, ISA (Industrial standard Architecture) bus, etc., which connect the devices above. To the buses 68, an external a (Secondary storage) 70 such as HDD, the printing part 14, an output unit 72 such as CRT and a LCD monitor, an input unit 74 such as an operation panel, a mouse, a keyboard, and a scanner, and a network cable L which communicates with a print instructing unit, not shown, are connected through an input/output interface (I/F) 66.

Then, when the power is turned on, a system program such as BIOS stored in the ROM 64 loads to the RAM 62 various exclusive computer programs stored in the ROM 64 beforehand and various exclusive computer programs installed in the memory unit 70 through a storage medium such as CD-ROM, DVD-ROM, and a flexible disk (FD), or through a communication network such as the Internet. In accordance with instructions described in the programs loaded in the RAM 62, the CPU 60 uses various resources to conduct predetermined control and computing processes to implement each function described above on software.

Figure 5:
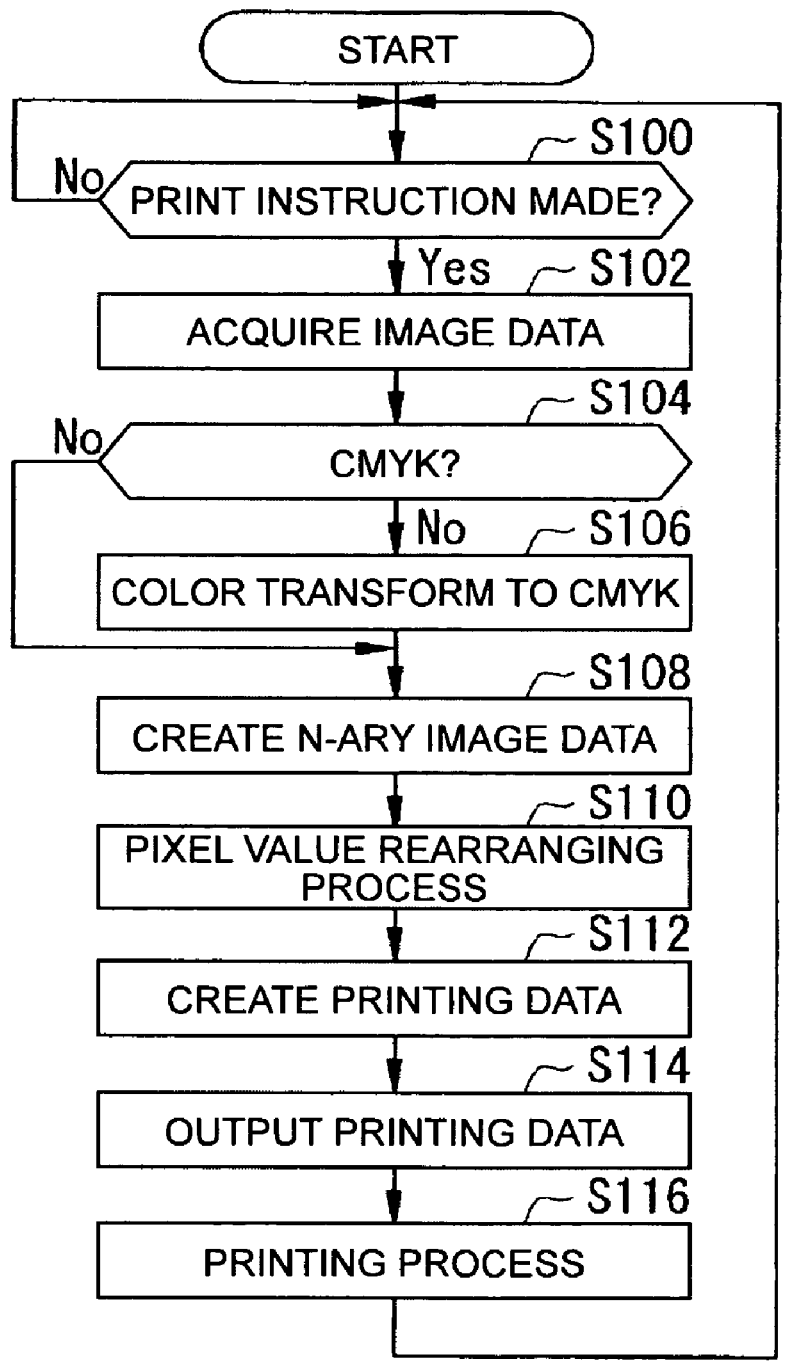
FIG. 5 is a flow chart illustrating a printing process in the printing apparatus.

Furthermore, the printing apparatus 100 permits the CPU 60 to activate a predetermined program stored in a predetermined area in the ROM 64 to run a printing process shown in a flow chart in FIG. 5 in accordance with that program. In addition, as described above, the print head 200 which generates dots can form multiple colors of dots in generally four colors and six colors nearly at the same time. However, in the examples below, in convenience for easy explanation, a dot is described as it is generated by a single color print head 200 (monochrome image).

FIG. 5 is a flow chart illustrating a printing process in the printing apparatus 100.

As shown in FIG. 5, when the CPU 60 runs the printing process, it moves to Step S100.

At Step S100, at the image data acquiring part 10, print instruction information is sent from the external unit connected through the network cable L, or print instruction information is inputted through the input unit 74 to determine whether a print instruction is made. When it is determined that the print instruction is made (Yes), the process moves to Step S102, otherwise (No) the determination process is repeated until the print instruction is made.

When the process moves to Step S102, at the image data acquiring part 10, image data corresponding to the print instruction is acquired from the external unit, the recording medium such as CD-ROM, DVD-ROM, and memory unit 70 such as HDD as described above. Thus, it is determined whether image data is acquired. When it is determined that image data is acquired (Yes), the process moves to Step S104, otherwise (No) a response is made to a source print instruction that printing is not allowed, and then the printing process for that print instruction is cancelled, moving to Step S100. Here, image data is data that is configured to arrange a plurality of items of M-ary pixel data in a matrix. Its row direction is matched with the nozzle arranging direction of the print head 200, and its column direction is matched with the printing direction of the print head 200.

When the process moves to step S104, at the image data acquiring part 10, it is determined whether M-ary image data acquired at step S102 is image data having CMYK color information. When it is determined that it is image data having CMYK color information (Yes), the process moves to step S108, otherwise (No) image data acquired at step S102 is transmitted to the N-ary processing part 11 to move to step S106.

When the process moves to step S106, image data acquired at step S102 is converted to image data having CMYK color information (hereinafter, CMYK image data), CMYK image data and is transmitted to the N-ary value forming part 11a to move to step S108.

At step S108, at the N-ary value forming part 11a, M-ary CMYK image data acquired from the image data acquiring part 10 undergoes the N-ary formation process based on N-ary information stored in the N-ary information storing part 11b to create N-ary image data, and the created N-ary image data is transmitted to the pixel value rearrangement processing part 12 to move to step S110.

At step S110, at the pixel value rearrangement processing part 12, N-ary image data acquired from the N-ary processing part 11 undergoes the pixel value rearrangement process, and pixel value N-ary image data after rearranged is transmitted to the printing data creating part 13 to move to step S112.

At step S112, at the printing data creating part 13, printing data is created from N-ary image data after rearrangement of pixel values acquired from the pixel value rearrangement processing part 12 to move to step S114.

At Step S114, at the printing data creating part 13, printing data created at Step S112 is outputted to the printing part 14, moving to Step S116.

At Step S116, at the printing part 14, a printing process is run based on printing data from the printing data creating part 13, moving to Step S100.

Next, the pixel value rearrangement process at step S110 will be described in detail with reference to FIG. 6.

Figure 6:
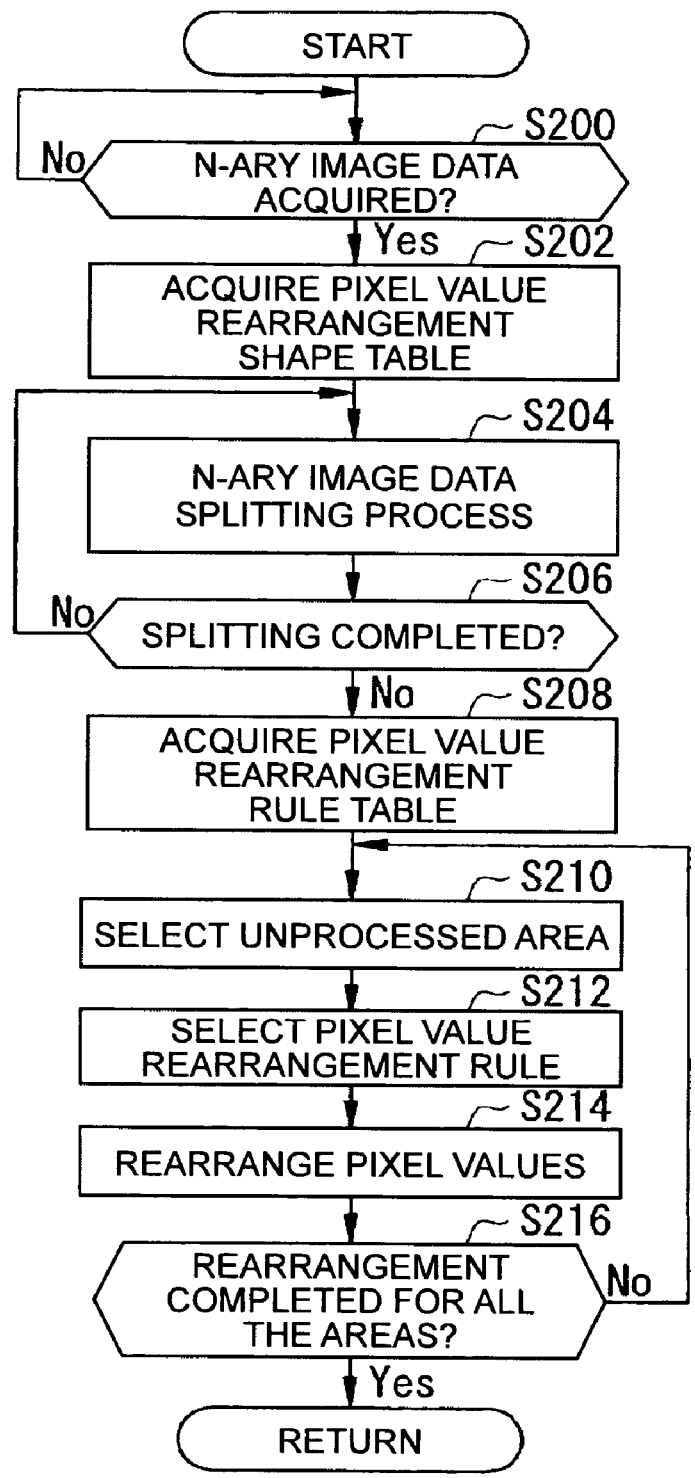
FIG. 6 is a flow chart illustrating a pixel value rearrangement process in a printing apparatus of a first embodiment.

FIG. 6 is a flow chart illustrating the pixel value rearrangement process in the printing apparatus 100.

The pixel value rearrangement process is a process that splits N-ary image data into a plurality of image data areas and reconfigures positions of forming pixels corresponding to the image data areas for each of the image data areas based on a rearrangement rule selected from the pixel value rearrangement rule table. When the process is run at step S110, the process first moves to step S200 as shown in FIG. 6.

At step S200, at the image data splitting part 12a, it is determined whether N-ary image data is acquired from the N-ary processing part 11. When it is determined that it is acquired (Yes), the process moves to step S202, otherwise (No) the determination process is continued until it is acquired.

When the process moves to step S202, at the image data splitting part 12a, the pixel value rearrangement shape table is read out of the pixel value rearrangement shape table storing part 12b to store it in a predetermined area in the RAM 62, and the pixel value rearrangement shape table is acquired to move to step S204.

At step S204, at the image data splitting part 12a, a predetermined item of pixel value rearrangement shape information is selected from multiple types of items of pixel value rearrangement shape information registered in the pixel value rearrangement shape table acquired at step S202. A process that splits N-ary image data acquired at step S200 into a plurality of image data areas based on the selected pixel value rearrangement shape information to move to step S206. Here, pixel value rearrangement shape information is information that defines the split shape, split size, and splitting schemes when an image configuring N-ary image data (dot patterns in the printed result) is split into a plurality of image portions (dot pattern portions) in a predetermined shape and a predetermined size. For example, as described above, information such as a rectangular shape for the split shape, 5 pixels×5 pixels for split size, a houndstooth pattern for a splitting scheme is included.

At step S206, at the pixel value rearranging part 12c, it is determined whether the splitting process for N-ary image data is completed at the image data splitting part 12a. When it is determined that it is completed (Yes), the process moves to step S208, otherwise (No) the process moves to step S204 to continue splitting process.

At step S208, the pixel value rearranging part 12c, the pixel value rearrangement rule table is read out of the pixel value rearrangement rule table storing part 12d to store it in a predetermined area in the RAM 62, and the pixel value rearrangement table is acquired to move to step S210.

At step S210, at the pixel value rearranging part 12c, an image data area that does not undergo the pixel value rearrangement process is selected from N-ary image data split into a plurality of the image data areas to move to step S212.

At step S212, at the pixel value rearranging part 12c, a predetermined pixel value rearrangement rule is selected from multiple types of pixel value rearrangement rules registered in the pixel value rearrangement rule table acquired at step S208, and the process moves to step S214. Here, in the embodiment, for the method of selecting pixel value rearrangement rules, there are various methods in such ways that it is selected by a defined order among multiple types of rules depending on image properties, that it is selected at random, and that a particular one is selected.

At step S214, at the pixel value rearranging part 12c, the pixel values of the image data areas selected step S210 (hereinafter, the selected image data area) are rearranged based on the pixel value rearrangement rule selected at step S212, and the process moves to step S216.

At step S216, at the pixel value rearranging part 12c, it is determined whether all the image data areas undergo the pixel value rearrangement process. When it is determined that they undergo (Yes), a series of processes is completed to return to the original process, otherwise (No) the process moves to step S210 to continue the pixel value rearrangement process.

Next, the operation of the embodiment will be described with reference to FIGS. 7 to 13.

Figure 7:
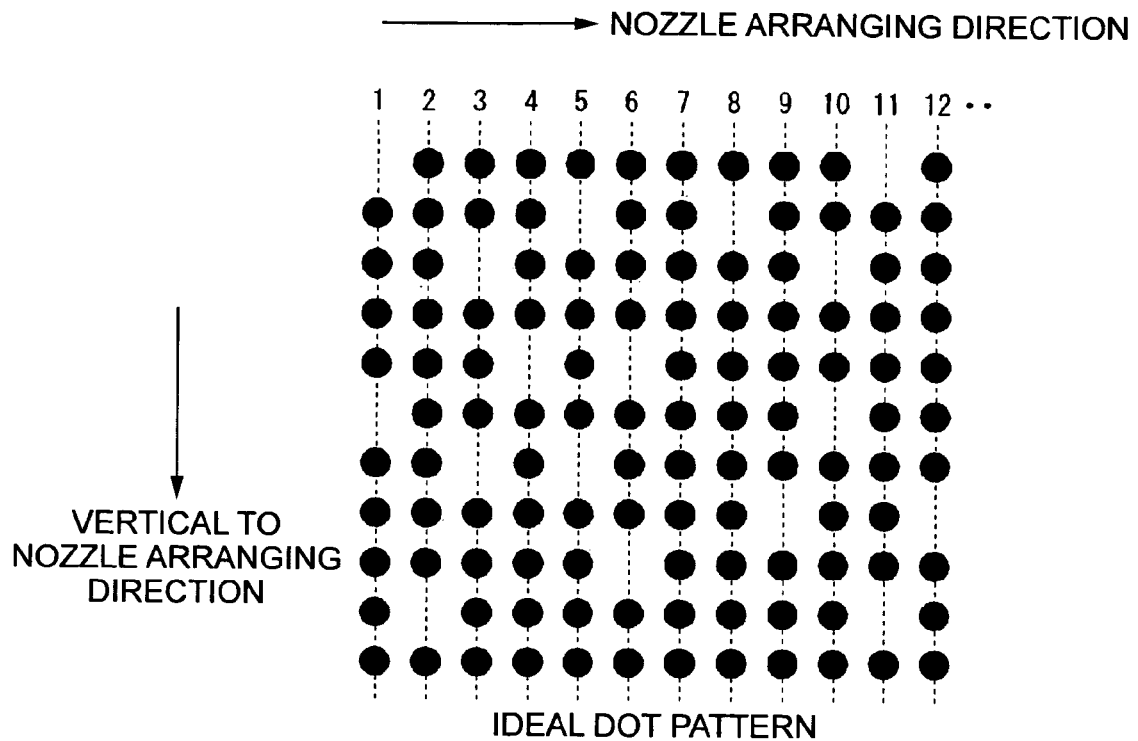
FIG. 7 is a diagram illustrating an exemplary dot pattern generated only by a black nozzle module with no abnormal nozzle that generates curved flight.
Figure 8:
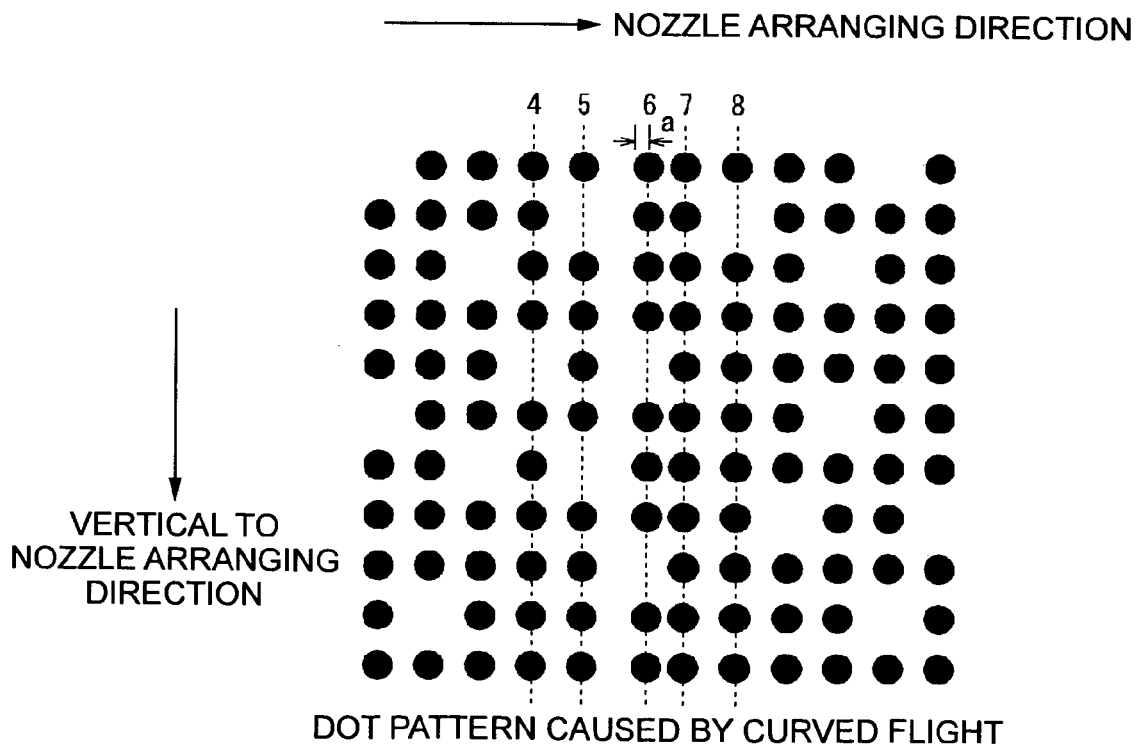
FIG. 8 is a diagram illustrating an exemplary dot pattern generated when a nozzle N6 is generating the curved flight phenomenon in the black nozzle module.
Figure 9:
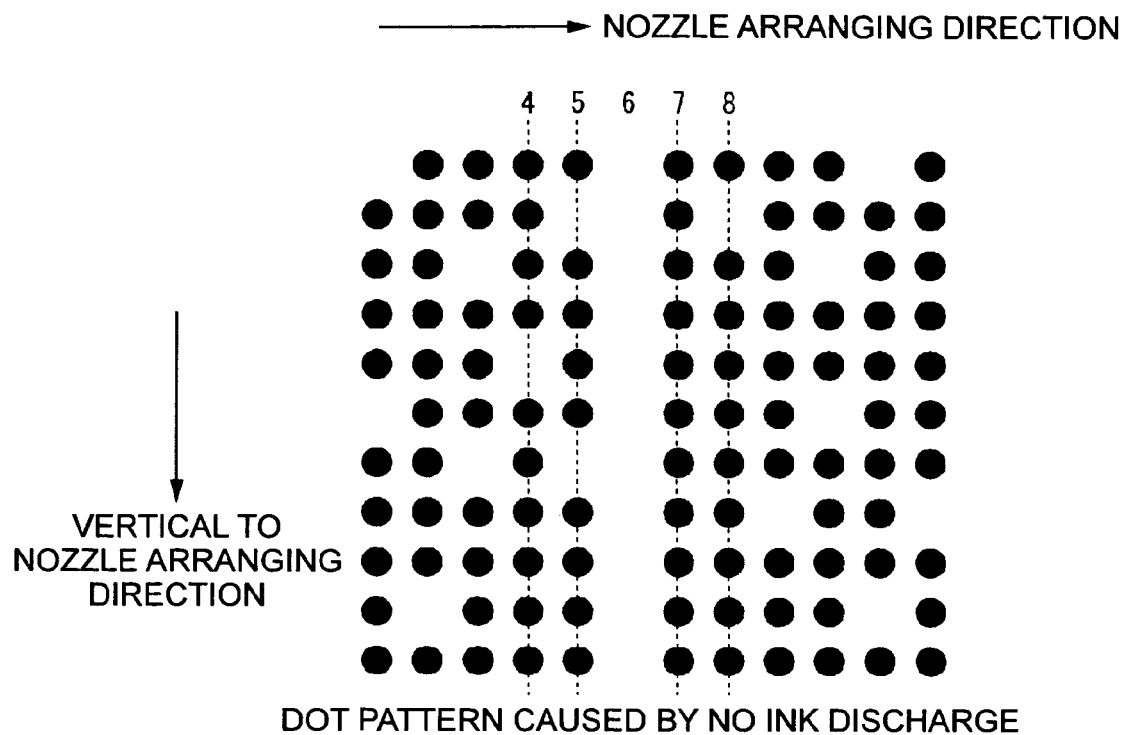
FIG. 9 is a diagram illustrating an exemplary dot pattern formed when nozzle N6 has ink discharge deficiency (no discharge in the drawing) in the black nozzle module.
Figure 10:
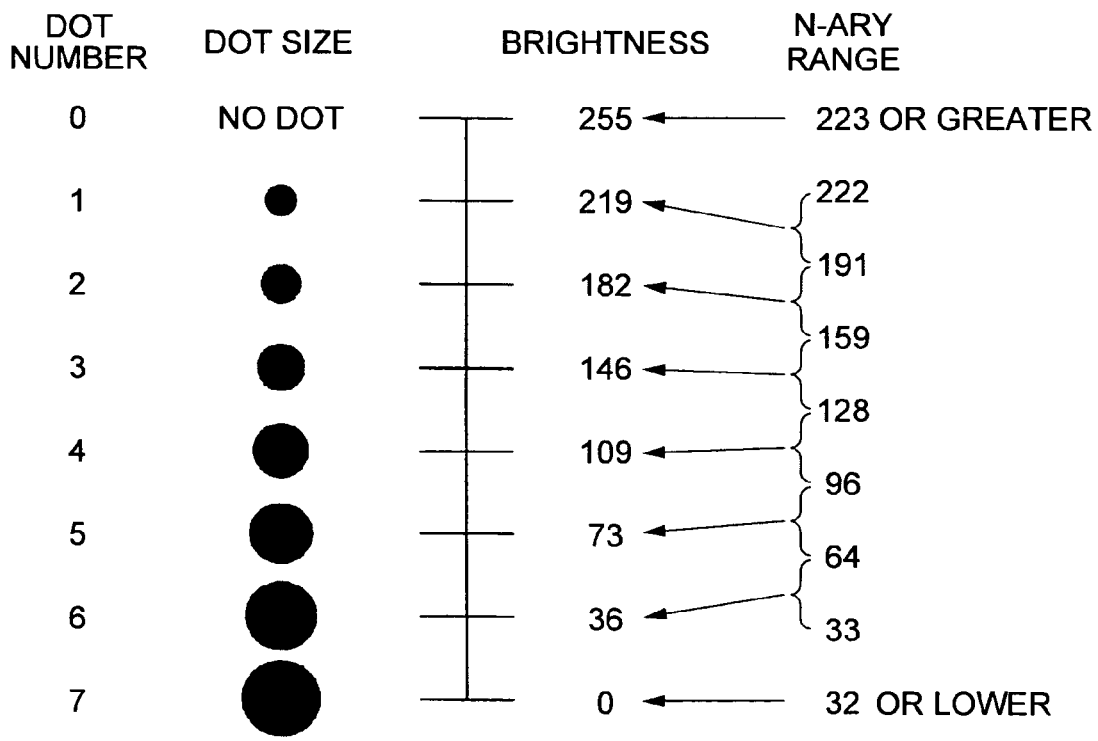
FIG. 10 is a diagram illustrating exemplary N value information and threshold information for each N value with respect to dot size.
Figure 12A:
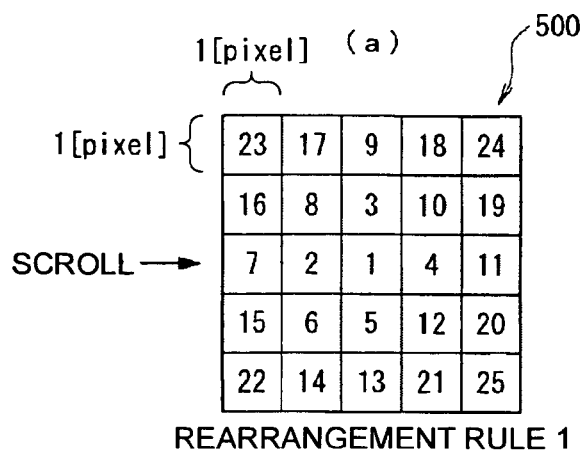
FIG. 12A is a diagram illustrating an exemplary pixel value rearrangement rule.
Figure 12B:
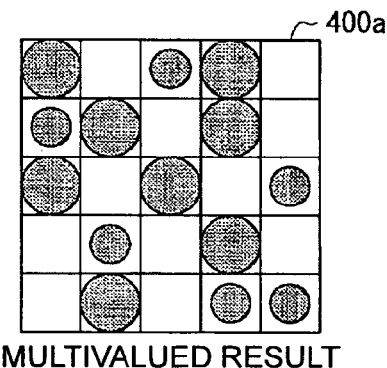
FIG. 12B is a diagram illustrating an exemplary arrangement of dot patterns (pixel values) corresponds to an image data area.
Figures 12C, 12D:
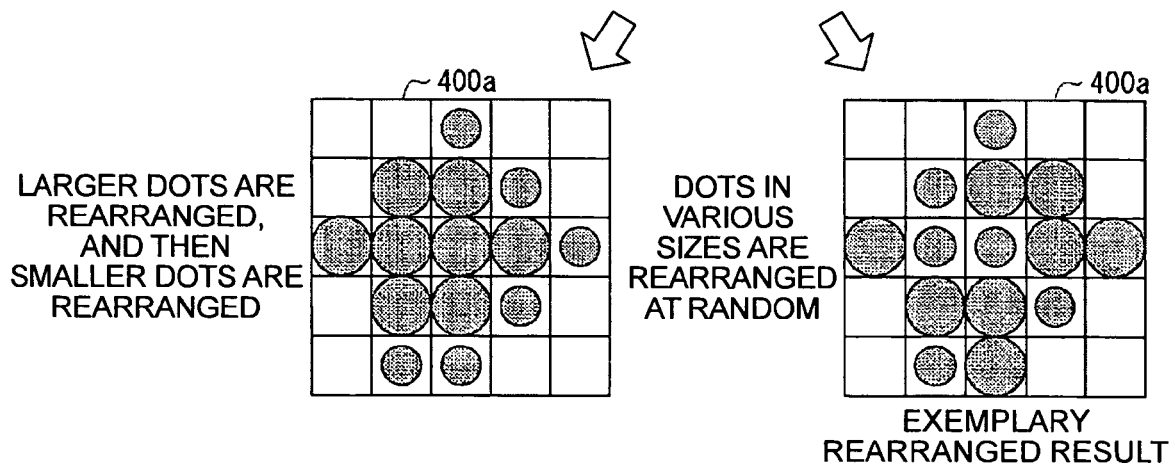
FIGS. 12C and 12D are diagrams illustrating an exemplary rearrangement that dot patterns (pixel values) of FIG. 12B are rearranged by the rearrangement rule in FIG. 12A.
Figure 13:
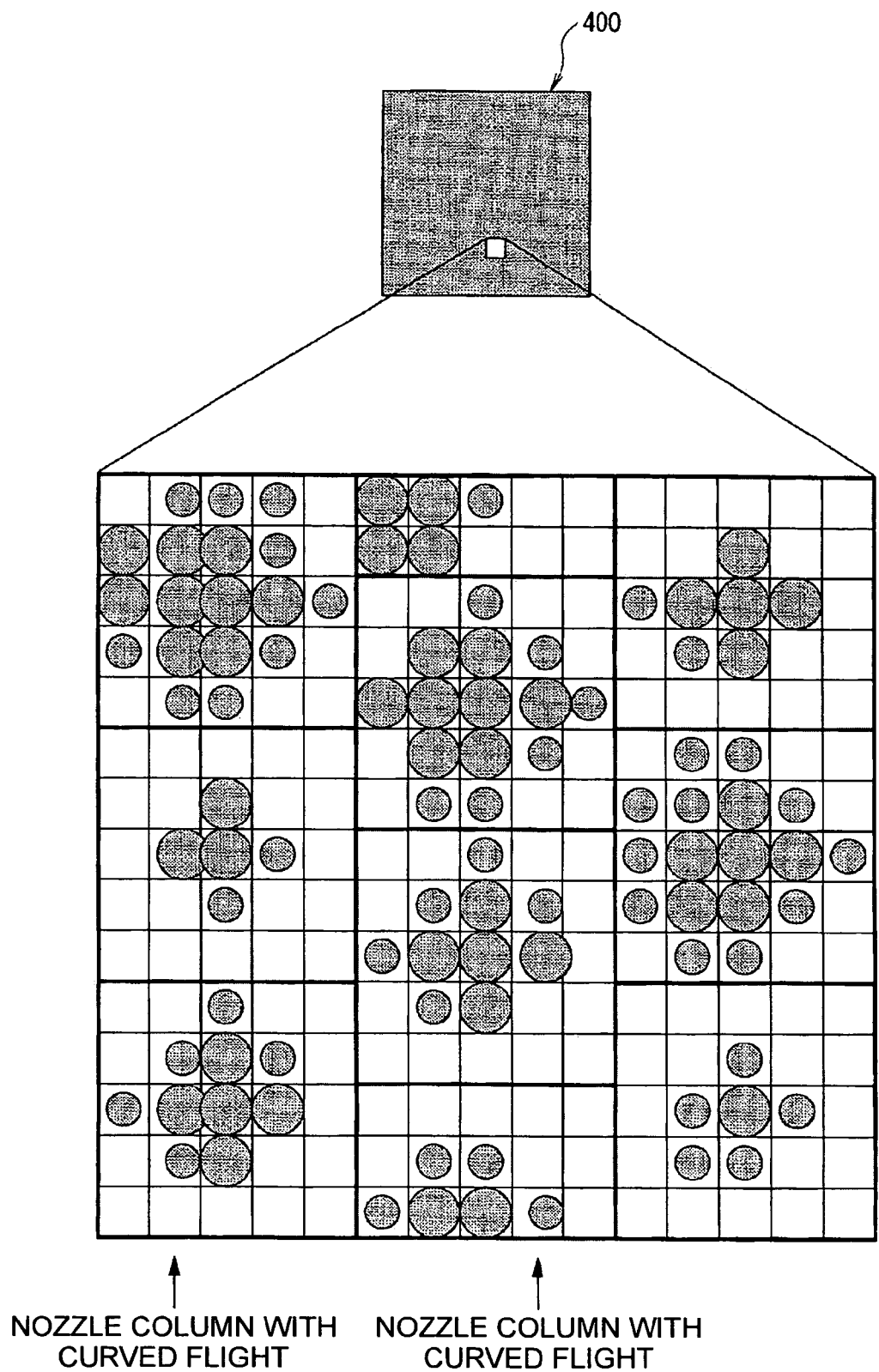
FIG. 13 is a diagram illustrating an exemplary rearranged result of pixel values in the first embodiment.

Here, FIG. 7 is a diagram illustrating an exemplary dot pattern that is generated only by the black nozzle module 50 with no abnormal nozzle. FIG. 8 is a diagram illustrating an exemplary dot pattern that is generated when a nozzle N6 generates the curved flight phenomenon in the black nozzle module 50. FIG. 9 is a diagram illustrating an exemplary dot pattern that is generated when a nozzle N6 has ink discharge deficiency (no discharge in the drawing) in the black nozzle module 50. FIG. 10 is a diagram illustrating exemplary N value information and threshold information for each of N values with respect to dot size. FIGS. 11A and 11B are diagrams illustrating an exemplary check pattern that an N-ary image is split into even sized rectangular areas, and FIGS. 11C and 11D are diagrams illustrating an exemplary houndstooth pattern that an N-ary image is split into even sized rectangular areas. FIG. 12A is a diagram illustrating an exemplary pixel value rearrangement rule, FIG. 12B is a diagram illustrating an exemplary arrangement of dot patterns (pixel values) corresponding to an image data area, and FIGS. 12C and 12D are diagrams illustrating an exemplary rearrangement of dot patterns (pixel values) of FIG. 12B by the rearrangement rule in FIG. 12A. FIG. 13 is a diagram illustrating an exemplary rearranged result of pixel values.

As shown in FIG. 7, no banding phenomenon occurs in the dot pattern generated by the black nozzle module 50 with no abnormal nozzle, the banding phenomenon caused by a shift between nozzle intervals such as 'white streaks' and 'thick streaks' as described above.

On the other hand, for the printed result by the black nozzle module 50 including a nozzle generating curved flight, as shown in FIG. 8, the nozzle N6 generates a dot on the right side of a dot generated by normal nozzle N7 as shifted by distance a. Consequently, 'white streak' are generated between the dot generated by the nozzle N6 and the dot generated by nozzle N5 on the left thereof.

On the other hand, when the nozzle modules 52, 54 and 56 corresponding to other colors are used, not the black nozzle module 50, curved flight causes the nozzle N6 to shift by the distance a as described above, and then the distance between the nozzle N6 and the nozzle N7 on the right side thereof is close by the distance a. Therefore, the density of dots created by these nozzles is increased (dots are sometimes overlapped), and this portion is noticeable as a 'thick streak' to degrade print quality.

Furthermore, as shown in FIG. 9, this event might occur that a dot to be originally generated is not formed because of ink discharge deficiency (no discharge) of the nozzle N6 and 'white streaks' are generated between dots generated by the nozzle N5 and the nozzle N7.

Therefore, in the printing apparatus 100 of the embodiment, N-ary image data is split into a plurality of image data areas, and printing data that each of the positions of forming pixels corresponding to that image data area is rearranged for each of the image data areas. Printing data can be created that banding such as 'white streaks' or 'white streaks' caused by a nozzle that is likely to cause curved flight and by a nozzle having discharge deficiency. First, when the printing apparatus 100 receives print instruction information from the external unit, etc., at the image data acquiring part 10 (Step S100), it acquires M-ary image data corresponding to that print instruction information from the external unit, etc., being a source of print instruction information (Step S102). It determines whether color information of the acquired image data is CMYK (step S104). When the information is other than CMYK (branch 'Yes' at step S104), it transforms image data other than CMYK to M-ary CMYK image data, and it transmits CMYK image data after transformed to the N-ary processing part 11 (step S106). On the other hand, when acquired image data is CMYK image data, it transmits the CMYK image data to the N-ary processing part 11 (branch 'No' at step S104).

When the N-ary value forming part 11a acquires the CMYK image data transmitted from the image data acquiring part 10, it reads N-ary information out of the N-ary information storing part 11b, and stores it in a predetermined area in the RAM 62. Furthermore, when it acquires N-ary information, it selects pixel data does not undergo the N-ary formation process from the acquired CMYK image data, and performs the N-ary formation process for the selected pixel data (hereinafter, selected pixel data) based on the acquired N-ary information. Then, all the items of pixel data of CMYK image data undergo the N-ary formation process to create N-ary image data (step S108).

In this embodiment, suppose the original pixel value of the selected pixel data (brightness (or concentrations)) is the eight-bit '256' gray scale, as shown in FIG. 10, in the N-ary formation process, when the original pixel value is below '0' to '32', that pixel value is put together to '0' and its N-ary value is '7' corresponding to the dot number. When the original pixel value is below '32' to '64', the pixel value is put together to '36' and its N-ary value is '6' corresponding to the dot number. When the original pixel value is below '64' to '96', the pixel value is put together to '73' and its N-ary value is '5' corresponding to the dot number. Furthermore, similarly, when the original pixel value is below '96' to '128', the pixel value is put together to '109' and its N-ary value is '4' corresponding to the dot number. When the original pixel value is below '128' to '159', the pixel value is put together to '146' and its N-ary value is '3' corresponding to the dot number. When the original pixel value is below '159' to '191', the pixel value is put together to '182' and its N-ary value is '2' corresponding to the dot number. Moreover, when the original pixel value is below '191' to '223', the pixel value is put together to '219' and its N-ary value is '1' corresponding to the dot number. Besides, when the original pixel value is below '223' to '255', the pixel value is put together to '255' and its N-ary value is '0' corresponding to the dot number.

In addition, the example above is the case where brightness is taken as the pixel value. When concentrations are adopted as the pixel value, as shown in brackets in the drawing, the opposite value of each brightness is to be taken (the value that subtracts each brightness value from '255').

Furthermore, the N-ary formation process uses publicly known error spread schemes, and an error generated by N-ary formation is spread (distributed) to pixel data that does not undergo the N-ary formation process around a pixel corresponding to the selected pixel data. Here, for the error spread scheme, for example, a binarization process is taken and described as an example in which the M-ary image data is transformed to '0' when the pixel value is smaller than '128', whereas it is transformed to '255' when equal to or greater than '128', bordering at the value of '128'. For example, when the pixel value of the selected pixel data is '101', this '101' is smaller than the threshold of '128', and thus it is transformed to '0'. The error spread scheme is a scheme that the difference '101' between '0' before transformed and '101' after transformed is considered as an error, that error is spread (distributed) to surrounding pixels that do not undergo in accordance with a predetermined spread scheme, and pixel values lost by binarization are compensated by surrounding pixels. More specifically, for example, a pixel (for example, a pixel value of '101') on the right of the selected pixel is transformed to '0' similar to the selected pixel only by the typical binarization process because it is smaller than the threshold. However, by the error spread scheme, '27', for example, it is an error of the selected pixel is received, and the pixel value is '101+27=128' to be the threshold of '128' or greater, thereby being transformed to '1'.

The N-ary image data is created by performing the N-ary formation process and the error spread process to the CMYK image data in the N-ary processing part 11 as described above, the created N-ary image data is transmitted to the pixel value rearrangement processing part 12, and the pixel rearrangement process of the pixel value rearrangement processing part 12 is performed (step S110).

The pixel rearrangement process is initiated when the N-ary image data transmitted from the N-ary image data processing part 11 is acquired at the image data splitting part 12a (Step S200), and the pixel value rearrangement shape table is read out from the pixel value rearrangement shape table storing part 12b by the image data splitting part 12a and then the read-out pixel value rearrangement shape table is stored in a predetermined area in the RAM 62 (step S202).

When the image data splitting part 12a acquires the pixel value rearrangement shape table in this manner, it reads a predetermined item of pixel value rearrangement shape information out of the pixel value rearrangement shape table, and it splits N-ary image data into a plurality of image data areas based on the pixel value rearrangement shape information (step S204).

In the embodiment, suppose four types of items of information are registered in the pixel value rearrangement shape table as pixel value rearrangement shape information as shown in FIGS. 11A to 11D.

More specifically, the pixel value rearrangement shape table is registered with information that splits N-ary image data into check patterns by 5 pixels×5 pixels of a rectangular image data area with respect to image data having 720 dpi of output resolution as shown in FIG. 11A, and with information that splits N-ary image data into check patterns by 10 pixels× 10 pixels of a rectangular image data area with respect to image data having 1440 dpi of output resolution as shown in FIG. 11B.

Furthermore, the pixel value rearrangement shape table is registered with information that splits N-ary image data into houndstooth patterns by 5 pixels×5 pixels of a rectangular image data area with respect to image data having 720 dpi of output resolution as shown in FIG. 1C, and with information that splits N-ary image data into houndstooth patterns by 10 pixels×10 pixels of a rectangular image data area with respect to image data having 1440 dpi of output resolution as shown in FIG. 1D.

Therefore, in the embodiment, any one of two types of a check pattern and a houndstooth pattern can be selected as the splitting scheme for the image data area, and any one of two types of image data area size corresponding to 720 dpi and 1440 dpi of output resolutions with respect to the selected splitting scheme.

Hereinafter, an example will be taken and described that N-ary image data is split into houndstooth patterns by 5 pixels×5 pixels of a rectangular image data area with respect to image data having 720 dpi of output resolution More specifically, as shown in FIG. 1C, N-ary image data 400 is to be split into houndstooth patterns by 5 pixels×5 pixels of a rectangular area 400a, 25 pieces of pixel data in total.

Then, when N-ary image data 400 is split into houndstooth patterns as described above, the pixel value rearranging part 12c reads the pixel value rearrangement rule table out of the pixel value rearrangement rule table storing part 12d, and it stores the read pixel value rearrangement rule table in a predetermined area in the RAM 62 (step S208) When it acquires the pixel value rearrangement rule table, it selects an image data area that does not undergo the pixel value rearrangement process from N-ary image data split into a plurality of image data areas at the image data splitting part 12a (step S210), it further selects a rearrangement rule at random from multiple types of rearrangement rules registered in the acquired the pixel value rearrangement rule table (step S212), and it runs the rearrangement process for each pixel corresponding to the selected image data area based on the selected rearrangement rule (step S214).

In the embodiment, for the rearrangement rule, there are two types of rules based on a rearranging order of an increasing order of numerics (1 to 25) described in each square corresponding to each pixel as shown in FIG. 12A: the rule that rearranges each pixel in the selected image data area (dots in the drawing) as shown in FIG. 12B in a decreasing order of pixels having a greater concentration value (pixels in increasing dot size) as shown in FIG. 12C, and the rule that each pixel is selected in a random order and rearranged as shown in FIG. 12D.

More specifically, with respect to the rearranging order in FIG. 12A, each pixel in the selected image data area (dots in the drawing) as shown in FIG. 12B is rearranged in the decreasing order of pixels having a greater concentration value in the image data area (pixels in increasing dot size). Thus, as shown in FIG. 12C, individual dots are rearranged so that the larger dots formed in the rectangular areas are gathered at the center of the rectangular areas (for example, the center and the periphery thereof) and dot size is decreased from the center part toward the outer rim part (peripheral part). Therefore, all the dots are rearranged so as to be gathered at the center part to form almost a perfect circle.

On the other hand, with respect to the rearranging order in FIG. 12A, each pixel in the selected image data area (dots in the drawing) as shown in FIG. 12B is selected in a random order and rearranged. Thus, as shown in FIG. 12D, all the dots formed in the rectangular areas are rearranged so as to be gathered at the center of the rectangular areas at distribution in random size.

In addition, in the rearrangement rule in FIG. 12A, dots corresponding to the image data areas are rearranged in an order of a rightward scroll. Each pixel value in each of the selected image data areas in the N-ary image data 400 is rearranged in the decreasing order of pixels having a greater concentration value (dots in increasing size), for example, as shown in FIG. 12C. Thus, as shown in FIG. 13, in each of the image data areas, pixels having a greater concentration value (large dots) are positioned at the center of the rectangle of the image data area, and pixels (dots) are gathered at center overall.

N-ary image data thus rearranged is transmitted to the printing data creating part 13.

The printing data creating part 13 transforms N-ary image data that pixel values are rearranged to printing data that can undergo the printing process at the printing part 14 based on the dot number corresponding to each item of pixel data (step S112), and it outputs the data to the printing part 13 (step S114).

On the other hand, the printing part 14 acquires printing data outputted from the printing data creating part 13, and generates (forms) dots in size corresponding to each dot number on a printing medium with the black nozzle module 50 based on acquired printing data (step S116).

In addition, for the technical method of controlling dot size in this manner, for example, in the case of using a piezoelectric device (piezo actuator) for the print head, it is easily implemented that voltage to be applied to that piezo-electric device is varied to control the ink discharge amount.

As described above, N-ary image data is split so that each of the image data areas forms a houndstooth shape, and rearrangement is done in which each pixel (dot) is gathered (arranged) at the center of a rectangle as pixels having a greater concentration value (larger dots) are centered in each of the image data areas. Thus, since dots exist in a lump in each of the image data areas, 'white streaks' and 'thick streaks' are less noticeable when seen in a macroscopic viewpoint even though 'white streaks' and 'thick streaks' are generated in rearranged image data by curved flight and no ink discharge as shown in FIGS. 8 and 9. In addition to this, in this example, since the dot lump is arranged in houndstooth patterns, banding is much less noticeable than typical check patterns.

In the first embodiment, the image data acquiring part 10 corresponds to the image data acquiring module of aspect 1 or 55, the N-ary processing part 11 corresponds to the N-ary image data creating module of aspect 1 or 55, the image data splitting part 12a and the pixel value rearrangement shape table storing module 12b correspond to any one of the image data area splitting modules of aspects 1, 5, 55 and 59, the pixel value rearranging part 12c and the pixel value rearrangement rule table storing part 12d correspond to any one of the pixel rearranging modules of aspects 1, 6, 7, 8, 9, 55, 60, 61, 62 and 63, the printing data creating part 13 corresponds to the printing data creating module of aspect 1 or 55, and the printing part 14 corresponding to the printing module of aspect 1.

In the first embodiment, steps S102 to S106 correspond to any one of the image data acquiring steps of aspects 20, 38, 72 and 90, step S108 corresponds to any one of N-ary image data creating steps of aspects 20, 38, 72 and 90, steps S200 to S206 correspond to any one of the image data area splitting steps of aspects 20, 24, 38, 42, 72, 76, 90 and 94, steps S208 to S216 correspond to any one of the pixel rearrangement steps of aspects 20, 25, 26, 27, 28, 38, 43, 44, 45, 46, 72, 77, 78, 79, 80, 90, 95, 96, 97 and 98, step S112 corresponds to any one of the printing data creating steps of aspects 20, 38, 72 and 90, and step S116 corresponds to the printing step of aspect 20 or 38.

Second Embodiment

Next, a second embodiment according to the invention will be described with reference to the drawings. FIG. 14 to FIG. 21 are diagrams illustrating the second embodiment of the printing apparatus, the printing apparatus control program, the printing apparatus control method, the printing data creating apparatus, the printing data creating program, and the printing data creating method according to the invention.

The configuration of the printing apparatus of the embodiment is the configuration in which a nozzle property information storing part 12e which stores property information showing properties each of nozzles N in a print head 200 is added to the pixel value rearrangement processing part 12 of the printing apparatus 100 of the first embodiment shown in FIG. 1. The configuration of a computer system of the embodiment is the same as that of the first embodiment shown in FIG. 2. Furthermore, in the embodiment, the pixel value rearrangement process done at step S110 of the first embodiment shown in FIG. 5 is changed to that shown in FIG. 14.

Figure 14:
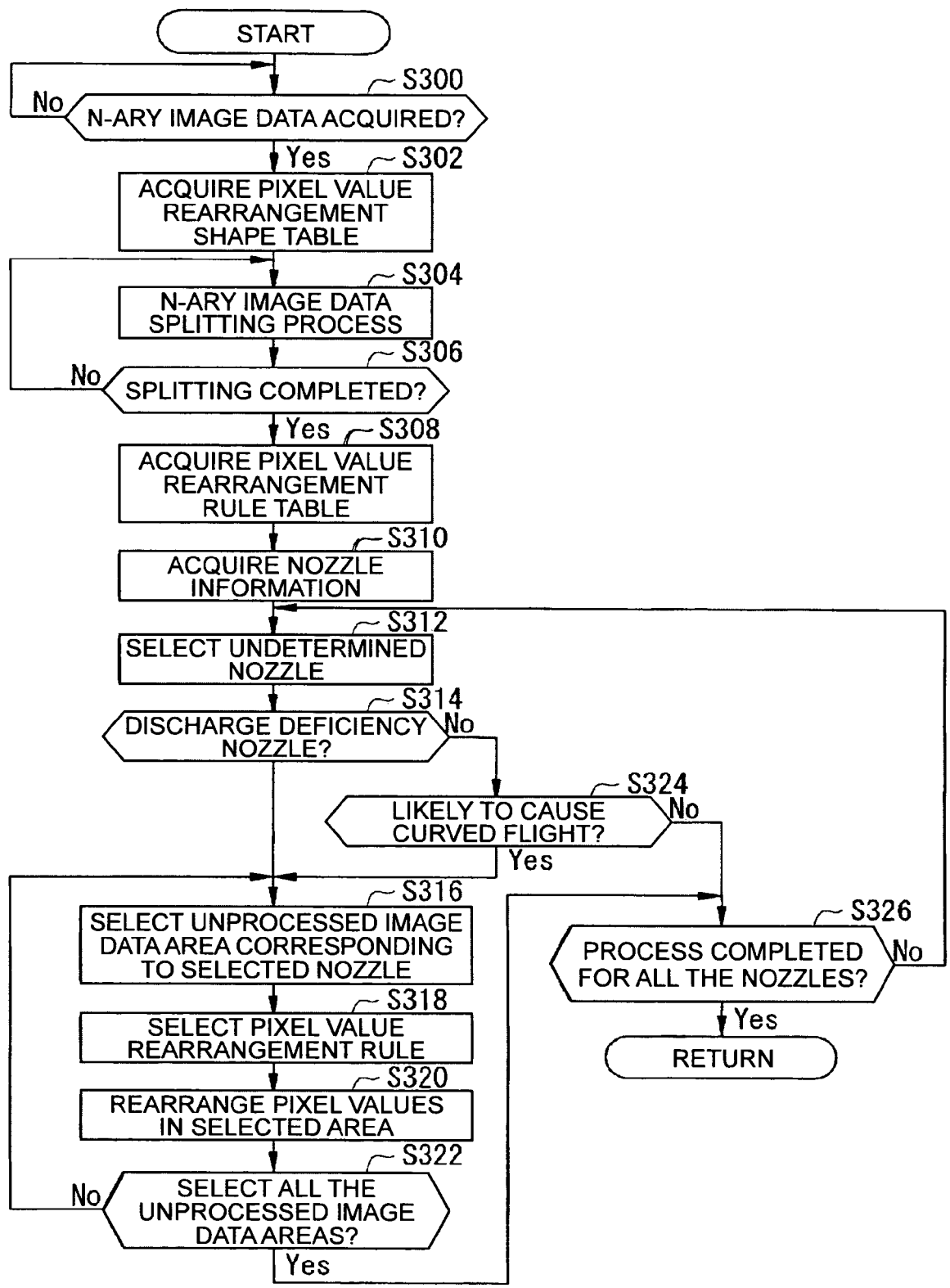
FIG. 14 is a flow chart illustrating a pixel value rearrangement process by the printing apparatus of a second embodiment.

A pixel value rearrangement process shown in FIG. 14 has the same principles as those of the rearrangement process in the first embodiment, but the process determines an abnormal nozzle such as a nozzle with curved flight and a nozzle with ink discharge deficiency in the print head 200 based on nozzle property information stored in the nozzle property information storing part 12e, and the same pixel value rearrangement process as that in the first embodiment is done only for pixel data corresponding to that abnormal nozzle and nozzles near that abnormal nozzle. Hereinafter, only the portions different from the first embodiment will be described, omitting the description of the portions overlapping the first embodiment.

A pixel value rearranging part 12c determines whether an abnormal nozzle is included in nozzles N corresponding to an image data area for each of image data areas split at an image data splitting part 12a based on nozzle property information stored in a nozzle property information storing part. When an abnormal nozzle is included, each pixel value of the image data area including pixel data corresponding to that abnormal nozzle is rearranged based on the pixel value rearrangement rule table stored in a pixel value rearrangement rule table storing part 12*d*.

Here, the abnormal nozzle is nozzles to cause the banding phenomenon to occur such as nozzles that the dot forming position is shifted from an ideal position to cause 'curved flight phenomenon' that ink cannot be discharged, and that has ink discharge deficiency such as an abnormal ink discharge amount.

The nozzle property information storing part 12*e* stores nozzle property information including information showing an amount of curved flight of each of the nozzles N of the print head 200 in the printing part 14, and information showing properties of the nozzles N such as information indicating the presence of ink discharge deficiency in each of the nozzles N. It is checked from the nozzle property information whether the curved flight phenomenon occurs in each of the nozzles N in the print head 200, and whether the nozzles N have discharge deficiency. Thus, it can be determined whether an abnormal nozzle exists each of the nozzles N, and events can be specified more concretely such that the identified nozzle is the abnormal nozzle N in the print head 200, and which pixel data in image data the nozzle corresponds to.

Hereinafter, the pixel value rearrangement process at step S110 in the embodiment will be described in detail with respect to FIG. 14.

FIG. 14 is a flow chart illustrating a pixel value rearrangement process a printing apparatus 100 of the embodiment.

The pixel value rearrangement process is a process that reconfigures image data areas including pixel data corresponding to an abnormal nozzle based on a rearrangement rule that selects positions of forming pixels corresponding to the image data area from the pixel value rearrangement rule table. When the process is run at step S110, as shown in FIG. 14, the process first moves to step S300.

At step S300, at the image data splitting part 12*a*, it is determined whether N-ary image data from the N-ary processing part 11 is acquired. When it is determined that it is acquired (Yes), the process moves to step S302, otherwise (No) the determination process is continued until it is acquired.

When the process moves to step S302, at the image data splitting part 12*a*, the pixel value rearrangement shape table is read out of the pixel value rearrangement shape table storing part 12*b*, it is stored in a predetermined area in the RAM 62 to acquire the pixel value rearrangement shape table, and the process moves to step S304.

At step S304, at the image data splitting part 12*a*, a predetermined item of pixel value rearrangement shape information is selected from multiple types of items of pixel value rearrangement shape information stored in the pixel value rearrangement shape table acquired at step S302, a process that N-ary image data acquired at step S300 is split into a plurality of image data areas based on the selected item of pixel value rearrangement shape information, and the process moves to step S306.

At step S306, at the pixel value rearranging part 12*c*, it is determined whether the splitting process for N-ary image data is completed at the image data splitting part 12*a*. When it is determined that it is completed (Yes), the process moves to step S308, otherwise (No) the process moves to the process moves to step S304 to continue the splitting process.

At step S308, at the pixel value rearranging part 12*c*, the pixel value rearrangement rule table is read out of the pixel value rearrangement rule table storing part 12*d*, it is stored in a predetermined area in the RAM 62 to acquire the pixel value rearrangement table, and the process moves to step S310.

At step S310, at the pixel value rearranging part 12*c*, nozzle property information is readout of the nozzle property information storing part 12*e*, it is stored in a predetermined area in the RAM 62 to acquire the nozzle property information, and the process moves to step S312.

Here, nozzle property information includes a shift (absolute discharge accuracy information or relative discharge accuracy information) from an ideal dot forming position generated by each of the nozzles N in the print head 200, curved flight determination information that determines whether curved flight occurs, and information showing the presence of ink discharge deficiency in each of the nozzles N in the print head 200.

At step S312, at the pixel value rearranging part 12*c*, an undetermined nozzle N is selected from the nozzles N for image data, and the process moves to step S314.

At step S314, based on information showing the presence of ink discharge deficiency in each of the nozzles N included in nozzle property information, it is determined whether the nozzle selected at step S312 (hereinafter, selected nozzle) is a discharge deficiency nozzle. When it is determined that discharge deficiency nozzle (Yes), the process moves to step S316, otherwise (No) the process moves to step S324.

At step S316, at the pixel value rearranging part 12*c*, the an image data area that does not undergo the pixel value rearrangement process corresponding to the selected nozzle N is selected from N-ary image data split into a plurality of the image data areas, and the process moves to step S318.

At step S318, a predetermined pixel value rearrangement rule is selected from multiple types of pixel value rearrangement rules registered in the pixel value rearrangement rule table acquired at step S308, and the process moves to step S320.

At step S320, at the pixel value rearranging part 12*c*, based on the pixel value rearrangement rule selected at step S318, the pixel values of the image data area (hereinafter, the selected image data area) corresponding to the selected nozzle N selected at step S316 are rearranged to move to step S322.

At step S322, at the pixel value rearranging part 12*c*, it is determined whether the pixel value rearrangement process is completed for all the image data areas for the selected nozzle N. When it is determined that it is completed (Yes), the process moves to step S326, otherwise (No) the process moves to step S316 to continue the pixel value rearrangement process.

On the other hand, when the selected nozzle N is not a discharge deficiency nozzle at step S314 and the process moves to step S324, it is determined at the pixel value rearranging part 12*c* whether the selected nozzle N is one related to curved flight based on the amount of shift from an ideal dot forming position and the curved flight determination information of the selected nozzle included in the nozzle property information. When it is determined that the selected nozzle relates to curved flight (Yes), the process moves to step S316, otherwise (No) the process moves to step S326.

When the process moves to step S326, at the pixel value rearranging part 12*c*, it is determined whether the determination process is completed for all the nozzles to print image data. When it is determined that it is completed (Yes), a series of processes is finished to return to the original process, otherwise (No) the process moves to step S312.

Next, the operation of the pixel value rearrangement process of the embodiment will be described with reference to FIGS. 15 to 21. Here, FIG. 15 is a diagram illustrating the presence of ink discharge deficiency in each of the nozzles (in the drawing, no ink discharge).

Figures 17, 18:
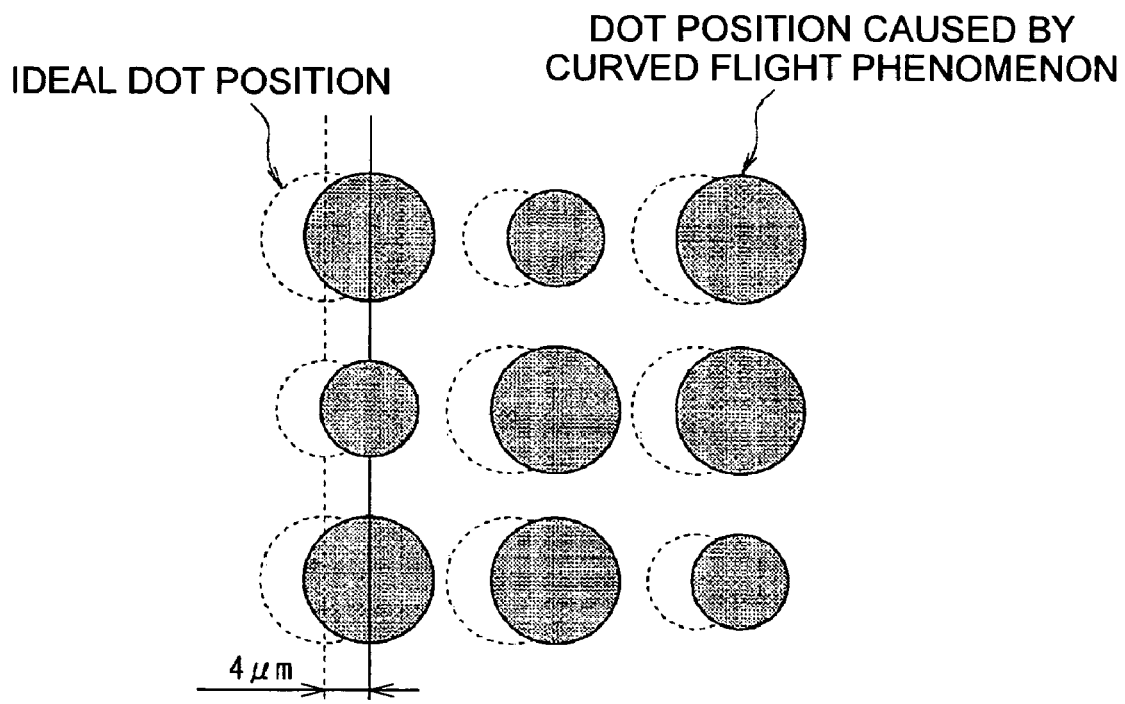
FIG. 17 is an illustration for relative discharge accuracy information.
FIG. 18 is a diagram illustrating an exemplary determination information table which determines the presence of curved flight.
Figure 20A:
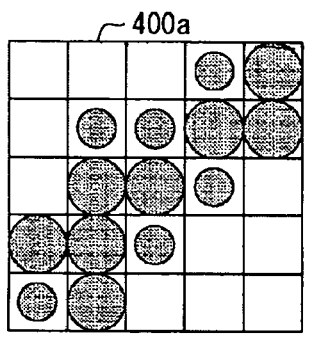
FIG. 20A is a diagram illustrating an exemplary rearrangement that the dot patterns in FIG. 19C are selected at random using the pixel value rearrangement rule in FIG. 19A.
Figure 20B:
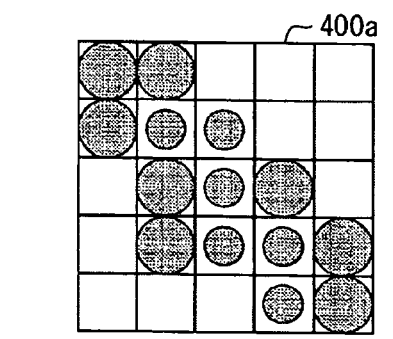
FIG. 20B is a diagram illustrating an exemplary rearrangement that the dot patterns in FIG. 19C are selected at random using the pixel value rearrangement rule in FIG. 19B.
Figure 21:
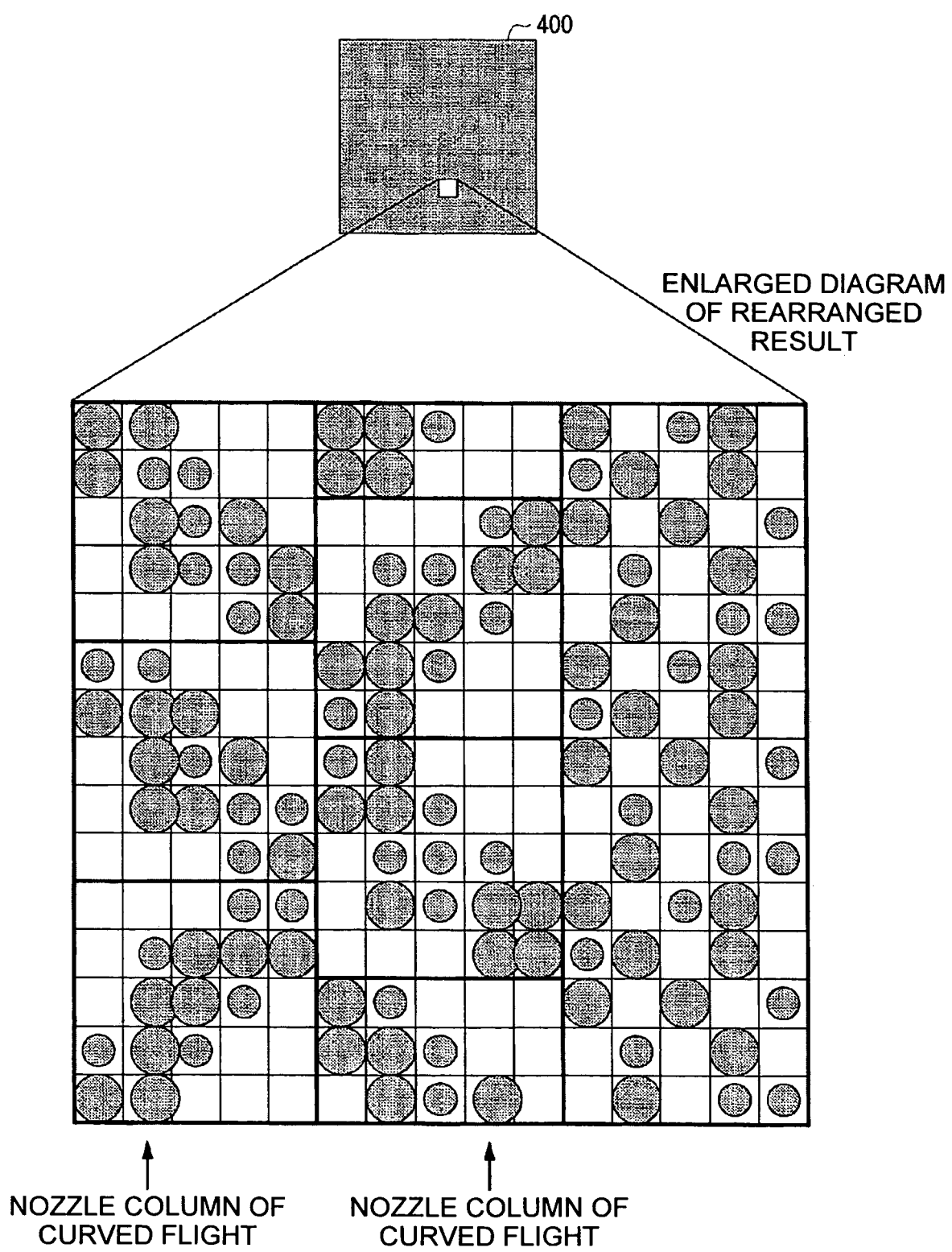
FIG. 21 is a diagram illustrating an exemplary rearranged result of pixel values of the second embodiment.

FIG. 16A is a diagram illustrating absolute discharge accuracy information for each of the nozzles, and FIG. 16B is a diagram illustrating relative discharge accuracy information for each of the nozzles. FIG. 17 is an illustration for relative discharge accuracy. FIG. 18 is a diagram illustrating an exemplary determination information table which determines the presence of curved flight. FIGS. 19A and 19B are diagrams illustrating an exemplary pixel value rearrangement rule. FIG. 19C is a diagram illustrating an exemplary arrangement of dot patterns (pixel values) corresponding to image data areas. FIG. 19D is a diagram illustrating an exemplary rearrangement of dot patterns (pixel values) in FIG. 19C in a decreasing order of dot size by the rearrangement rule in FIG. 19A. FIG. 19E is a diagram illustrating an exemplary rearrangement of dot patterns (pixel values) in FIG. 19C in a decreasing order of dot size by the rearrangement rule in FIG. 19B. FIG. 20A is a diagram illustrating an exemplary rearrangement that dot patterns in FIG. 19C are selected at random using the pixel value rearrangement rule in FIG. 19A. FIG. 20B is a diagram illustrating an exemplary rearrangement that dot patterns in FIG. 19C are selected at random using the pixel value rearrangement rule in FIG. 19B. FIG. 21 is a diagram illustrating an exemplary rearranged result of pixel values.

The pixel value rearrangement process in the embodiment is started when the image data splitting part 12a acquires N-ary image data transmitted from the N-ary processing part 11 (step S300). First, the image data splitting part 12a reads the pixel value rearrangement shape table out of the pixel value rearrangement shape table storing part 12b, and the read pixel value rearrangement table is stored in a predetermined area in the RAM 62 (step S302).

When the pixel value rearrangement shape table is thus acquired, the image data splitting part 12a reads a predetermined item of pixel value rearrangement shape information out of the pixel value rearrangement shape table, and it splits N-ary image data into a plurality of image data areas based on the pixel value rearrangement shape information (step S304). Here, for pixel value rearrangement shape information, for example, information set beforehand may be automatically selected and read out in accordance with the characteristics of image data, or information selected by a user may be read out.

Hereinafter, similar to the first embodiment, an example will be taken and described that N-ary image data is split into houndstooth patterns by 5 pixels×5 pixels of a rectangular image data area with respect to image data having 720 dpi of output resolution.

When N-ary image data 400 is split into houndstooth patterns at the image data splitting part 12a, the pixel value rearranging part 12c reads the pixel value rearrangement rule table out of the pixel value rearrangement rule table storing part 12d, and it stores the read pixel value rearrangement rule table in a predetermined area in the RAM 62 (step S308). It reads nozzle property information out of the nozzle property information storing part 12e, and it stores the read nozzle property information in a predetermined area in the RAM 62 (step S310).

When nozzle property information is acquired, a nozzle N is selected that does not undergo the determination process whether it might cause the banding phenomenon among the nozzles N to print N-ary image data in the print head 200 (step S312). Based on information showing the presence of ink discharge deficiency in a nozzle included in nozzle property information, it is determined whether the selected nozzle has ink discharge deficiency (step S314).

In the embodiment, information showing the presence of discharge deficiency is prepared as a information table representing (0): a nozzle normally discharges ink, and representing (1): a nozzle has discharge deficiency for nozzle numbers for each of the nozzles in the print head 200 as shown in FIG. 15.

More specifically, for the nozzle number corresponding to the selected nozzle, when the value in the table shown in FIG. 15 is '0', the selected nozzle N is determined as normal discharge (branch 'No' at step S314), whereas, when the value in the table shown in FIG. 15 is '1', the selected nozzle N is determined as no discharge (clog) (branch 'Yes' at step S314).

Here, when the selected nozzle N is determined as normal discharge, it is determined whether the selected nozzle N might cause curved flight based on discharge accuracy information and curved flight determination information included in nozzle property information (step S324).

In order to determine whether each of the nozzles N might cause curved flight, for the discharge accuracy information, any one of items of information is desired: absolute discharge accuracy information (an absolute amount of curved flight) shown in FIG. 16A, or relative discharge accuracy information (a relative amount of curved flight) shown in FIG. 16B. Absolute discharge accuracy information is a shift of an ideal dot forming position generated by a nozzle N, and relative discharge accuracy information is a differential between an ideal dot forming position of a nozzle N and an ideal dot forming position of a nozzle N+1 adjacent to that nozzle N. Furthermore, in order to determine curved flight, relative discharge accuracy information about the nozzle N is required. Therefore, when nozzle property information includes only absolute discharge accuracy information as shown in FIG. 16A, relative discharge accuracy is computed from this information to create relative discharge accuracy information as shown in FIG. 16B. In addition, the reason why relative discharge accuracy information is required for determining curved flight is as follows. For example, as shown in FIG. 17, when three nozzles continuously arranged have the same amount of curved flight, the middle nozzle among those three nozzles does not have relatively curved flight. When pixel data corresponding to such a nozzle undergoes the rearrangement process, image quality of the printed result is likely to degrade.

Hereinafter, in the embodiment, suppose relative discharge accuracy information shown in FIG. 16B exists as discharge accuracy information, the determination process of curved flight will be described.

The determination process of curved flight is done that relative discharge accuracy of the selected nozzle N is acquired from the relative discharge accuracy information based on the acquired discharge accuracy and curved flight determination information shown in FIG. 18. Curved flight determination information is defined in a numeric range of relative discharge accuracy to be determined as curved flight. In the embodiment, when relative discharge accuracy of a selected nozzle N ranges from '−4 to +4 μm', that selected nozzle N is determined that it might not cause curved flight (branch 'No' at step S324), whereas when relative discharge accuracy of a selected nozzle N does not range from '−4 to +4 μm', that selected nozzle N is determined that it might cause curved flight (branch 'Yes' at step S324).

Then, when it is determined that the selected nozzle might cause no discharge or curved flight, an image data area that does not undergo the pixel value rearrangement process is selected from the image data area corresponding to the selected nozzle in N-ary image data split into a plurality of image data areas at the image data splitting part 12a (step S316), a rearrangement rule is selected at random from multiple types of rearrangement rules registered in the acquired pixel value rearrangement rule table (step S318), and the rearrangement process for each pixel corresponding to the selected image data area based on the selected rearrangement rule (step S320).

In the embodiment, the rearrangement rule mainly has two types of rearrangement rules different from the first embodiment as shown in FIGS. 19A and 19B: varied in arrangement orders of numerics (1 to 25) in each square as correspond to each pixel (that is, pixel rearranging orders). For these rearranging orders, there are two rules that individual pixels (dots) in the image data area are selected and rearranged in a decreasing order of a greater concentration value (larger dot), and that individual pixels (dots) in the image data area are selected and rearranged at random. When rules are subdivided, there are four types of rearrangement rules in total: two types of rearrangement descriptions and two types of pixel (dot) selection methods.

More specifically, the individual pixels in the selected image data area (dots in the drawing) shown in FIG. 19C in an increasing order of numerics in each square in FIG. 19A or 19B are rearranged in a decreasing order of pixels having a greater concentration value (pixels increasing in dot size) in the image data area. Thus, for the rearranging order shown in FIG. 19A, rearrangement is done so that larger dots are gathered at the center in the rectangular area and all the dots formed in the rectangular area depict a right oblique line (in the direction from upper right to lower left) as shown in FIG. 19D. For the rearranging order shown in FIG. 19B, rearrangement is done so that larger dots are gathered at the center in the rectangular area and all the dots formed in the rectangular area depict a left oblique line (in the direction from lower right to upper left) as shown in FIG. 19E.

On the other hand, the individual pixels in the selected image data area shown in FIG. 19C in an increasing order of numerics in each square in FIG. 19A or 19B are selected and rearranged in a random order. For the rearranging order shown in FIG. 19A, rearrangement is done so that all the dots formed in the rectangular area depict a right oblique line (in the direction from upper right to lower left) as shown in FIG. 20A. For the rearranging order shown in FIG. 19B, rearrangement is done so that all the dots formed in the rectangular area depict a left oblique line (in the direction from lower right to upper left) as shown in FIG. 20B.

For example, at the pixel value rearranging part 12c, four types of the rearrangement rules are selected at random for the selected image data area corresponding to an abnormal nozzle for the rearrangement process. As shown in FIG. 21, the image data areas corresponding to a nozzle that possibly causes banding are in a state that the image data areas of four types of rearrangement descriptions are mixed and rearranged at random, whereas he image data areas corresponding to a nozzle that might not cause banding are in a state that no-rearranged ones are arranged.

As described above, N-ary image data is split so that each of the image data areas forms houndstooth patterns, and pixels (large dots) are rearranged so as to depict an oblique line based on the rule selected at random from four types of the rearrangement rules in each of the image data areas. Therefore, dots exist in a lump in the oblique direction in each of the image data areas, and dots according to four types of the rearrangement rules are arranged at random. Thus, 'white streaks' and 'thick streaks' generated in the rearranged image data are less noticeable when seen in a macroscopic viewpoint. In addition to this, in the example, similar to the first embodiment, since the dot lumps in the oblique direction arranged in houndstooth patterns, banding is much less noticeable than in typical check patterns.

Moreover, since only the image data area that might cause banding undergoes the rearrangement process, dots are formed as typical ways in the other normal portions. Therefore, image quality is more improved than the case where dots are rearranged overall.

In the second embodiment, the image data acquiring part 10 corresponds to the image data acquiring module of aspect 1 or 37, the N-ary processing part 11 corresponds to the N-ary image data creating module of aspect 1 or 55, and the image data splitting part 12a and the pixel value rearrangement shape table storing module 12b correspond to any one of the image data area splitting module of aspects 1, 3, 5, 55, 57 and 59. The process that determines whether the selected nozzle might cause the banding phenomenon at the pixel value rearranging part 12c and the nozzle property information storing part 12e corresponds to the determining module of aspect 3, the pixel value rearranging part 12c and the pixel value rearrangement rule table storing part 12d correspond to any one of the pixel rearranging modules of aspects 1, 3, 6, 7, 8, 9, 55, 57, 60, 61, 62 and 63, the printing data creating part 13 corresponds to the printing data creating module of aspect 1 or 55, and the printing part 14 corresponds to the printing module of aspect 1.

In the second embodiment, steps S102 to S106 correspond to any one of the image data acquiring steps of aspects 20, 38, 72 and 90, step S108 corresponds to any one of the N-ary image data creating steps of aspects 20, 38, 72 and 90, steps S200 to S206 correspond to any one of the image data area splitting steps of aspects 20, 22, 24, 38, 40, 42, 72, 74, 76, 90, 92 and 94, steps S208 to step S216 correspond to any one of the pixel rearrangement steps of aspects 20, 22, 25, 26, 27, 28, 38, 40, 43, 44, 45, 46, 72, 74, 77, 78, 79, 80, 90, 92, 95, 96, 97 and 98, step S112 corresponds to any one of the printing data creating steps of aspects 20, 38, 72 and 90, step S116 corresponds to the printing step of aspect 20 or 38, and steps S314 and S324 correspond to any one of the determining steps of aspects 22, 40, 74 and 92.

Modification of First Embodiment

Figures 26A, 26B, 26C:
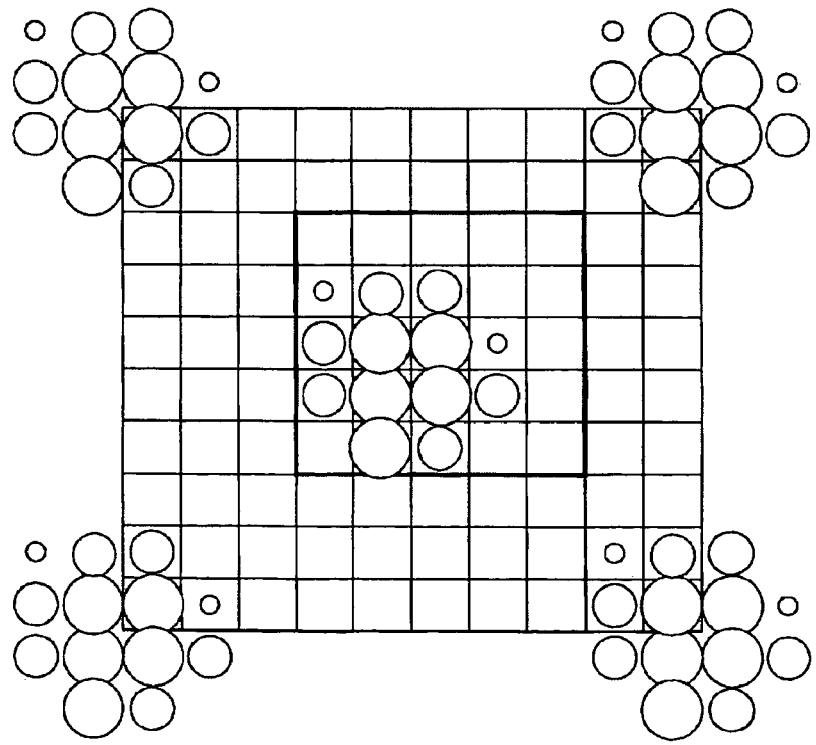
FIG. 26A is a diagram illustrating an exemplary rearrangement rule of a modification.
FIG. 26B is a diagram illustrating image areas configured of four image data areas rearranged by the rearrangement rule in FIG. 26A.
FIG. 26C is a diagram illustrating exemplary dot patterns formed with respect to FIG. 26B.

Next, a modification of the first embodiment according to the invention will be described with reference to the drawings. FIG. 26 is diagrams illustrating a modification of the first embodiment of the printing apparatus, the printing apparatus control program, the printing apparatus control method, the printing data creating apparatus, the printing data creating program, and the printing data creating method according to the invention. Here, FIG. 26A is a diagram illustrating an exemplary rearrangement rule of the modification. FIG. 26B is a diagram illustrating an image area configured of four image data areas rearranged by the rearrangement rule in FIG. 26A. FIG. 26C is a diagram illustrating exemplary dot patterns formed for the image area shown in FIG. 26B.

In the modification, the pixel value rearrangement process done at step S110 of the first embodiment in FIG. 5 is done in accordance with the rearrangement rule shown in FIG. 26A. Hereinafter, an example will be taken and described that N-ary image data is split into check patterns by 5 pixels×5 pixels of a rectangular area with respect to image data having 720 dpi of output resolution.

The rearrangement rule shown in FIG. 26A is different from the first embodiment in the arranging order of numerics (1 to 25) in each square as corresponding to each pixel in the selected image data area (that is, the rearranging order of pixels). More specifically, in the first embodiment, as shown in FIG. 12C, dots generated in 5 pixels×5 pixels of rectangular areas configured of individual pixels in the selected image data area are rearranged so that larger dots are gathered at the center of the rectangular area (for example, the center and the periphery thereof) and dots are arranged in large size to small size from the center part toward the outer rim part (the periphery). In the modification, dots generated in each of the rectangular areas are rearranged so that are gathered at the corner of the rectangular area and dots are arranged in large size to small size from the corner to the center part. More specifically, as shown in FIG. 26A, numeric 1 is set in a square at an upper right corner, numeric 2 is set in a square at a lower left corner, numeric 3 is set at a square at a lower right corner, and numeric 4 is set in a square at an upper left corner. For four corners of the rectangular area, larger dots are rearranged in priority at the position corresponding to the squares in an increasing order of the numerics. On the other hand, as shown in FIG. 26A, a numeric to be set is greater as closer to a square near the center from squares at four corners, and smaller dots are rearranged as closer to near the center.

Furthermore, in the modification, an attention is focused on a rectangular image area configured in which a plurality of rectangular areas is adjacent to each other that are rearranged by the rearrangement rule shown in FIG. 26A.

Here, as shown in FIG. 26B, an attention is focused on a rectangular image area configured in which four rectangular areas are rearranged adjacent to each other that are rearranged by the rearrangement rule shown in FIG. 26A.

As described above, at four corners of each of the rectangular areas, rearrangement is done so that larger dots are arranged in priority and dots are arranged in smaller size as closer to the center part from four corners. Thus, as shown in FIG. 26C, the rearranged result is that dots are gathered at four corners of the adjacent rectangular areas in the adjacent portions of four rectangular areas configuring the image area. Consequently, a lump of dots is formed at the center part of the image area in nearly a perfect circle. Therefore, since dots exist in a lump at the center part of a plurality of the adjacent image data areas, 'white streaks' and 'thick streaks' are less noticeable when seen at a macroscopic viewpoint even though 'white streaks' and 'thick streaks' are generated by curved flight and no ink discharge in the rearranged image data as shown in FIGS. 8 and 9.

In the modification, the image data acquiring part 10 corresponds to the image data acquiring module of aspect 1 or 55, the N-ary processing part 11 corresponds to the N-ary image data creating module of aspect 1 or 55, the image data splitting part 12a and the pixel value rearrangement shape table storing module 12b correspond to any one of the image data area splitting modules of aspects 1, 5, 55 and 59, the pixel value rearranging part 12c and the pixel value rearrangement rule table storing part 12d correspond to any one of the pixel rearranging modules of aspects 1, 12, 13, 14, 15, 16, 17, 55, 66, 67, 68, 69, 70 and 71, the printing data creating part 13 corresponds to the printing data creating module of aspect 1 or 55, and the printing part 14 corresponds to the printing module of aspect 1.

In the modification, steps S102 to S106 correspond to any one of the image data acquiring steps of aspects 20, 38, 72 and 90, step S108 corresponds to any one of the N-ary image data creating steps of aspects 20, 38, 72 and 90, steps200 to S206 correspond to any one of the image data area splitting steps of aspects 20, 24, 38, 42, 72, 76, 90 and 94, steps S208 to step S216 correspond to any one of the pixel rearrangement steps of aspects 20, 31, 32, 33, 34, 35, 36, 38, 49, 50, 51, 52, 53, 54, 72, 83, 84, 85, 86, 87, 88, 90, 101, 102, 103, 104, 105 and 106, step S112 corresponds to any one of the printing data creating steps of aspects 20, 38, 72 and 90, and step S116 corresponds to the printing step of aspect 20 or 38.

In addition, the feature of the printing apparatus in the first and second embodiments is in that an existing printing apparatus is slightly modified itself to create printing data from image data in matching with the properties of its print head. Therefore, it is unnecessary to prepare a unit exclusive use for the printing part 20 particularly, and a printer of a traditional existing ink jet printing method can be used as it is. Furthermore, when the printing part 20 is separated from the printing apparatus 100 in the embodiment, the function can be implemented only by a general-purpose print instruction terminal (printing data creating apparatus) such as PC or printer server (these correspond to the printing data creating apparatus).

Furthermore, the invention can be of course adapted not only to the curved flight phenomenon but also to the case where the ink discharge direction is vertical (normal) but the nozzle forming descriptions are shifted from the normal position, and thus dots to be created result in the same as those in the curved flight phenomenon.

Moreover, the printing apparatus 100 in the first and second embodiments and in the modification of the first embodiment can be adapted not only to the line scan head type ink jet printer but also to the multipath type ink jet printer. When it is the line scan head type ink jet printer, high quality prints can be obtained by a single path with less noticeable white streaks and thick streaks even though the curved flight phenomenon, etc., occur. Besides, when it is the multipath type ink jet printer, the number of reciprocation can be reduced to allow higher speed printing than traditional printing.

Figure 22A:
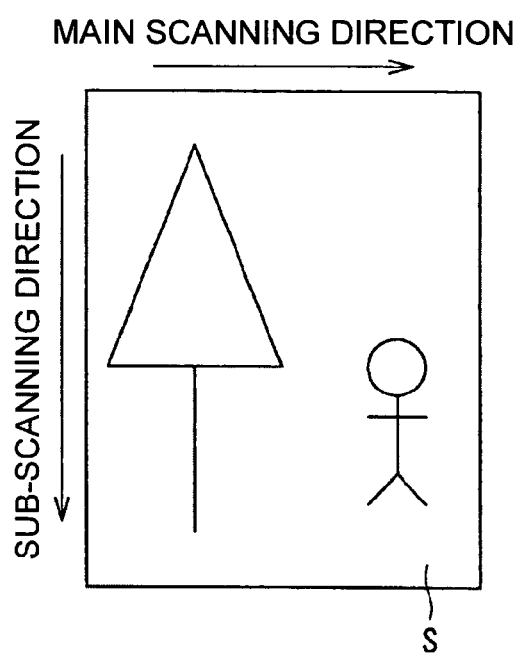
FIGS. 22A to 22C are illustrations depicting the difference in printing methods between the multipath type ink jet printer and the line scan head type ink jet printer.
Figure 22B:
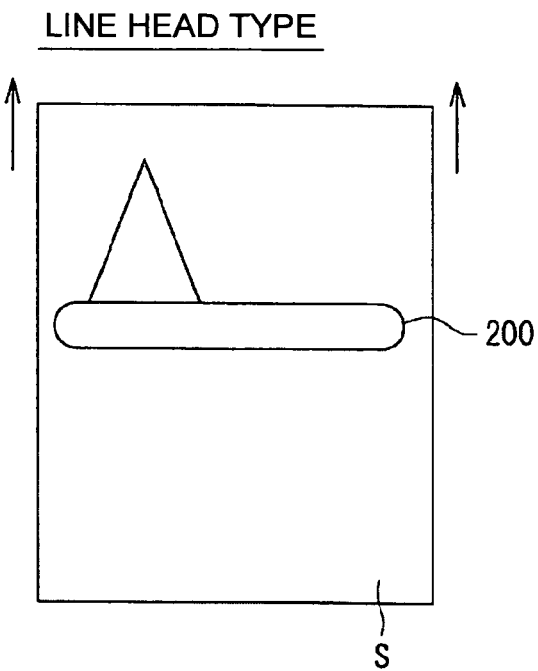
Figure 22C:
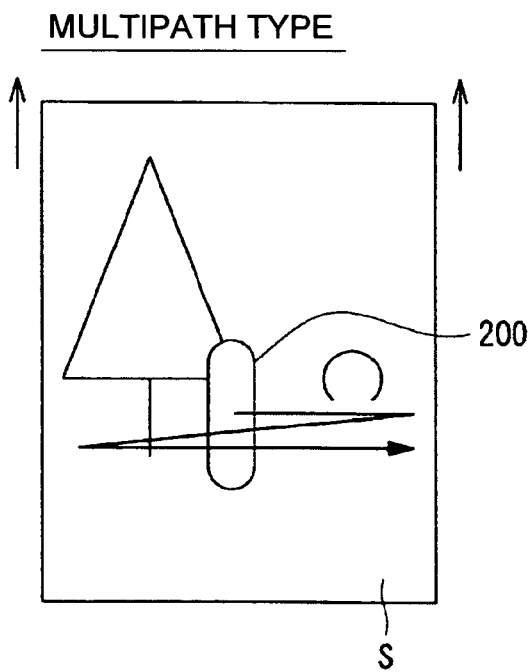

FIGS. 22A to 22C depict printing methods of the line scan head type ink jet printer and the multipath type ink jet printer.

As shown in FIG. 22A, suppose the width direction of rectangular printing paper S is the main scanning direction of image data and the longitudinal direction is the sub-scanning direction of image data. As shown in FIG. 22B, in the line scan head type ink jet printer, the print head 200 has a length of the width of the printing paper S, the print head 200 is fixed, and the printing paper S is moved in the sub-scanning direction with respect to the print head 200 to complete printing by a so-called single scan (a single path operation). Furthermore, printing can be done in such a way that printing paper S is fixed and the print head 200 is moved in the sub-scanning direction as a flat head type scanner, or that both are moved in the opposite directions. On the other hand, as shown in FIG. 22C, in the multipath type ink jet printer, printing is done in which the print head 200 that is much shorter than the length of paper width is placed at the direction orthogonal to the main scanning direction and it is repeatedly reciprocated in the main scanning direction while moving the printing paper S in the sub-scanning direction by predetermined pitches. Therefore, in the case of the latter multipath type ink jet printer, although it has a disadvantage that it takes time for printing more than the former line scan head type ink jet printer, it can place the print head 200 at a given position repeatedly. Thus, it can particularly cope with a reduction in the white streak phenomenon to some extend in the banding phenomenon described above.

Moreover, the ink jet printer is taken and explained as an example that ink is discharged in dots for printing in the first and second embodiments and in the modification of the first embodiment. However, the invention can also be adapted to another printing apparatus using a print head having a printing mechanism arranged in a line, for example, to a so-called thermal head printer such as a thermal transfer printer or thermal printer.

Figure 23:
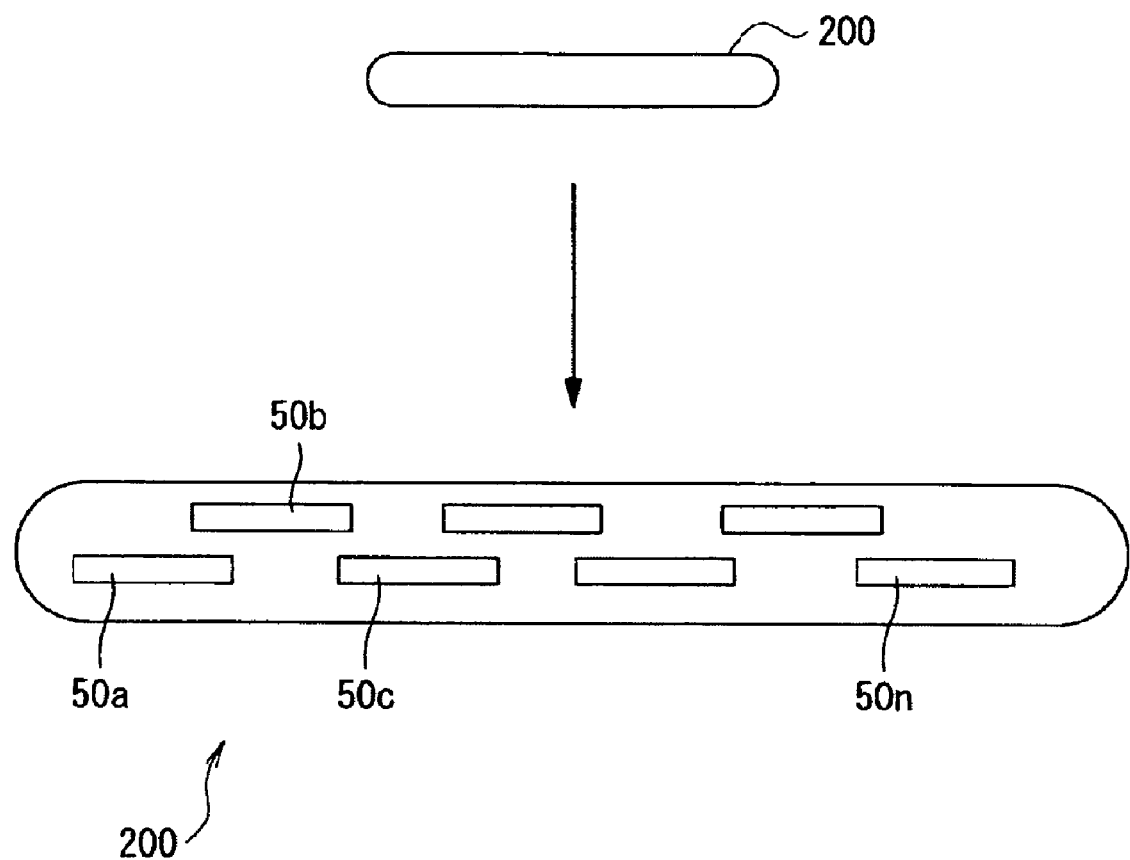
FIG. 23 is a conceptual diagram illustrating another example of the structure of the print head.

Besides, in FIG. 3, each of the nozzle modules 50, 52, 54, and 56 disposed for each color in the print head 200 is in the form that the nozzles N are continuously arranged linearly in the longitudinal direction of the print head 200. However, as shown in FIG. 23, it may be configured in which each of the nozzle modules 50, 52, 54, and 56 is configured of a plurality of short nozzle units 50a, 50b, to 50n and they are arranged before and after the moving direction of the print head 200. Particularly, when each of the nozzle modules 50, 52, 54, and 56 is configured of a plurality of the short nozzle units 50a, 50b, to 50n, the distance between dots can be substantially shortened without shortening the actual distance between dots (pitches) of each of the nozzles units 50a, 50b, to 50n. Therefore, a yield of fabricating the nozzle module can be increased.

Furthermore, in the second embodiment, the entire N-ary image data is split into a plurality of the image data areas, but not limited thereto, only pixel data corresponding to an abnormal nozzle and nozzles near that nozzle may be split. For example, pixels in a plurality of columns centering an abnormal nozzle may be split in such a way that pixels in five columns corresponding to nozzles in two columns at right and left as centering an abnormal nozzle.

Moreover, in the first and second embodiments and the modification of the first embodiment, the configuration is made in which only a rectangle (square) can be selected as the shape of the image data area when N-ary image data is split into a plurality of the image data areas. However, not limited thereto, the configuration may be fine to select other shapes such as a rectangle, a rhombus, and a triangle.

Furthermore, in the first and second embodiments and the modification of the first embodiment, N-ary image data is split into a plurality of the image data areas based on the pixel value rearrangement shape table, and the rearrangement process is done in accordance with the pixel value rearrangement rule table for each of the image data areas. However, it is not limited thereto, it may be done in which CMYK image data itself is split into a plurality of the image data areas based on the pixel value rearrangement shape table, not CMYK image data after N-ary formation, and the rearrangement process in accordance with the pixel value rearrangement rule table for each of the image data areas configured of pixel data before N-ary formation. In this case, the N-ary formation process is done after the rearrangement process to create printing data.

When the printing apparatus 100 of the second embodiment is configured in this manner, the image data acquiring part 10 corresponds to the image data acquiring module of aspect 71 or 74, the N-ary processing part 11 corresponds to the N-ary image data creating module of aspect 71 or 74, the image data splitting part 12a and the pixel value rearrangement shape table storing module 12b correspond to the image data area splitting module of aspect 71 or 74, the pixel value rearranging part 12c and the pixel value rearrangement rule table storing part 12d correspond to the pixel rearranging module of aspect 71 or 74, the printing data creating part 13 corresponds to the printing data creating module of aspect 71 or 74, and the printing part 14 corresponds to the printing module of aspect 71.

Moreover, the rearrangement rule that rearranges dots so as to depict an oblique line in the second embodiment shown in FIG. 19 can also be adapted to the printing apparatus 100 of the first embodiment. Besides, the rearrangement rule of the first embodiment shown in FIG. 12 can also be adapted to the printing apparatus 100 of the second embodiment that requires nozzle information.

Furthermore, in the second embodiment, it is determined whether the selected nozzle might cause the banding phenomenon (it might cause the degradation of printed image quality) based on both items of information: information showing the presence of discharge deficiency and relative discharge accuracy information (a relative amount of curved flight information). However, it is not limited thereto, it may be determined whether the selected nozzle might cause the banding phenomenon based only on information showing the presence of discharge deficiency, or it may be determined whether the selected nozzle might cause the banding phenomenon based only on relative discharge accuracy information.

Moreover, in the second embodiment, at the time when age deterioration occurs in the printing part 14, etc., the determination process is not done in accordance with information showing the presence of discharge deficiency and relative discharge accuracy information, the overall image undergoes the rearrangement process as the first embodiment with no conditions. Therefore, measures can be taken to a nozzle with new discharge deficiency because of age deterioration.

Furthermore, in the second embodiment, when it is determined that the selected nozzle causes the banding phenomenon, the rearrangement process is done for pixels corresponding to the selected nozzle and nozzles near that nozzle causing that banding. However, not limited thereto, when there is even a single nozzle causing the banding phenomenon, or when there are a predetermined number of nozzles or greater, the rearrangement process may be done for the overall image or a predetermined area of an image. In the case of prints with low print resolution, when this is done, the rearrangement process is partially done to make that portion rather noticeable for likely degraded image quality. The rearrangement process is done for the overall image, or a predetermined area of an image (an image in the range that the rearranged result is not noticeable) to prevent degraded image quality due to the rearrangement process.

When the printing apparatus 100 of the second embodiment is configured in this manner, the image data acquiring part 10 corresponds to the image data acquiring module of aspect 1 or 55, the N-ary processing part 11 corresponds to the N-ary image data creating module of aspect 1 or 55, the image data splitting part 12a and the pixel value rearrangement shape table storing module 12b correspond to any one of the image data area splitting modules of aspects 1, 2, 5, 55, 56 and 59, and the pixel value rearranging part 12c and the pixel value rearrangement rule table storing part 12d correspond to any one of the pixel rearranging modules of aspects 1, 2, 6, 7, 8, 9, 55, 56, 60, 61, 62 and 63. The process that determines whether the selected nozzle might cause the banding phenomenon at the pixel value rearranging part 12c and the nozzle property information storing part 12e corresponds to the determining module of aspect 2, the printing data creating part 13 corresponds to the printing data creating module of aspect 1 or 55, and the printing part 14 corresponds to the printing module of aspect 1.

Moreover, steps S102 to S106 correspond to any one of the image data acquiring steps of aspects 20, 38, 72 and 90, step S108 corresponds to any one of the N-ary image data creating steps of aspects 20, 38, 72 and 90, steps S200 to S206 correspond to any one of the image data area splitting steps of aspects 20, 21, 24, 38, 39, 42, 72, 73, 76, 90, 91 and 94, steps S208 to step S216 correspond to any one of the pixel rearrangement steps of aspects 20, 21, 25, 26, 27, 28, 38, 39, 43, 44, 45, 46, 72, 73, 77, 78, 79, 80, 90, 91, 95, 96, 97 and 98, step S112 corresponds to any one of the printing data creating steps of aspects 20, 38, 72 and 90, step S116 corresponds to the printing step of aspect 20 or 38, and steps S314 and S324 correspond to any one of the determining steps of aspect 21, 39, 73 and 91.

Furthermore, in the second embodiment, the case is described that the rearrangement process is done based on four types of the combined rearrangement rules in total: the pixel rearranging orders shown in FIGS. 19A and 19B, the rearrange rule that individual pixels (dots) having a greater concentration value (larger dots) in the image data area are selected and rearranged in a decreasing order with respect to the rearranging orders, and the rearrange rule that individual pixels (dots) in the image data area are selected at random. However, not limited thereto, for example, the rearranged result may be that the defined rearranged result (for example, the rearranged result using any one of the four types of rearrangement rules) are rotated at a predetermined angle further in a random direction.

Hereinafter, a specific example will be described that the defined rearranged result is rotated at a predetermined angle in a random direction with reference to FIG. 24. Here, FIGS. 24A to 24D are diagrams illustrating an exemplary rearrangement pattern that the defined arrangement pattern is rotated at a predetermined angle in a random direction. Suppose the pattern shown in FIG. 24A is the defined arrangement pattern. FIG. 24B is the pattern that the pattern in FIG. 24A is rotated at an angel of 90° in the left direction or at an angle of 270° in the right direction. FIG. 24C is the pattern that the pattern in FIG. 24A is rotated at an angel of 180° in the left direction or in the right direction. FIG. 24D is the pattern that the pattern in FIG. 24A is rotated at an angel of 270° in the left direction or at an angle of 90° in the right direction. More specifically, rearrangement is done using the rearrangement patterns that any one of the right direction or the left direction is selected at random and a pattern is rotated at a predetermined angle (this angle may be selected at random from multiple types) in the selected direction. Therefore, for example, the rearrangement patterns rearranged in the direction of an oblique line can be prevented from being likely arranged continuously in the direction of the same oblique line. Thus, degraded image quality caused by repeating the same patterns like this can be less likely generated.

When the printing apparatus 100 of the second embodiment is configured in this manner, the image data acquiring part 10 corresponds to the image data acquiring module of aspect 1 or 37, the N-ary processing part 11 corresponds to the N-ary image data creating module of aspect 1 or aspect 37, the image data splitting part 12a and the pixel value rearrangement shape table storing module 12b correspond to any one of the image data area splitting modules of aspects 1, 2, 3, 5, 55, 56, 57 and 59, and the pixel value rearranging part 12c and the pixel value rearrangement rule table storing part 12d correspond to any one of the pixel rearranging modules of aspects 1, 2, 3, 6, 7, 8, 9, 10, 55, 56, 57, 60, 61, 62, 63 and 64. The process that determines whether the selected nozzle might cause the banding phenomenon at the pixel value rearranging part 12c and the nozzle property information storing part 12e corresponds to the determining module of aspect 2 or 3, the printing data creating part 13 corresponds to the printing data creating module of aspect 1 or 55, and the printing part 14 corresponds to the printing module of aspect 1.

Furthermore, steps S102 to S106 correspond to any one of the image data acquiring steps of aspects 20, 38, 72 and 90, step S108 corresponds to any one of the N-ary image data creating steps of aspects 20, 38, 72 and 90, steps S200 to S206 correspond to any one of the image data area splitting steps of aspects 20, 21, 22, 24, 38, 39, 40, 42, 72, 73, 74, 76, 90, 91, 92 and 94, steps S208 to S216 correspond to any one of the pixel rearrangement steps of aspects 20, 21, 22, 25, 26, 27, 28, 29, 38, 39, 40, 43, 44, 45, 46, 47, 72, 73, 74, 77, 78, 79, 80, 81, 90, 91, 92, 95, 96, 97, 98 and 99, step S112 corresponds to any one of the printing data creating steps of aspects 20, 38, 72 and 90, step S116 corresponds to the printing step of aspect 20 or 38, and steps S314 and S324 correspond to any one of the determining steps of aspects 21, 22, 39, 40, 73, 74, 91 and 92.

Moreover, in the modification of the first embodiment, an example is described that rearrangement is done so that large dots are gathered at four corners of each of the rectangular areas. However, not limited thereto, other rearrangement rules may be adapted as long as that rearrangement is done so that large dots are gathered at the outer rim part of each of the rectangular areas, the dots formed at the outer rim parts are gathered in the connecting parts of a plurality of the rectangular areas, and consequently a dot lump is formed at the center part of the image area formed of a plurality of the rectangular areas.

Besides, the rearrangement rule of the modification of the first embodiment can be adapted to the second embodiment.

What is claimed is:

1. A printing apparatus which is capable of printing an image on a medium by a print head having a nozzle that is capable of creating dots on a printing medium, the printing apparatus comprising:
    an image data acquiring module that acquires image data having pixel data with M types of pixel values (M≧3) configuring the image;
    an N-ary image data creating module that creates N-ary image data having N types of pixel values (M>N≧2) from the M types of pixel values (M≧3) expressed by each item of pixel data in the image data;
    an image data area splitting module that splits the N-ary image data into a plurality of image data areas configured of a predetermined number of items of pixel data;
    a pixel rearranging module that rearranges a position of a pixel corresponding to each item of pixel data included in each of the image data areas in the N-ary image data at a predetermined position in each of the image data areas;
    a printing data creating module that creates printing data which defines information about dot forming descriptions of each of the nozzles corresponding to the N-ary image data after the rearrangement; and
    a printing module that prints the image on the medium by the print head based on the printing data;
    wherein the nozzles of the print head are continuously arranged across an area equal to or wider than a mounting area of the medium.

2. The printing apparatus according to claim 1, further comprising:
    a nozzle property information storing module that stores nozzle property information showing properties of each of the nozzles; and
    a determining module that determines whether there is a nozzle that possibly causes degradation of printed image quality among nozzles for use in printing the image data based on the nozzle property information,
    wherein the image data area splitting module performs the splitting process for all the N-ary image data when it is determined that there is the nozzle that possibly causes degradation by the determining module, and
    the pixel rearranging module performs the rearrangement process for each of the image data areas after splitting by the image data area splitting module.

3. The printing apparatus according to claim 1, further comprising:
    a nozzle property information storing module that stores nozzle property information showing properties of each of the nozzles; and
    a determining module that determines whether there is a nozzle that possibly causes degradation of printed image quality among nozzles for use in printing the image data based on the nozzle property information, wherein the image data area splitting module performs the splitting process for pixel data corresponding to a nozzle that possibly causes degradation and nozzles near the nozzle that possibly causes degradation in the N-ary image data when it is determined that there is the nozzle that possibly causes degradation by the determining module, and the pixel rearranging module performs the rearrangement process for each of the image data areas after splitting by the image data area splitting module.

4. The printing apparatus according to claim 3, wherein the nozzle property information includes at least one of:

information about a position shift between an actual position of the dot formed by each of the nozzles on the medium and an ideal dot forming position of the dot formed by each of the nozzles, and discharge deficiency information showing a presence of ink discharge deficiency in each of the nozzles.

5. The printing apparatus according to claim 1, wherein the image data area splitting module performs the splitting process so that a shape of an image portion configured of the image data area and a number of items of pixel data are uniform.

6. The printing apparatus according to claim 1, wherein the pixel rearranging module performs the rearrangement process so that a pixel of pixel data having a pixel value equal to or greater than a predetermined concentration value is arranged at a center part of an image portion configured of the image data area.

7. The printing apparatus according to claim 1, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image portion configured of the image data area.

8. The printing apparatus according to claim 1, wherein the pixel rearranging module performs the rearrangement process so that a pixel of pixel data having a pixel value equal to or greater than a predetermined concentration value is arranged from a center part of an image portion configured of the image data area toward an outer rim part and rearranged in a decreasing order of concentration values.

9. The printing apparatus according to claim 1, wherein the pixel rearranging module performs the rearrangement process so that in an image portion configured of the image data area, a pixel of a pixel value equal to or greater than a predetermined concentration value is arranged in an oblique direction.

10. The printing apparatus according to claim 1, wherein the pixel rearranging module performs the rearrangement process for each of the image data areas so that adjacent image data areas are each rearranged by a different rearrangement method.

11. The printing apparatus according to claim 10, wherein the rearrangement method includes a method of rearranging a defined position of each pixel in the image data area so that the image data area is rotated at a predetermined angle in a random direction.

12. The printing apparatus according to claim 1, wherein the pixel rearranging module performs the rearrangement process so that a pixel of pixel data having a pixel value equal to or greater than a predetermined concentration value is arranged at a center part of an image area configured of a plurality of the adjacent image data areas.

13. The printing apparatus according to claim 12, wherein the pixel rearranging module sequentially arranges in an image portion configured of each area of a plurality of the adjacent image data areas a pixel of pixel data having a pixel value equal to or greater than a predetermined concentration value from a corner of the image portion of each area.

14. The printing apparatus according to claim 12, wherein the pixel rearranging module performs the arrangement process so that among pixel values equal to or greater than a predetermined concentration value, a pixel of pixel data having a pixel value to be a concentration value equal to or greater than a predetermined threshold is arranged at a center part of an image area configured of a plurality of the adjacent image data areas.

15. The printing apparatus according to claim 12, wherein the pixel rearranging module performs the rearrangement process so that a pixel of pixel data having a pixel value equal to or greater than a predetermined concentration value is arranged from a center part of an image area configured of a plurality of the adjacent image data areas toward an outer rim part and rearranged in a decreasing order of concentration values.

16. The printing apparatus according to claim 15, wherein the pixel rearranging module performs the rearrangement process so that a pixel of pixel data having a pixel value equal to or greater than a predetermined concentration value is arranged from a corner toward a center part of an image portion configured of each area of a plurality of the adjacent image data areas and rearranged in a decreasing order of concentration values.

17. The printing apparatus according to claim 12, wherein the pixel rearranging module performs the rearrangement process so that a pixel of a pixel value equal to or greater than a predetermined concentration value is arranged in an oblique direction at a center part of an image area configured of a plurality of the adjacent image data areas.

18. A printing apparatus which is capable of printing an image on a medium by a print head having a nozzle that is capable of creating dots on a printing medium, the printing apparatus comprising:

an image data acquiring module that acquires image data having pixel data with M types of pixel values (M≧3) configuring the image;

an N-ary image data creating module that creates N-ary image data having N types of pixel values (M>N≧2) from the M types of pixel values (M≧3) expressed by each item of pixel data in the image data;

an image data area splitting module that splits the N-ary image data into a plurality of image data areas configured of a predetermined number of items of pixel data;

a pixel rearranging module that rearranges a position of a pixel corresponding to each item of pixel data included in each of the image data areas in the N-ary image data at a predetermined position in each of the image data areas;

a printing data creating module that creates printing data which defines information about dot forming descriptions of each of the nozzles corresponding to the N-ary image data after the rearrangement; and a printing module that prints the image on the medium by the print head based on the printing data;

wherein the print head is adapted to move in a direction orthogonal to a feed direction of the medium.

* * * * *